US012748431B2

(12) United States Patent
Ohtsuka et al.

(10) Patent No.: US 12,748,431 B2
(45) Date of Patent: Sep. 29, 2026

(54) CONTROL SERVER, INFORMATION PROCESSING SYSTEM, TRAVELING BODY, METHOD FOR CONTROLLING TRAVELING BODY, AND RECORDING MEDIUM

(71) Applicants: Aiko Ohtsuka, Tokyo (JP); Mototsugu Muroi, Kanagawa (JP); Masuyoshi Yachida, Tokyo (JP); Koichi Kudo, Kanagawa (JP); Hanako Bando, Ibaraki (JP)

(72) Inventors: Aiko Ohtsuka, Tokyo (JP); Mototsugu Muroi, Kanagawa (JP); Masuyoshi Yachida, Tokyo (JP); Koichi Kudo, Kanagawa (JP); Hanako Bando, Ibaraki (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/848,944

(22) PCT Filed: Mar. 16, 2023

(86) PCT No.: PCT/IB2023/052553
§ 371 (c)(1),
(2) Date: Sep. 20, 2024

(87) PCT Pub. No.: WO2023/180878
PCT Pub. Date: Sep. 28, 2023

(65) Prior Publication Data

US 2025/0199530 A1 Jun. 19, 2025

(30) Foreign Application Priority Data

Mar. 23, 2022 (JP) ................................ 2022-046195
Jan. 27, 2023 (JP) ................................ 2023-011242

(51) Int. Cl.
*G05D 1/225* (2024.01)
*G05D 1/229* (2024.01)
(Continued)

(52) U.S. Cl.
CPC ............. *G05D 1/225* (2024.01); *G05D 1/229* (2024.01); *G05D 1/689* (2024.01); *G05D 1/69* (2024.01); *G05D 2105/89* (2024.01)

(58) Field of Classification Search
CPC ........ G05D 1/225; G05D 1/229; G05D 1/689; G05D 1/69; G05D 2105/89; G05D 1/0282; G05D 1/0094
See application file for complete search history.

(56) References Cited

U.S. PATENT DOCUMENTS

2005/0113975 A1* 5/2005 Seemann ............. G05D 1/0236 701/10
2014/0358419 A1 12/2014 Inagaki
(Continued)

FOREIGN PATENT DOCUMENTS

JP H06198586 A * 7/1994
JP H09-182057 A 7/1997
(Continued)

OTHER PUBLICATIONS

P. Merriaux et al., "The VIKINGS Autonomous Inspection Robot: Competing in the ARGOS Challenge," in IEEE Robotics & Automation Magazine, vol. 26, No. 1, pp. 21-34, Mar. 2019, doi: 10.1109/MRA.2018.2877189. (Year: 2019).*
(Continued)

*Primary Examiner* — Daniel M. Robert
(74) *Attorney, Agent, or Firm* — XSENSUS LLP

(57) ABSTRACT

A control server for controlling a traveling body includes an instruction unit to instruct the traveling body to travel on a first route and acquire state information of a first monitored
(Continued)

object on the first route. Based on a determination of presence of an abnormality in a state of the first monitored object, the determination being made from the acquired state information, the instruction unit instructs the traveling body to travel on a second route different from the first route and acquire state information of a second monitored object being different from the first monitored object and located on the second route.

20 Claims, 39 Drawing Sheets

(51) Int. Cl.

| | |
|---|---|
| ***G05D 1/689*** | (2024.01) |
| ***G05D 1/69*** | (2024.01) |
| ***G05D 105/80*** | (2024.01) |

(56) References Cited

U.S. PATENT DOCUMENTS

| | | | | |
|---|---|---|---|---|
| 2017/0349279 | A1* | 12/2017 | Garcia-Gabin | G01N 21/88 |
| 2017/0372649 | A1 | 12/2017 | Itoh et al. | |
| 2018/0011669 | A1 | 1/2018 | Ohtsuka et al. | |
| 2018/0165931 | A1* | 6/2018 | Zhang | B25J 5/007 |
| 2018/0178781 | A1* | 6/2018 | Funk | H04W 4/70 |
| 2020/0391061 | A1 | 12/2020 | Enejehlm et al. | |
| 2021/0116248 | A1* | 4/2021 | Inotsume | G05D 1/102 |
| 2021/0325910 | A1* | 10/2021 | Jones | G01M 5/0025 |
| 2022/0100571 | A1 | 3/2022 | Ohtsuka et al. | |
| 2023/0051111 | A1* | 2/2023 | Cyrus | B60L 15/20 |
| 2023/0133257 | A1* | 5/2023 | Michini | G01N 25/72<br>374/4 |
| 2023/0166728 | A1 | 6/2023 | Hosaka et al. | |
| 2023/0205198 | A1 | 6/2023 | Bando et al. | |
| 2024/0022806 | A1 | 1/2024 | Kudo et al. | |

FOREIGN PATENT DOCUMENTS

| | | | | |
|---|---|---|---|---|
| JP | 2006184027 | A | * | 7/2006 |
| JP | 2022-058146 | A | | 4/2022 |
| JP | 2022-058164 | A | | 4/2022 |
| KR | 20190114155 | A | | 10/2019 |

OTHER PUBLICATIONS

International Search Report and Written Opinion issued on May 12, 2023 in PCT/IB2023/052553 filed on Mar. 16, 2023, 8 Pages.

* cited by examiner

FIG. 9

| POINT ID | POSITION INFORMATION | CAPTURED IMAGE DATA |
|---|---|---|
| P0 | (0, 0) | P1.jpg |
| P1 | (0, 30) | P2.jpg |
| P2 | (0,60) | P3.jpg |
| ... | ... | ... |

FIG. 10

| INSPECTION TARGET ID | NAME | POSITION INFORMATION | INSPECTION OPERATION | SETTINGS, ETC. |
|---|---|---|---|---|
| D001 | METER 1 | (10, 200) | IMAGING | PAN, TILT, ZOOM |
| D002 | METER 2 | (10, 215) | IMAGING | PAN, TILT, ZOOM |
| D003 | VALVE 1 | (10, 210) | IMAGING | PAN, TILT, ZOOM |
| D004 | PUMP 1 | (10, 205) | SOUND SENSOR INFORMATION ACQUISITION | SENSOR SETTING, ETC. |
| ... | ... | ... | ... | ... |

FIG. 11

| ROUTE ID | AREA ID | ROUTE DATA |
|---|---|---|
| R001 | A001 | P0→P1→P2→P3→P4→P8→D001→P10→P8→P4→P3→P2→P1→P0 |
| R002 | A001<br>A002 | P0→P1→P2→P3→P4→P8→P10→P12→P14→D005→D006→D007→P16→P14→P10→P8→P4→P3→P2→P1→P0 |
| R003 | A001<br>A002<br>A003<br>A004 | P0→P1→P2→P3→P4→P8→P10→P12→P14→P16→P18→P19→D008→P20→D009→P21→P17→P15→P13→P11→P9→P7→P16→P5→P4→P3→P2→P1→P0 |
| ... | ... | ... |

FIG. 16

| ABNORMALITY ID | INSPECTION POINT | AREA INFORMATION | A. GAS CONCENTRATION | B. IMAGE COMPARISON | C. TEMPERATURE | D. LIDAR | DETERMINATION CRITERION | OPERATION |
|---|---|---|---|---|---|---|---|---|
| ID100 | D001 | AREA 1 | — | DEGREE OF MATCHING WITH METER 1 COMPARISON IMAGE. PNG | — | — | B | ABNORMAL-TIME ROUTE ID200 |
| ID101 | D004 | AREA 1 | — | DEGREE OF MATCHING WITH METER 2 COMPARISON IMAGE. PNG | — | — | B | ABNORMAL-TIME ROUTE ID201 |
| ID102 | D003 | AREA 1 | — | DEGREE OF MATCHING WITH VALVE 1 COMPARISON IMAGE. PNG | — | — | B | ABNORMAL-TIME ROUTE ID202 |
| ID111 | D010 | AREA 2 | 3 OR MORE | — | 50 OR MORE | — | A and C | ABNORMAL-TIME ROUTE ID301 |
| ID112 | D010 | AREA 2 | 5 OR MORE | — | — | — | A | ABNORMAL-TIME ROUTE ID403 |
| ID113 | P18 | — | — | — | — | OBSTACLE PRESENT ON ROUTE | D | ABNORMAL-TIME ROUTE ID404 |
| — | — | — | — | — | — | — | — | — |

FIG. 17

| ABNORMAL-TIME ROUTE ID | ROUTE DATA | TARGET TRAVELING ROBOT |
|---|---|---|
| ID201 | P10→D003→P32→P2→P1→P0 | ROBOT 1 |
| ID202 | P32→D002→P31→P2→P1→P0 | ROBOT 1 |
| ID203 | P31→P30→P2→P1→P0 | ROBOT 1 |
| ID301 | P41→P43→P46→P0 | ROBOT 1 |
| ID403 | P52→P55→P0 | ROBOT 2 |

FIG. 20

| ABNORMALITY ID | INSPECTION POINT | AREA INFORMATION | A. GAS CONCEN-TRATION | B. IMAGE COMPARISON | C. TEMPERA-TURE | D. LIDAR | DETERMINA-TION CRITERION | OPERATION |
|---|---|---|---|---|---|---|---|---|
| ID100 | D001 | AREA 1 | — | DEGREE OF MATCHING WITH METER 1 COMPARISON IMAGE. PNG | — | — | B | ABNORMAL-TIME ROUTE ID200 |
| ID111 | D010 | AREA 2 | 3 OR MORE | — | 50 OR MORE | — | A AND C | ABNORMAL-TIME ROUTE ID301 |
| ID112 | D010 | AREA 2 | 5 OR MORE | — | — | — | A | ABNORMAL-TIME ROUTE ID403 |
| ID113 | P18 | — | — | — | — | OBSTACLE PRESENT ON ROUTE | D | ABNORMAL-TIME ROUTE ID404 |
| — | — | — | — | — | — | — | — | — |

FIG. 21

| ABNORMAL-TIME ROUTE ID | ROUTE DATA | TARGET TRAVELING ROBOT |
|---|---|---|
| ID200 | P10→D004→D003→D002→P30→P2→P1→P0 | ROBOT 1 |
| ID201 | P41→P43→P46→P0 | ROBOT 1 |
| ID203 | P52→P55→P0 | ROBOT 2 |

FIG. 25

| ABNORMALITY ID | INSPECTION POINT | AREA INFORMATION | A. GAS CONCENTRATION | B. IMAGE COMPARISON | C. TEMPERATURE | D. LIDAR | DETERMINATION CRITERION | OPERATION |
|---|---|---|---|---|---|---|---|---|
| ID100 | D001 | AREA 1 | — | DEGREE OF MATCHING WITH METER 1 COMPARISON IMAGE. PNG | — | — | B | ABNORMAL-TIME ROUTE ID200 |
| ID111 | D004 | AREA 1 | 3 OR MORE | — | 50 OR MORE | — | A and C | ABNORMAL-TIME ROUTE ID301 |
| ID112 | D003 | AREA 1 | 5 OR MORE | — | — | — | A | ABNORMAL-TIME ROUTE ID403 |
| ID113 | D010 | AREA 2 | 10 OR MORE | — | — | — | — | POWER SHUTDOWN |
| ID114 | D010 | AREA 2 | — | — | — | OBSTACLE PRESENT ON ROUTE | D | ABNORMAL-TIME ROUTE ID404 |
| — | — | — | — | — | — | — | — | — |

| INSPECTION TARGET ID | COORDINATES (x, y) | AREA NAME | IMAGE NAME |
|---|---|---|---|
| D001 | (200, 200) | TANK AREA 1 | D001.jpg |
| ... | ... | ... | ... |

| POINT ID | FIRST ADJACENT POINT ID | SECOND ADJACENT POINT ID | THIRD ADJACENT POINT ID |
|---|---|---|---|
| P8 | P10 | P4 | |
| P4 | P3 | P8 | P5 |

FIG. 39

| ABNORMALITY ID | INSPECTION POINT | IMAGE COMPARISON | OPERATION |
|---|---|---|---|
| ID100 | D001 | DEGREE OF MATCHING WITH VACANT ROOM. PNG | ABNORMAL-TIME ROUTE ID200 |
| ID111 | D010 | DEGREE OF MATCHING WITH VACANT ROOM. PNG | ABNORMAL-TIME ROUTE ID301 |
| ID112 | D010 | DEGREE OF MATCHING WITH VACANT ROOM. PNG | ABNORMAL-TIME ROUTE ID403 |
| | | | |
| ... | ... | ... | ... |

FIG. 42

| EQUIPMENT ID (ATTRIBUTE INFORMATION) | SITE INFORMATION | CAPTURED IMAGE | DATE AND TIME | DETERIORATION INFORMATION FLAG |
|---|---|---|---|---|
| PS1 | SITE 1 | PS1-23.jpg | 2022/3/23 12:00 | |
| ABC-0001 | SITE Q | ABC-0001-23.jpg | 2022/3/23 14:00 | |
| PS1 | SITE 1 | PS1-24.jpg | 2022/3/24 12:00 | 1 |
| ABC-0001 | SITE Q | ABC-0001-24.jpg | 2022/3/24 14:00 | |
| PS1 | SITE 1 | PS1-25.jpg | 2022/3/25 12:00 | |
| ABC-0001 | SITE Q | ABC-0001-25.jpg | 2022/3/25 14:00 | |
| ... | ... | ... | ... | ... |

CONTROL SERVER, INFORMATION PROCESSING SYSTEM, TRAVELING BODY, METHOD FOR CONTROLLING TRAVELING BODY, AND RECORDING MEDIUM

TECHNICAL FIELD

The present disclosure relates to a control server for controlling a traveling body, an information processing system, the traveling body, a method for controlling the traveling body, and a recording medium.

BACKGROUND ART

Traveling bodies that travel in a predetermined area has been introduced in order to perform transport, inspection, and the like of an object in an unattended manner. Such a traveling body includes a sensor, and can detect a current state or occurrence of an abnormality from a detection result of the sensor.

In some cases, the cause of the abnormality is not identified from the detection result of the sensor. For example, a sensor may have malfunction. In this case, for identifying the cause of the abnormality, the operation before and after the occurrence of the abnormality is reproduced many times and analyzed. It takes time and labor to identify the cause.

There are technologies proposed for quickly and reliably identifying the cause of occurrence of an abnormality. For example, an image including an object monitored (monitored object) and the vicinity thereof is repeatedly captured, the captured images are stored in time series, and when an abnormality is detected, the images are read out and played back from a storage position a predetermined time back to the time of detection (see, for example, PTL 1).

CITATION LIST

Patent Literature

[PTL 1]
Japanese Unexamined Patent Application Publication No. H9-182057

SUMMARY OF INVENTION

Technical Problem

To solve the above-described inconvenience, an object of the present disclosure is to provide information for facilitating determination of a cause of an abnormality.

Solution to Problem

In one aspect, a control server for controlling a traveling body includes an instruction unit to instruct the traveling body to travel on a first route and acquire state information of a first monitored object on the first route. Based on a determination of presence of an abnormality in a state of the first monitored object, the determination being made from the acquired state information, the instruction unit instructs the traveling body to travel on a second route different from the first route and acquire state information of a second monitored object being different from the first monitored object and located on the second route.

In another aspect, an information processing system includes the control server described above, and one or more traveling bodies controlled by the control server.

In another aspect, a traveling body includes an instruction unit configured to instruct the traveling body to travel on a first route and acquire state information of a first monitored object on the first route. Based on a determination of presence of an abnormality in a state of the first monitored object, made from the acquired state information, the instruction unit instructs the traveling body to travel on a second route different from the first route and acquire state information of a second monitored object being different from the first monitored object and located on the second route.

Another aspect concerns a method for controlling a traveling body. The method includes instructing the traveling body to travel on a first route and acquire state information of a first monitored object on the first route; and based on a determination of presence of an abnormality in a state of the first monitored object, instructing the traveling body to travel on a second route different from the first route the determination being made from the acquired state information and acquire state information of a second monitored object being different from the first monitored object and located on the second route.

In another aspect, a recording medium stores a plurality of program codes which, when executed by one or more processors, causes the processors to perform the method described above.

Advantageous Effects of Invention

According to aspects of the present disclosure, the information for facilitating determination of the cause of the abnormality is provided.

BRIEF DESCRIPTION OF DRAWINGS

A more complete appreciation of embodiments of the present disclosure and many of the attendant advantages and features thereof can be readily obtained and understood from the following detailed description with reference to the accompanying drawings.

FIG. 9 is a diagram illustrating an example of a waypoint management table.

FIG. 10 is a diagram illustrating an example of an inspection target management table.

FIG. 11 is a diagram illustrating an example of a route-information management table.

FIG. 16 is a diagram illustrating an example of an abnormality information table for determining whether or not there is an abnormality in an inspection target.

FIG. 17 is a diagram illustrating an example of a route for abnormal situation database (DB) based on the first method.

FIG. 20 is a diagram illustrating another example of the abnormality information table for determining whether or not there is an abnormality in an inspection target.

FIG. 21 is a diagram illustrating an example of a route for abnormal situation DB based on the second method.

FIG. 25 is a diagram illustrating another example of the abnormality information table for determining whether or not there is an abnormality in an inspection target.

FIG. 39 is a diagram illustrating an example of a table for determining an abnormality in which, for each abnormality ID, an inspection point, an image comparison information, and an operation are stored in association with abnormal-time route ID.

FIG. 42 is a diagram illustrating an example of deterioration information managed in a deterioration information management table in a deterioration information DB.

Figure 1:
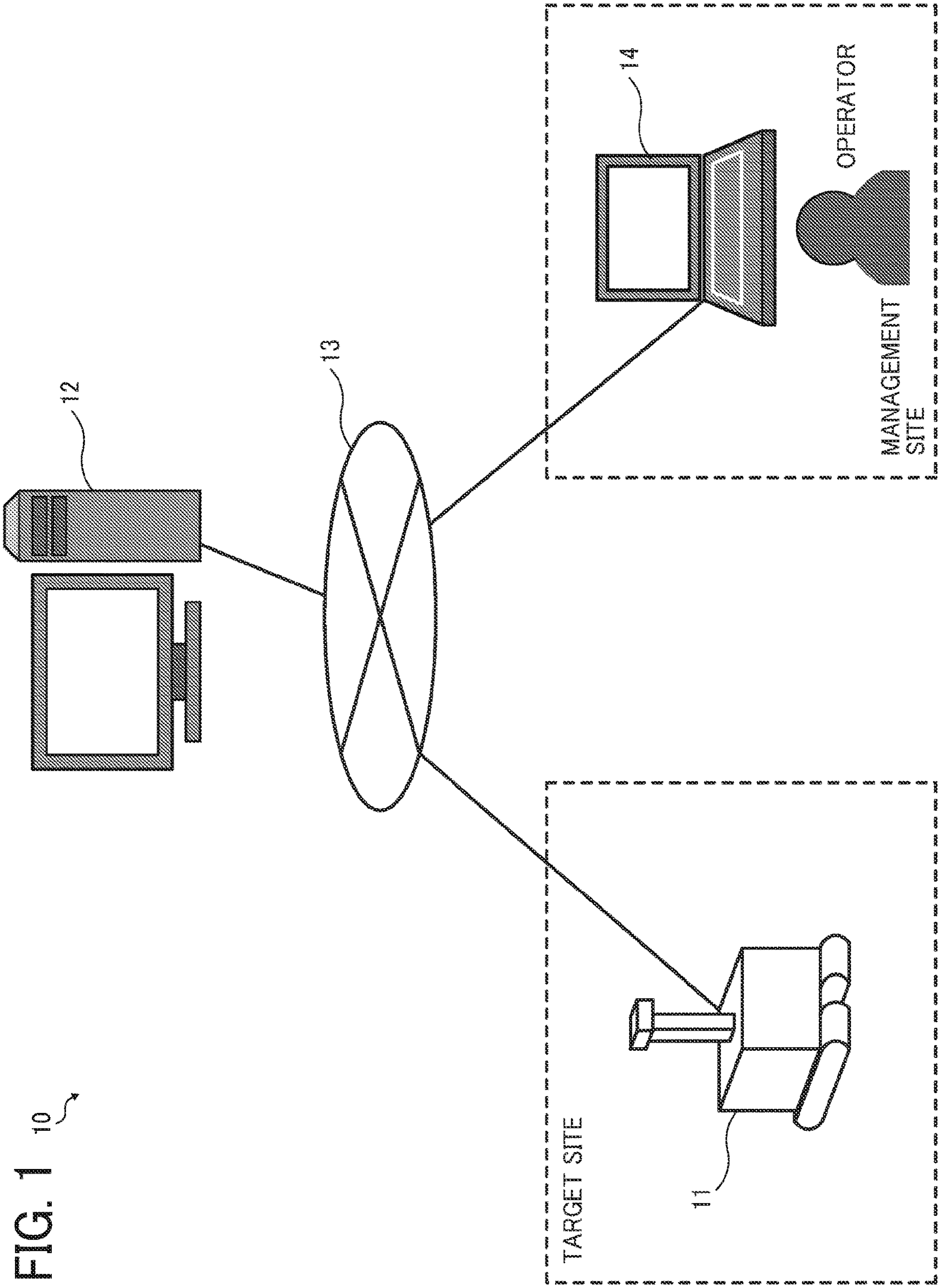
FIG. 1 is a diagram illustrating a configuration of an information processing system according to a first embodiment.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DESCRIPTION OF EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Although some embodiments of the present disclosure are described below, embodiments of the present invention are not limited to the embodiments described below.

FIG. 1 is a diagram illustrating a configuration of an information processing system according to the present embodiment. An information processing system 10 illustrated in FIG. 1 sets a predetermined area as a monitored area (a target site). The information processing system 10 includes a traveling robot 11 as a traveling body that travels in the monitored area, and a management server 12 as a control system (or a control server) that controls the traveling robot 11. The traveling robot 11 and the management server 12 are connected to a communication network 13 and communicate with each other via the communication network 13.

The communication network 13 includes the Internet, a mobile communication network, and a local area network (LAN) and can be either wired or wireless.

The traveling robot 11 is installed in the monitored area and can autonomously travel in the monitored area. Autonomous traveling may be autonomously moving on a designated route in the monitored area, autonomously moving in the monitored arca using a technology such as line tracing, or autonomously moving using a result of machine learning of a route that the traveling robot 11 took in the past. The traveling robot 11 may be manually operated by an operator.

The traveling robot 11 includes various sensors and executes predetermined tasks such as inspection and maintenance. The traveling robot 11 may include an arm capable of gripping an object and may perform tasks such as transportation and light work. The traveling robot 11 may be any robot capable of autonomous travel such as an automobile, a drone, a multicopter, or an unattended aerial vehicle.

The traveling robot 11 includes a detection device (detection means) to detect a state of a monitored object, for monitoring the monitored area. Examples of the detection device include an imaging device (imaging means), a gas sensor (gas detection means), and a sound recorder (sound recording means). The imaging device captures an image of the monitored object. When the monitored object is a water or gas meter, a water or gas flowmeter, or a liquid level meter, the imaging device captures an image of scale marking or a display value. The imaging device can also capture an image of a hole, an obstacle, or the like on a road surface as surrounding state information indicating a state around the traveling robot 11. When the monitored object is a pipe, a tank, or the like, the gas sensor measures, for example, the concentration of a harmful gas leaking from the pipe, the tank, or the like as the state around the traveling robot 11. The sound recorder records a sound of mechanical operation of a device that involves an operation of a valve, a pump, a compressor, or the like. The state of the monitored object may be temperature or humidity, at a predetermined position, and the traveling robot 11 may include a temperature and humidity sensor as a detection device.

The monitored area is an area (also referred to as a target site, or simply a site) in which the traveling robot 11 is installed. Examples of the monitored area include an outdoor area such as a business place, a factory, a chemical plant, a construction site, a substation, a farm, a field, a cultivated land, or a disaster site; and an indoor area such as an office, a school, a factory, a warehouse, a commercial facility, a hospital, or a care facility. The monitored area may be any location where there is a need of the traveling robot 11 to carry out a task that has been done by a person. The number of traveling robots 11 that monitor the monitored area is not limited to one, and a plurality of traveling robots 11 may cooperate to monitor the monitored area. In this case, for example, a traveling robot A monitors the first area of the monitored area, a traveling robot B monitors a second area thereof, and a traveling robot C monitors a third area thereof. In the following description, it is assumed that the traveling robot 11 includes a plurality of wheels to travel and an imaging device (camera) as a detection device.

The management server 12 instructs the traveling robot 11 to capture an image of the monitored object while traveling on a first route via the communication network 13. The first route is a route (route for normal conditions) that the traveling robot 11 follows the route for normal conditions. The number of monitored objects is not limited to one, and there may be a plurality of monitored objects. The management server 12 receives image data of the monitored object captured by the traveling robot 11. The management server 12 analyzes the received image data and determines the presence or absence of abnormality. In a case where the monitored object is a flowmeter and the normal flow rate is 1 to 10 $m^3/s$, the presence of abnormality is determined when the flow rate is out of this range (for example, 0.5 $m^3/s$).

Even when an abnormality is detected from the image data of a particular monitored object (a first monitored object), the cause of the abnormality is not identified only from the image data of the particular monitored object. Accordingly, the management server 12 instructs the traveling robot 11 to switch the route to a second route different from the first route. Then, the management server 12 instructs the traveling robot 11 to capture an image of a designated portion (second monitored object) related to the state of the particular monitored object on the second route. Note that the first route and the second route may partially overlap each other. The first route and the second route may be different from each other only in one or both of the start point and the end point.

As in the above example, when the flowmeter (first monitored object) indicates a flow rate lower than the normal flow rate, clogging of some portion is suspected. Therefore, the route (the first route) for the normal monitoring is switched to the route (the second route) for an abnormal situation, and an image of the valve as the designated portion (second monitored object) can be captured, in order to check the malfunction of the valve. Note that this is merely an example, and an image of a portion relating to another cause may be captured, or sound of mechanical operation may be recorded.

To the communication network 13, a communication terminal 14 such as a laptop computer, a personal computer (PC), or a tablet computer operated by an operator is connected. The communication terminal 14 is installed at a management site. The communication terminal 14 communicates with the management server 12 via the communication network 13 and can display an image captured by the traveling robot 11 received from the management server 12.

The communication terminal 14 can receive the image data of the designated portion obtained by the traveling robot 11 that has switched to the second route, instructed by the management server 12 detecting the abnormality. Then, the communication terminal 14 can display an image represented by the image data. In a case where an image of the valve as the designated portion is referred to and the opening degree of the valve is smaller than the normal opening degree, it is possible to detect that the valve is closed as the cause of the abnormality of the flow rate decrease indicated by the flowmeter.

In this way, since the traveling robot 11 captures and provide an image of a portion that the operator desires to observe without an intervention of the operator, the operator can identify the cause of the abnormality in the monitored area and can quickly take an optimum countermeasure. If image capturing of all portions to be inspected is performed during the normal inspection, the inspection time becomes longer. By contrast, in the present embodiment, since image capturing of the designated portion is performed when an abnormality is found, inspection points can be narrowed down in normal inspection, thereby shortening the inspection time.

In the example illustrated in FIG. 1, the operation of the traveling robot 11 is controlled by the management server 12, but a part of the control of the operation of the traveling robot 11 may be executed in the traveling robot 11.

Figure 2:
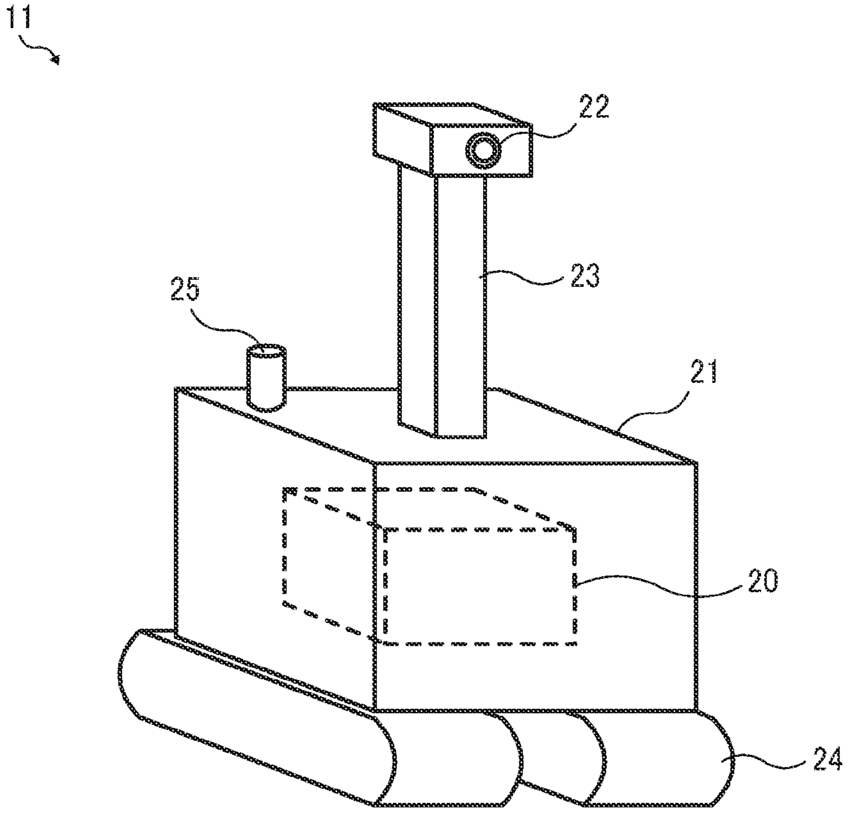
FIG. 2 is a diagram illustrating an example of a schematic configuration of a traveling robot as a traveling body according to embodiments.

FIG. 2 is a schematic diagram illustrating an example of a configuration of the traveling robot 11. The traveling robot 11 includes a housing 21 including a controller 20, an imaging device 22, a support 23, a moving mechanism 24, and a presentation mechanism 25. The controller 20 controls processing or operation of the traveling robot 11. The imaging device 22 captures, as a subject, an object located at the site where the traveling robot 11 is installed, or a landscape of the site, and generates a captured image. The imaging device 22 may be a digital camera, such as a digital single-lens reflex camera or a compact digital camera, capable of generating a planar image; or a special image capturing device capable of capturing a spherical (360°) panoramic image and generating a captured image.

The special image capturing device is, for example, a spherical-image capturing device that captures a subject to generate two hemispherical images and combines the two hemispherical images into a spherical panoramic image. Alternatively, the special image capturing device may be a wide-angle camera or a stereo camera capable of acquiring a wide-angle image having an angle of view equal to or larger than a predetermined value. In alternative to using the special image capturing device, a general digital camera that captures a planar image may be used. For example, the general digital camera captures images while rotating so as to cover all directions of the site. The captured images are then synthesized to generate a spherical image. In any method, the special image capturing device combines a plurality of captured images by image processing, for generating the spherical image.

The image captured by the imaging device 22 may be a still image, a moving image, or both of a still image and a moving image. The imaging device 22 may record sound when capturing an image, and acquire sound data together with image data. The imaging device 22 has a pan-tilt-zoom (PTZ) function for capturing a wide range by one device. Panning is a function of moving the orientation of a lens of a camera (an imaging device) in a horizontal direction (right and left). Tilting is a function of moving the orientation of the lens of the camera in a vertical direction (up and down). Zooming is a function of changing the apparent distance from the subject and increasing the angle of view. With this function, even if the imaging device 22 is not located at the same height or the same lateral position as the subject, the imaging device 22 can direct the lens to the subject by panning and tilting and can capture an image of the subject. Even if the subject is located at a deep position, the imaging device 22 can capture an image of the subject in a desired size by, for example, zooming up.

The support 23 is a component with which the imaging device 22 is mounted in the housing 21 of the traveling robot 11. The support 23 may be, for example, a rod-shaped pole fixed to the housing 21 so as to extend in the vertical direction. The support 23 may be a movable member so as to adjust the image capturing direction (the direction of the lens) and the position (the height of the lens) of the imaging device 22.

The moving mechanism 24 (traveling means) is a unit for moving the traveling robot 11. The moving mechanism 24 includes wheels, a traveling motor, a traveling encoder, a steering motor, and a steering encoder, and may be called a drive system. The traveling motor causes the traveling robot 11 to travel. The traveling encoder detects a rotation direction, a position, and a rotation speed of the traveling motor. The steering motor changes the direction of the traveling robot 11. The steering encoder detects the rotational direction, position, and rotation speed of the steering motor. The rotation direction and the rotation speed detected by the traveling encoder and the steering motor are input to the controller 20, and the traveling motor and the traveling encoder are controlled so as to be attain an appropriate travel speed, direction, and the like.

The presentation mechanism 25 serves as presentation means (presentation unit) for presenting information on the abnormality when it is determined that there is an abnormality around the traveling robot 11. The controller 20 determines whether or not there is an abnormality around the traveling robot 11 based on the image captured by the imaging device 22. The traveling robot 11 may include a gas sensor, and the controller 20 may determine whether or not there is an abnormality based on the concentration or the like of the harmful gas detected by the gas sensor. When the controller 20 determines that there is an abnormality and determines that presentation by the presentation mechanism 25 is necessary, the controller 20 instructs the presentation mechanism 25 to present information on the abnormality. In response to an instruction from the controller 20, for example, the presentation mechanism 25 raises a flag to present information related to the abnormality to nearby persons.

Figure 3:
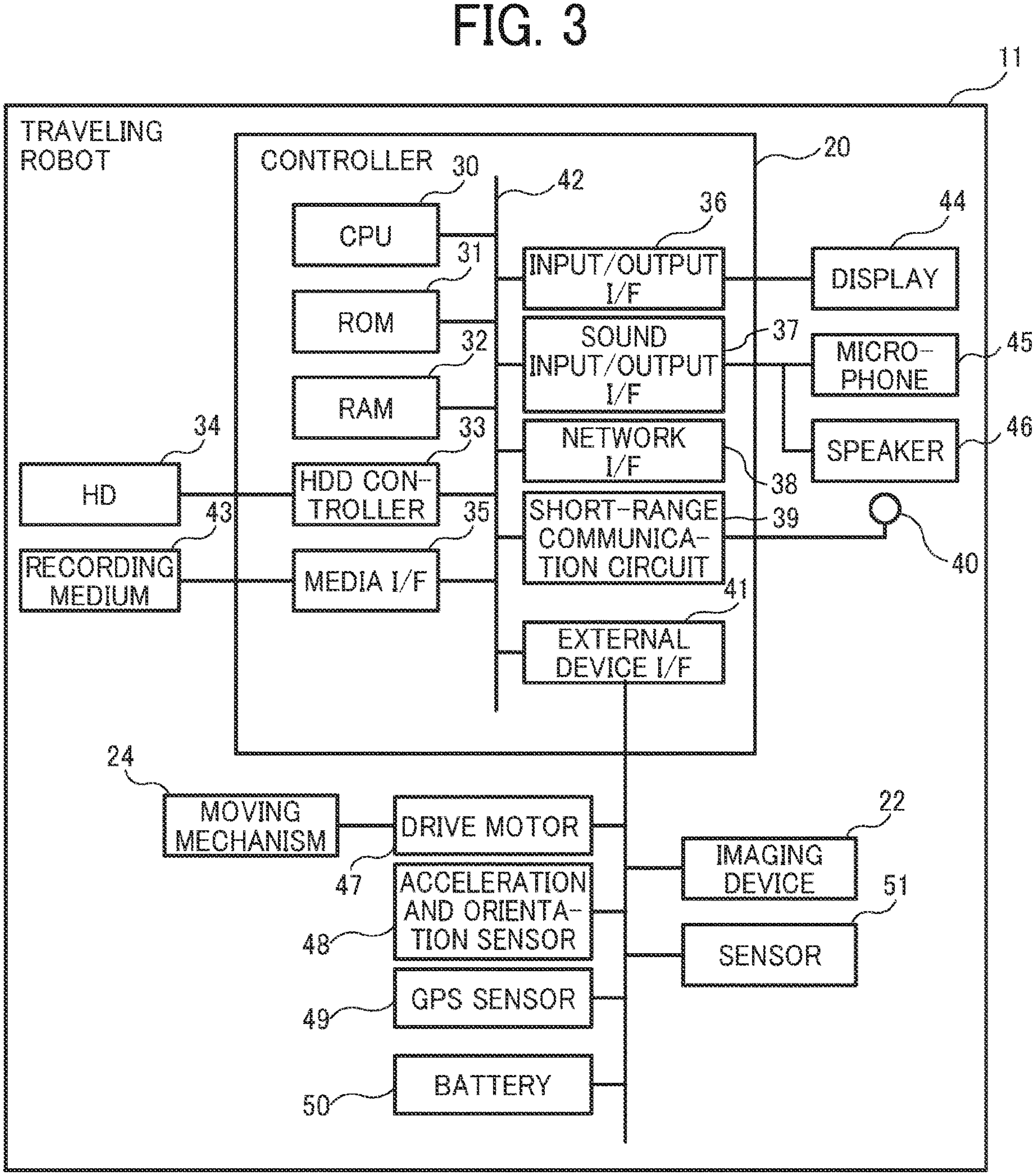
FIG. 3 is a block diagram illustrating an example of a hardware configuration of the traveling robot according to embodiments.

FIG. 3 is a block diagram illustrating an example of a hardware configuration of the traveling robot 11. Although the traveling robot 11 includes the controller 20 in the housing 21, the controller 20 may be disposed outside the traveling robot 11 or may be provided as a device separate from the traveling robot 11.

The controller 20 includes a central processing unit (CPU) 30, a read-only memory (ROM) 31, a random access memory (RAM) 32, a hard disk drive (HDD) controller 33, an HD 34, a media interface (I/F) 35, an input/output I/F 36, a sound input/output I/F 37, a network I/F 38, a short-range communication circuit 39, an antenna 40 of the short-range communication circuit 39, an external device I/F 41, and a bus line 42. The HDD 33 controls an HDD having the HD 34.

The CPU 30 controls the entire operation of the traveling robot 11. The CPU 30 is a processor that loads a program or data stored in the ROM 31 or the HD 34 onto the RAM 32 and executes processing, to implement the functions of the traveling robot 11.

The ROM 31 is a nonvolatile memory that keeps storing the program or data even after the power is turned off. The RAM 32 is used as a work area by the CPU 30 executing the programs to perform various processing. The HDD controller 33 controls reading or writing (storing) of data from and to the HD 34 under the control of the CPU 30. The HD 34 stores various data such as programs.

The media I/F 35 controls the reading or writing of data from or to a recording medium 43 such as a universal serial bus (USB) memory, a memory card, an optical disc, or a flash memory. The input/output I/F 36 is an interface for inputting and outputting characters, numerals, and various instructions to and from various external devices. The input/output I/F 36 controls display of various types of information such as a cursor, a menu, a window, text, and an image on a display 44 such as a liquid crystal display (LCD). In one example, the display 44 is a touch panel display provided with an input device (input means). In addition to the display 44, input devices such as a mouse and a keyboard may be connected to the input/output I/F 36.

The sound input/output I/F 37 is a circuit that processes input and output of sound signals between a microphone 45 and a speaker 46 under the control of the CPU 30. The microphone 45 is an example of a built-in sound collecting device capable of inputting sound signals under the control of the CPU 30. The speaker 46 is an example of a reproduction device that outputs a sound signal under the control of the CPU 30.

The network I/F 38 is an interface for communicating with other devices and apparatuses via the communication network 13. The network I/F 38 is, for example, a communication interface such as a wired or wireless LAN. The short-range communication circuit 39 is a communication circuit in compliance with a protocol such as near field communication (NFC) or BLUETOOTH. The external device I/F 41 is an interface for connecting the controller 20 to another device.

Examples of the bus line 42 include, but are not limited to, an address bus and a data bus that electrically connect the elements such as the CPU. The bus line 42 transmits an address signal, a data signal, and various control signals.

To the controller 20, a drive motor 47, an acceleration and orientation sensor 48, a global positioning system (GPS) sensor 49, the imaging device 22, a battery 50, and a sensor 51 such as a gas sensor are connected via the external device I/F 41.

The drive motor 47 drives the moving mechanism 24 to rotate so as to move the traveling robot 11 on the ground, according to a command from the CPU 30. The acceleration and orientation sensor 48 includes various sensors such as an electromagnetic compass that senses geomagnetism, a gyrocompass, and an accelerometer. The GPS sensor 49 receives GPS signals from GPS satellites. The battery 50 is a unit that supplies power for the entire traveling robot 11. The battery 50 may include an external battery that supplies auxiliary power from the outside, in addition to a battery built in the body of the traveling robot 11.

Figure 4:
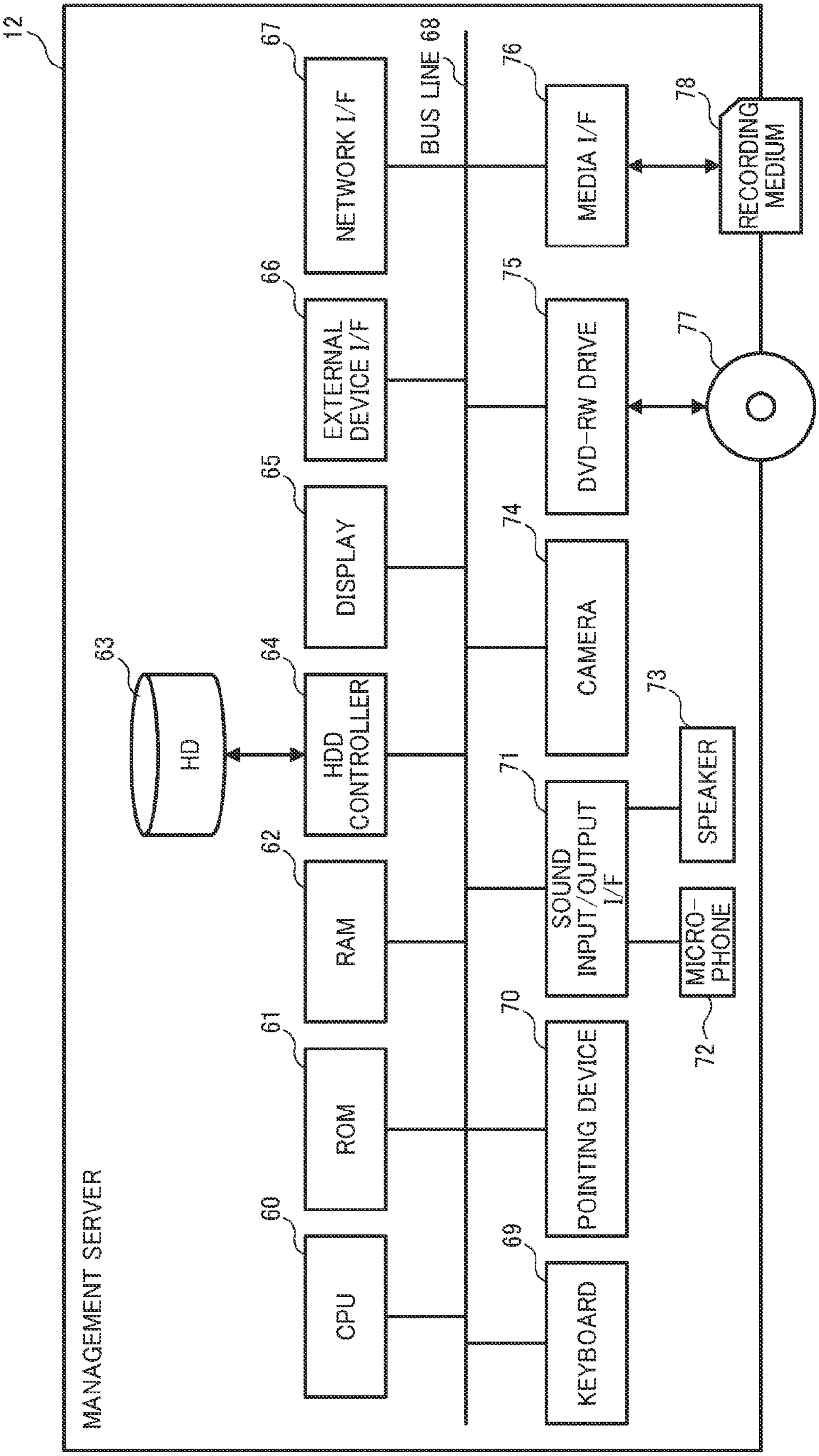
FIG. 4 a block diagram illustrating an example of a hardware configuration of a management server as a control system according to embodiments.

FIG. 4 is a block diagram illustrating an example of a hardware configuration of the management server 12. Since the communication terminal 14 has a similar hardware configuration to that of the management server 12, a description of the hardware configuration of the communication terminal 14 is omitted.

The management server 12 is implemented by a general-purpose computer. The management server 12 includes a CPU 60, a ROM 61, a RAM 62, an HD 63, an HDD controller 64, a display 65, an external device I/F 66, a network I/F 67, a bus line 68, a keyboard 69, a pointing device 70, a sound input/output I/F 71, a microphone 72, a speaker 73, a camera 74, a digital versatile disk rewriteable (DVD-RW) drive 75, and a media I/F 76.

The CPU 60 controls the entire operation of the management server 12. The ROM 61 stores a program such as an initial program loader (IPL) to boot the CPU 60. The RAM 62 provides a work area for the CPU 60. The HD 63 stores various data such as programs. The HDD controller 64 controls reading or writing of data from and to the HD 63 under the control of the CPU 60. The display 65 displays various information such as a cursor, a menu, a window, text, and an image. In one example, the display 65 is a touch panel display provided with an input device. The display 65 may be an external device having a display function such as an electronic whiteboard or an interactive white board (IWB). Alternatively, the display 65 may be a planar portion (for example, a ceiling or a wall of a management site, or a windshield of an automobile) onto which an image from a projector or a head-up display (HUD) is projected.

The external device I/F 66 is an interface for connection with various external devices. The network I/F 67 is an interface for data communication through the communication network 13. The bus line 68 is, for example, an address bus or a data bus for electrically connecting each component such as the CPU 60.

The keyboard 69 is one example of an input device including multiple keys for inputting characters, numerals, or various instructions. The pointing device 70 is an example of an input device that allows a user to select or execute various instructions, select an item for processing, or move a cursor being displayed. The input devices are not limited to the keyboard 69 and the pointing device 70, but include a touch panel and a voice input device. The sound input/output I/F 71 is a circuit that processes input and output of sound signals between the microphone 72 and the speaker 73 under the control of the CPU 60. The microphone 72 is an example of a built-in sound collecting device that receives an input of sound. The speaker 73 is an example of a built-in output device to output a sound signal.

The camera 74 is an example of a built-in image capturing device for capturing an image of a subject to obtain image data. The microphone 72, the speaker 73, and the camera 74 may be external devices not built-in devices of the management server 12. The DVD-RW drive 75 controls reading or writing of various types of data from or to a DVD-RW 77 as an example of a removable recording medium. The removable recording media are not limited to the DVD-RW 77, but may be a DVD-recordable (DVD-R) or a BLU-RAY disc. The media I/F 76 controls reading or writing of data from or to a recording medium 78 such as a flash memory.

Figure 5:
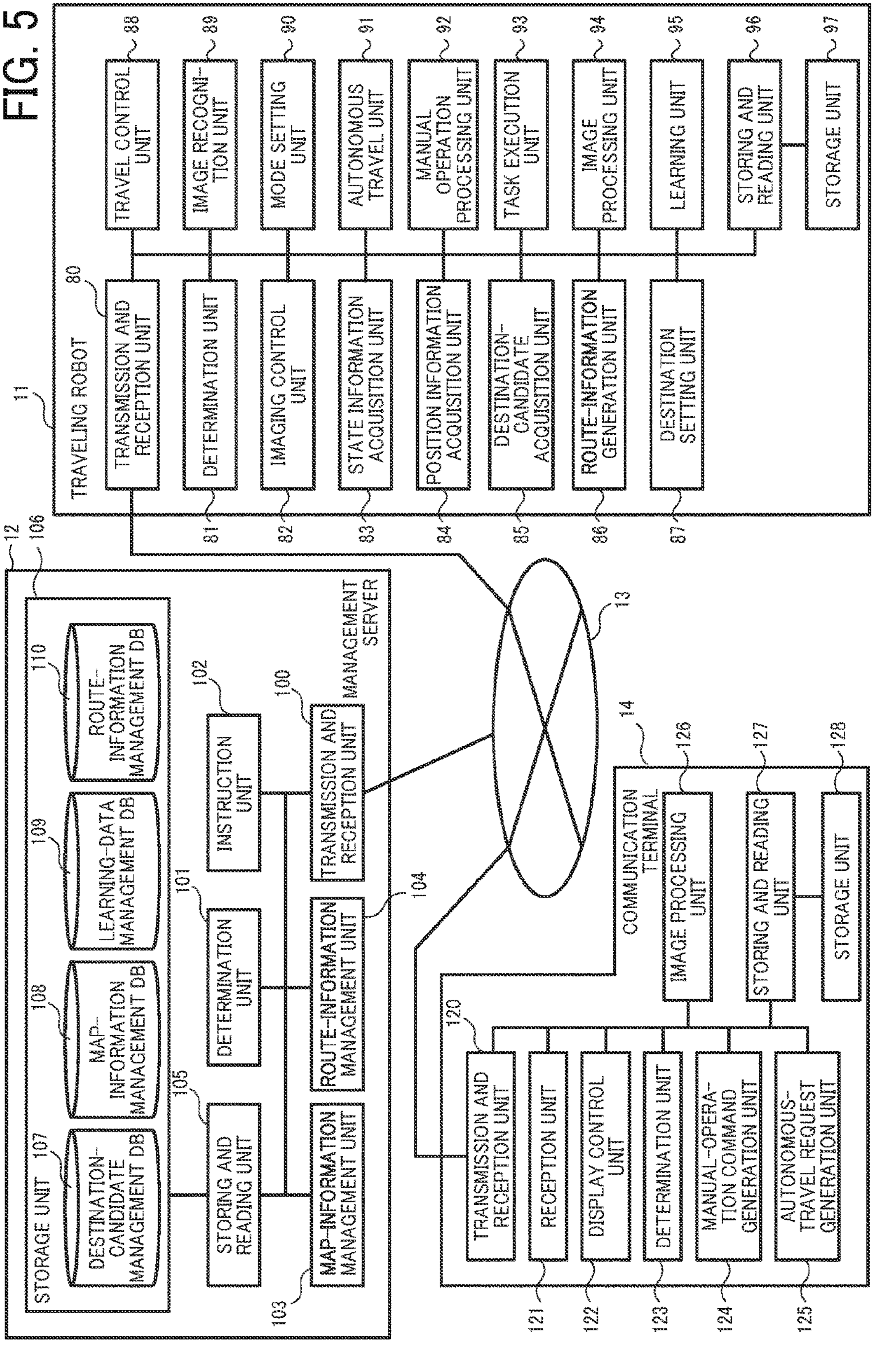
FIG. 5 is a block diagram illustrating an example of functional configurations of the traveling robot, the management server, and a communication terminal according to the first embodiment.

FIG. 5 is a block diagram illustrating an example of functional configurations of the traveling robot 11, the management server 12, and the communication terminal 14. The functions of the traveling robot 11, the functions of the management server 12, and the functions of the communication terminal 14 can be implemented by one or more processing circuits. Storage units 97, 106, and 128 are implemented by memories such as the HD 34 (FIG. 3) and the HD 63 (FIG. 4). Here, the term "processing circuit or circuitry" includes a programmed processor to execute each function by software, such as a processor implemented by an electronic circuit, and devices, such as an application specific integrated circuit (ASIC), a digital signal processor (DSP), a field programmable gate array (FPGA), and conventional circuit modules arranged to perform the recited functions.

The traveling robot 11 includes the controller 20. The controller 20 includes, as functional units, a transmission and reception unit 80, a determination unit 81, an imaging control unit 82, a state information acquisition unit 83, a position information acquisition unit 84, a destination-candidate acquisition unit 85, and a route-information generation unit 86. The controller 20 further includes a destination setting unit 87, a travel control unit 88, an image recognition unit 89, a mode setting unit 90, an autonomous travel unit 91, a manual operation processing unit 92, a task execution unit 93, an image processing unit 94, a learning unit 95, a storing and reading unit 96, and the storage unit 97.

The transmission and reception unit 80, serving as transmission means (transmission unit) and reception means (reception unit), transmits and receives various data and information to and from other devices such as the management server 12 and the communication terminal 14 via the communication network 13.

The determination unit 81, serving as determination means, performs various determinations. The imaging control unit 82 controls an image capturing process performed by the imaging device 22. The imaging control unit 82 sets a PTZ setting value for the imaging device 22 and instructs the imaging device 22 to perform the image capturing process.

The state information acquisition unit 83, serving as state information acquisition means, acquires information on a state of the traveling robot 11 and information on a state of the surroundings from various sensors including the image sensor of the imaging device 22. The state information acquisition unit 83 acquires optical information (image data) as state information from the image sensor of the imaging device 22. The state information acquisition unit 83 acquires, as state information, distance data indicating a measured distance to an object (obstacle) present around the traveling robot 11, from an obstacle detection sensor. The state information acquisition unit 83 acquires, as state information, the direction in which the traveling robot 11 faces, from the acceleration and orientation sensor 48. The state information acquisition unit 83 acquires, as state information, a gas concentration from the gas sensor. The determination unit 81 can determine whether or not there is an abnormality in the surroundings based on the state information acquired by the state information acquisition unit 83.

The position information acquisition unit 84 acquires position information indicating the current position of the traveling robot 11 using the GPS sensor 49. The position information is coordinate information indicating the latitude and the longitude of the current position of the traveling robot 11.

The destination-candidate acquisition unit 85 acquires an image of a destination-candidate, which indicates a candidate of destination of the traveling robot 11. The destination-candidate acquisition unit 85 acquires the captured image acquired by the imaging control unit 82 as the image of the destination-candidate.

The route-information generation unit 86 generates route information (route data) indicating a route on which the traveling robot 11 travels (travel route). The route-information generation unit 86 generates route information indicating a route from the current position to the final destination, based on the position of the destination-candidate selected by the operator of the traveling robot 11. Example methods of generating the route information include a method of connecting waypoints from the current position to the final destination with a straight line, and a method of generating a route for avoiding an obstacle while minimizing the travel time, using the information on the obstacle obtained by the state information acquisition unit 83. The waypoint is a freely-selected point on the route from the traveling start position to the final destination.

The destination setting unit 87 sets the destination of the traveling robot 11. For example, based on the current position of the traveling robot 11 acquired by the position information acquisition unit 84 and the route information generated by the route-information generation unit 86, the destination setting unit 87 sets one of destination candidates selected by the operator of the traveling robot 11, as the traveling destination to which the traveling robot 11 is to travel.

The travel control unit 88 drives the moving mechanism 24, to control the traveling of the traveling robot 11. For example, the travel control unit 88 controls the traveling robot 11 to travel in response to a drive instruction from the autonomous travel unit 91 or the manual operation processing unit 92.

The image recognition unit 89 performs image recognition on a captured image acquired by the imaging control unit 82. For example, the image recognition unit 89 performs image recognition to determine whether or not a specific subject is captured in the acquired captured image. The specific subject is, for example, an obstacle on or around the travel route of the traveling robot 11, an intersection such as a crossroad or an L-shaped road, or a sign or a signal at the site.

The mode setting unit 90 sets an operation mode indicating an operation of moving the traveling robot 11. The mode setting unit 90 sets either an autonomous travel mode in which the traveling robot 11 autonomously travels or a manual travel mode in which the traveling robot 11 travels according to manual operation of the operator.

The autonomous travel unit 91 controls autonomous travel processing of the traveling robot 11. For example, the autonomous travel unit 91 outputs an instruction to the travel control unit 88 for driving the traveling robot 11 such that the traveling robot 11 travels on the travel route indicated by the route information generated by the route-information generation unit 86.

The manual operation processing unit 92 controls manual operation processing of the traveling robot 11. For example, the manual operation processing unit 92 outputs an instruction to the travel control unit 88 for driving the traveling robot 11 in response to a manual operation command transmitted from the communication terminal 14.

The task execution unit 93 controls the traveling robot 11 to execute a predetermined task in response to a request from the operator. The predetermined task is, for example, capturing images for inspection of equipment at the site. When the traveling robot 11 includes a movable arm, the predetermined task can include light work by the movable arm.

The image processing unit 94 generates an image to be displayed on the communication terminal 14. For example, the image processing unit 94 performs processing on the captured image acquired by the imaging control unit 82, to generate an image to be displayed.

The learning unit 95 learns a travel route for autonomous travel of the traveling robot 11. For example, the learning unit 95 performs machine learning of the travel routes for autonomous travel, based on the captured images acquired through travel operation in a manual operation mode by the manual operation processing unit 92 and the detection data obtained by the state information acquisition unit 83. The autonomous travel unit 91 performs autonomous travel of the traveling robot 11 based on learning data, which is a result of machine learning by the learning unit 95.

The storing and reading unit 96 stores various types of data in the storage unit 97 and reads out various types of data from the storage unit 97. The storage unit 97 stores various types of data under control of the storing and reading unit 96.

The traveling of the traveling robot 11 is controlled by the management server 12 based on the route information (waypoint information). The waypoint information is point information on a route (coordinate information represented by latitude and longitude). The traveling of the traveling robot 11 is controlled so as to sequentially trace the waypoint information. Image capturing by the imaging device 22 is controlled based on the position data and the PTZ information.

When the traveling robot 11 reaches an image capturing position according to the position data, the image capturing is performed by setting the setting value of the PTZ information in the imaging device 22. When image capturing is performed, the traveling robot 11 may keep moving or temporarily stop at the image capturing position.

The management server 12 includes, as functional units, a transmission and reception unit 100, a determination unit 101, an instruction unit 102, a map-information management unit 103, a route-information management unit 104, a storing and reading unit 105, and the storage unit 106.

The transmission and reception unit 100, serving as transmission means and reception means, receives a captured image, a sensor detection result, or the like acquired by the traveling robot 11, and transmits an instruction to the traveling robot 11. The transmission and reception unit 100 transmits a captured image, a sensor detection result, and the like to the communication terminal 14.

The storage unit 106 includes a destination-candidate management DB 107, a map-information management DB 108, a learning-data management DB 109, and a route-information management DB 110. The destination-candidate management DB 107 stores destination-candidate data acquired by the destination-candidate acquisition unit 85 of the traveling robot 11. The destination-candidate data stored in the destination-candidate management table associates, for each site identifier (ID) for identifying a site where the traveling robot 11 is disposed, a candidate ID for identifying a destination-candidate, the position information indicating the position of the destination-candidate, and a captured image obtained by capturing a specific area of the site as the destination-candidate. The position information is coordinate information indicating the latitude and the longitude of the position of the destination-candidate at the site. The destination-candidate of the traveling robot 11 includes not only candidates of destination of the traveling robot 11 but also candidates of place to be excluded from the travel route of the traveling robot 11.

The map-information management DB 108 stores map information using a map-information management table. The map information is map information of an environment map of the site where the traveling robot 11 is installed. In the map-information management table, a site ID for identifying the site where the traveling robot 11 is installed, a site name, and a storage location of an environment map of the site are stored in association with each other. The map-information management unit 103 manages map information of the site where the traveling robot 11 is installed by using the map-information management DB 108.

The learning-data management DB 109 stores the learning-data using a learning-data management table. The learning data is the result of learning of the autonomous travel route by the learning unit 95 of the traveling robot 11. In the learning-data management table, captured images, sensor detection results, and the like acquired from the traveling robot 11 are accumulated, and the result of machine learning is stored as learning data for each site or each traveling robot 11. These DBs are in the storage unit 106 of the management server 12, but the location is not limited thereto. These DBs may be in the traveling robot 11.

The route-information management DB 110 stores route information indicating a travel route of the traveling robot 11, using a route-information management table. The route-information management DB 110 stores, for each site ID identifying a site where the traveling robot 11 is installed, a route ID identifying a travel route of the traveling robot 11 and route information indicating the travel route of the traveling robot 11 in association with each other. The route information indicates the travel route of the traveling robot 11 for reaching next destinations one by one in order. The route information is generated by the route-information generation unit 86 when the traveling robot 11 starts traveling. Specifically, the route-information generation unit 86 generates route information for normal conditions and route information route information for abnormal situation). The route-information management DB 110 is in the storage unit 106 of the management server 12 in this example, but the location is not limited thereto, and may be in the traveling robot 11. The route-information management unit 104 manages rout information by using the rout-information management DB 110.

The determination unit 101, serving as determination means, determines whether or not there is an abnormality in the state of the monitored object based on the captured image, the sensor detection result, or the like acquired from the traveling robot 11. The storage unit 106 also stores a criterion for determining the presence or absence of an abnormality. Therefore, the determination unit 101 determines the presence or absence of an abnormality based on the determination criterion stored in the storage unit 106. For example, when a flowmeter to measure a flow rate of a liquid is set as a monitored object, whether or not the flow rate is within a predetermined range is set as a determination criterion. In a case where the determination criterion is set such that the predetermined range of normal flow rate is 2 to 10 ml/s, when the flowmeter indicates 0 ml/s, the determination unit 101 determines that there is an abnormality. The determination criterion is not limited to the example described above. In addition, the information processing system 10 may further include an extraction unit to extract the flow rate to be determined from the captured image. The extraction unit extracts the flow rate from the position of the meter needle using a known image recognition technology. Image recognition technologies are well known in the art and are not described in detail.

The instruction unit 102, serving as an instruction means, gives instructions to the traveling robot 11. The instruction unit 102 instructs, via the transmission and reception unit 100, the traveling robot 11 to detect the states of the monitored objects, following the route for normal conditions (the first route). For example, the instruction unit 102 gives an instruction to follow the route for normal conditions and capture an image of the monitored object while traveling. For example, under normal conditions, the traveling robot 11 can be controlled to follow a route for capturing an image of an indicator of a measuring instrument such as a flowmeter.

When the determination unit 101 determines that there is an abnormality, the instruction unit 102 instructs the traveling robot 11 to switch the route for normal conditions to the route at the occurrence of abnormality (hereinafter "route for abnormal situation") as the second route and to detect the state of the designated portion related to the state of the monitored object. In other words, the instruction unit 102 gives, via the transmission and reception unit 100, an instruction to switch to the route for abnormal situation and to capture an image of the designated location. At this time, the instruction unit 102 can instruct the traveling robot 11 to record sound as well as capturing an image of the monitored object or the designated portion by the imaging device 22. The designated portion is another object in the site different from the monitored object. The monitored object is a subject of image capturing whose image is captured when the traveling robot 11 follows the route for normal conditions. When the flow rate has an abnormality, there is a possibility that an abnormality has occurred in the opening and closing of the valve or the pump. In this case, the route can be changed to the route for the traveling robot 11 to capture an image of the valve and to record the operation sound of the pump. The route for normal conditions and the route for abnormal situation are not limited to these examples.

The transmission and reception unit 100 receives a captured image, a sensor detection result, and the like from the traveling robot 11 and transmits the received information to the communication terminal 14.

The communication terminal 14 is installed in the management site and operated by an operator. The communication terminal 14 includes, as functional units, a transmission and reception unit 120, a reception unit 121, a display control unit 122, a determination unit 123, a manual-operation command generation unit 124, an autonomous-travel request generation unit 125, an image processing unit 126, a storing and reading unit 127, and the storage unit 128.

The transmission and reception unit 120 transmits and receives various data or information to and from the traveling robot 11 and the management server 12. The reception unit 121 receives various selections and inputs from the operator. The display control unit 122 displays various screens on a display. An image captured by the traveling robot 11, a detection result detected by the sensor, and the like are displayed on the display. The determination unit 123 performs various determinations.

The manual-operation command generation unit 124 generates a manual operation command for moving the traveling robot 11 by a manual operation in accordance with an input operation of the operator. The autonomous-travel request generation unit 125 generates an autonomous travel request for causing the traveling robot 11 to autonomously travel. For example, the autonomous-travel request generation unit 125 generates an autonomous travel request to be transmitted to the traveling robot 11, based on information on the destination-candidate selected by the operator.

The image processing unit 126 generates a display image to be displayed on the display. For example, the image processing unit 126 performs processing on an image captured by the imaging device 22 of the traveling robot 11 and generates a display image. Although the image processing unit is provided in both the traveling robot 11 and the communication terminal 14 in this example, alternatively, the image processing unit may be provided in one of the traveling robot 11 and the communication terminal 14.

The storing and reading unit 127 stores various data in the storage unit 128 and reads out various data from the storage unit 128.

When a monitored area is monitored using the traveling robot 11, an image captured by the traveling robot 11 is presented to the operator, so that the operator remotely controls the traveling robot 11 while checking the surrounding situation of the traveling robot 11 in real time. Using an image of an area in the site to be a destination-candidate, the area is registered in advance as the destination-candidate. Then, the destination of the traveling robot 11 is set using the destination-candidate, the traveling robot 11 is set in the autonomous travel mode, and the route information is generated. At this time, a travel route is generated such that the traveling robot 11 autonomously travels in the order in which the operator selects the captured images of the destinations. The method of generating route information is not limited to the example method described above.

A description is given in detail of the information processing system 10 that monitors a monitored object using the traveling robot 11 in a specific scene.

Figure 6:
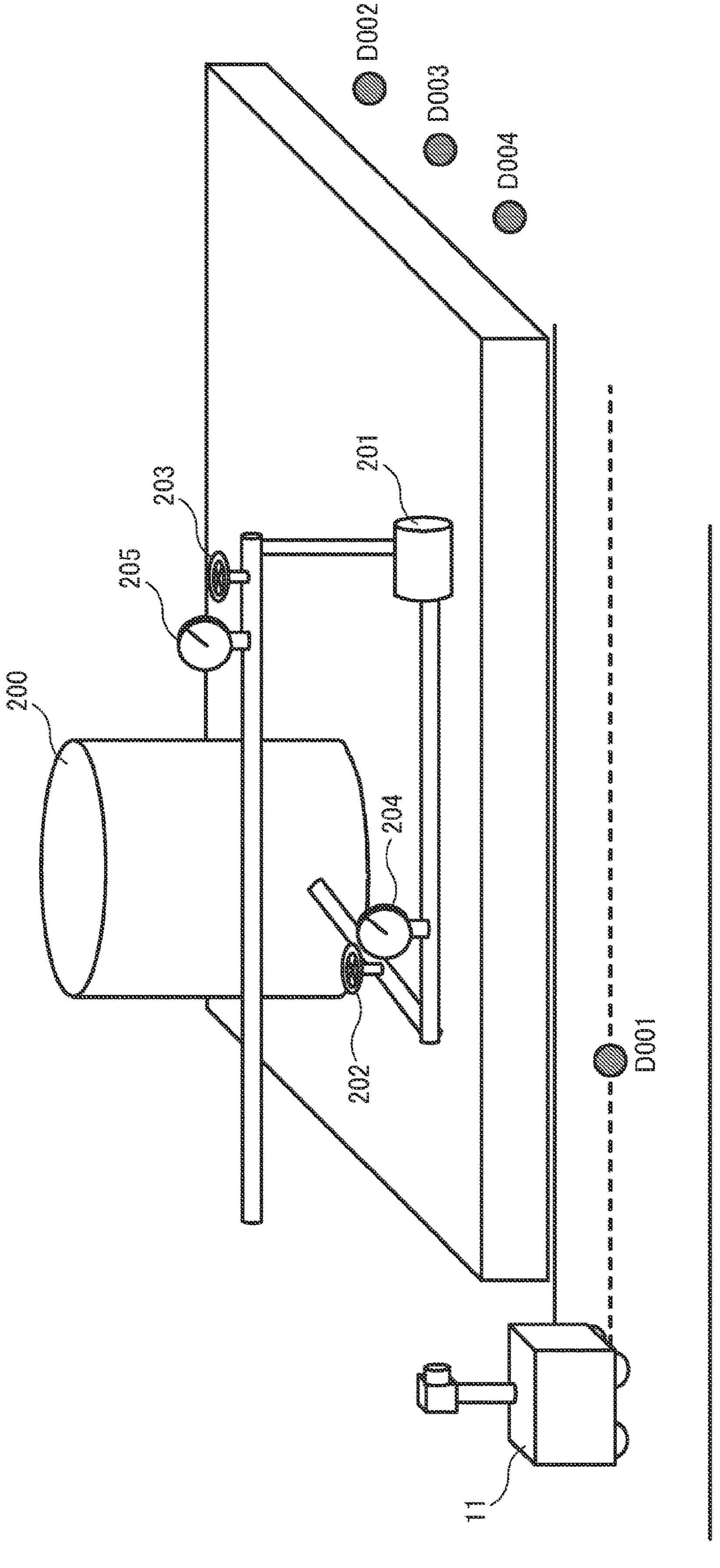
FIG. 6 is a diagram illustrating a first scene to which the information processing system according to embodiments is applied.

FIG. 6 is a diagram illustrating a first scene to which the information processing system 10 is applied. FIG. 6 is a diagram illustrating an inspection operation in a monitored area, such as, a chemical plant, by the traveling robot 11. The chemical plant includes a tank 200, a pump 201, valves 202 and 203, and flowmeters 204 and 205. The liquid flowing through the pipe is sucked by the pump 201 and discharged toward the tank 200. The flow rate of the liquid supplied to the pump 201 is measured by the flowmeter 204 and controlled by the valve 202.

The flowmeter 204 is set as an object to be inspected (inspection target). The traveling robot 11 travels in accordance with root data, to face the flowmeter 204 in order to capture an image of the flowmeter 204. The traveling robot 11 stops at an inspection point D001 facing the flowmeter 204, sets the setting value of the PTZ of the imaging device 22, and captures an image of the flowmeter 204.

In a case where the flow rate indicated by the flowmeter 204 is controlled in a range of 2 to 10 ml/s, the determination criterion is set such that the flow rate in this range is determined as normal and the flow rate outside this range is determined as abnormal. Therefore, the management server 12 extracts a numerical value indicating the flow rate from the image captured by the traveling robot 11 and determines whether or not there is an abnormality based on the determination criterion. When there is an abnormality, the occurrence of an error is reported to the communication terminal 14 and displayed. Accordingly, the operator at the management site can recognize that the flow rate indicated by the flowmeter 204 has an abnormality.

Described below are causes of abnormality conceivable from the information indicating the abnormality of the measurement value of the flowmeter 204.

(1) The flowmeter 204 malfunctions.
(2) Although the flowmeter 204 is working properly, the liquid does not flow in the pipe due to clogging somewhere.
(3) The flowmeter 204 is working properly but the nearby valve 202 is closed and there is no flow.
(4) The flowmeter 204 is working properly, but the nearby pump 201 malfunctions, thereby inhibiting the flow.

Therefore, the operation at the occurrence of abnormality for checking each abnormality is set in advance. When there is an abnormality, the traveling robot 11 follows the route for abnormal situation and captures an image with a designated set value of PTZ at a designated image capturing position.

To be more specific, at an inspection point D002, an image of the flowmeter 205 is captured in order to check clogging in a flow path upstream from the flowmeter 204. Next, in order to check whether or not the valves in the flow path are closed, an image of the valve 203 is captured at an inspection point D003 to check the opening and closing state of the valve 203. Next, in order to check whether there is an abnormality in the operation of the pump 201, the operation sound of the pump 201 is recorded at an inspection point D004. The traveling robot 11 travels to these points in this order and captures images. The captured images and collected sound are transmitted to the communication terminal 14 operated by the operator and played thereon. As a result, the operator can determine where the abnormality is present, and can quickly deals with the abnormality.

The candidates of destination are set and an autonomous travel route in the site is set, in order to travel on such a route and perform image capturing. The destination is a waypoint or an inspection point at which image capturing is performed.

Figure 7:
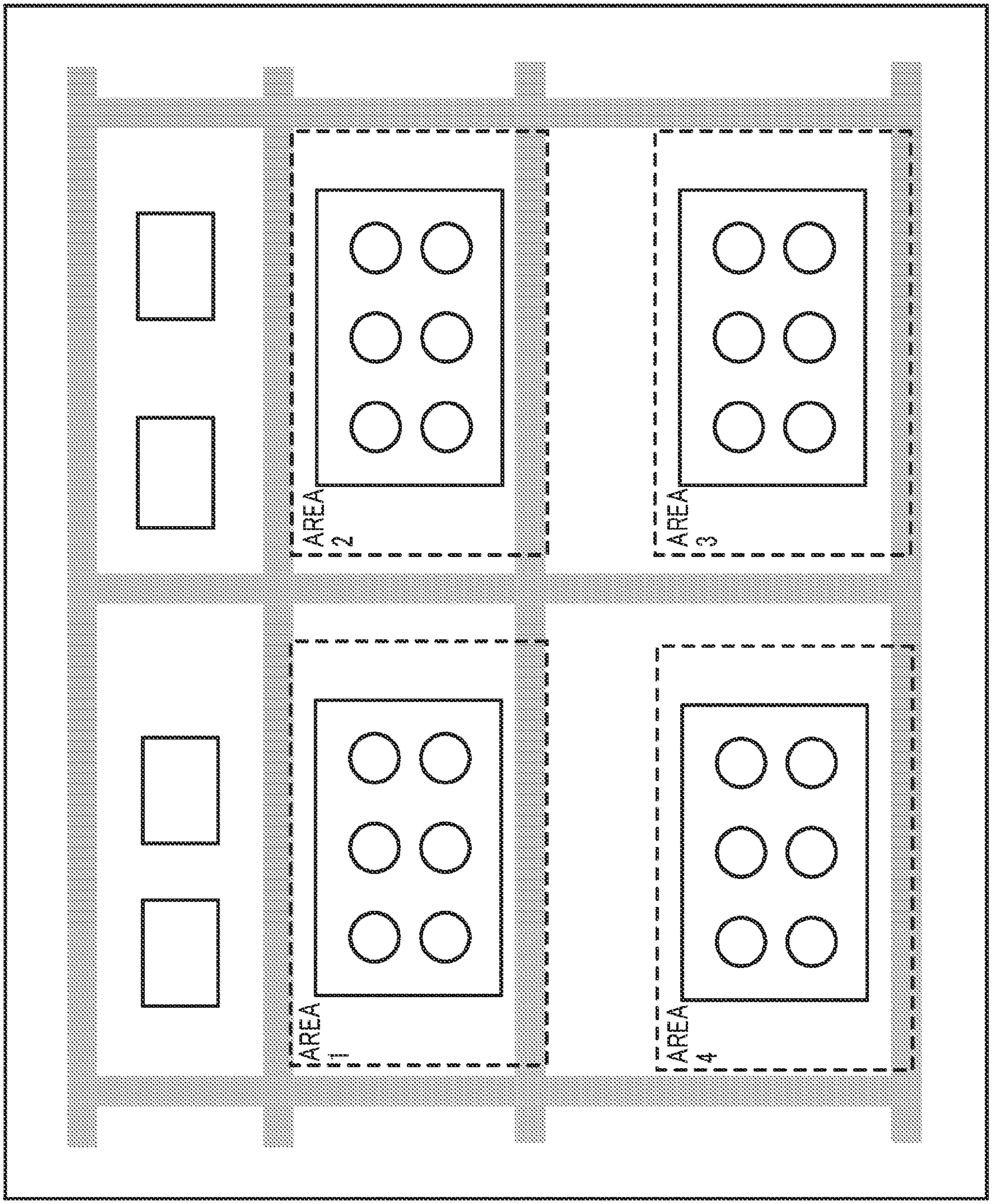
FIG. 7 is a diagram illustrating an operation of controlling the traveling robot to travel in a site and registering destination-candidates through which the traveling robot passes on an autonomous travel route, according to the first embodiment.

FIG. 7 is a diagram illustrating an operation of controlling the traveling robot 11 to travel in the site and registering destination-candidates (waypoints and inspection points) through which the traveling robot 11 passes on the autonomous travel route. The operator performs a predetermined input operation from the communication terminal 14 at the management site, starts an operation on the traveling robot 11, controls the traveling robot 11 to display the map information of the target site and start image capturing. The operator remotely controls the traveling robot 11 on the operation screen, and searches for a destination-candidate while checking the current position of the traveling robot 11 and viewing the images captured by the imaging device 22. Then, the operator registers the destination-candidate by pressing a destination-candidate registration button.

In the example illustrated in FIG. 7, the traveling robot 11 is controlled to travel each of four areas 1 to 4, and the operator looks for candidates of waypoints and inspection points. The found waypoints and inspection points are registered as destination-candidates.

Figure 8:
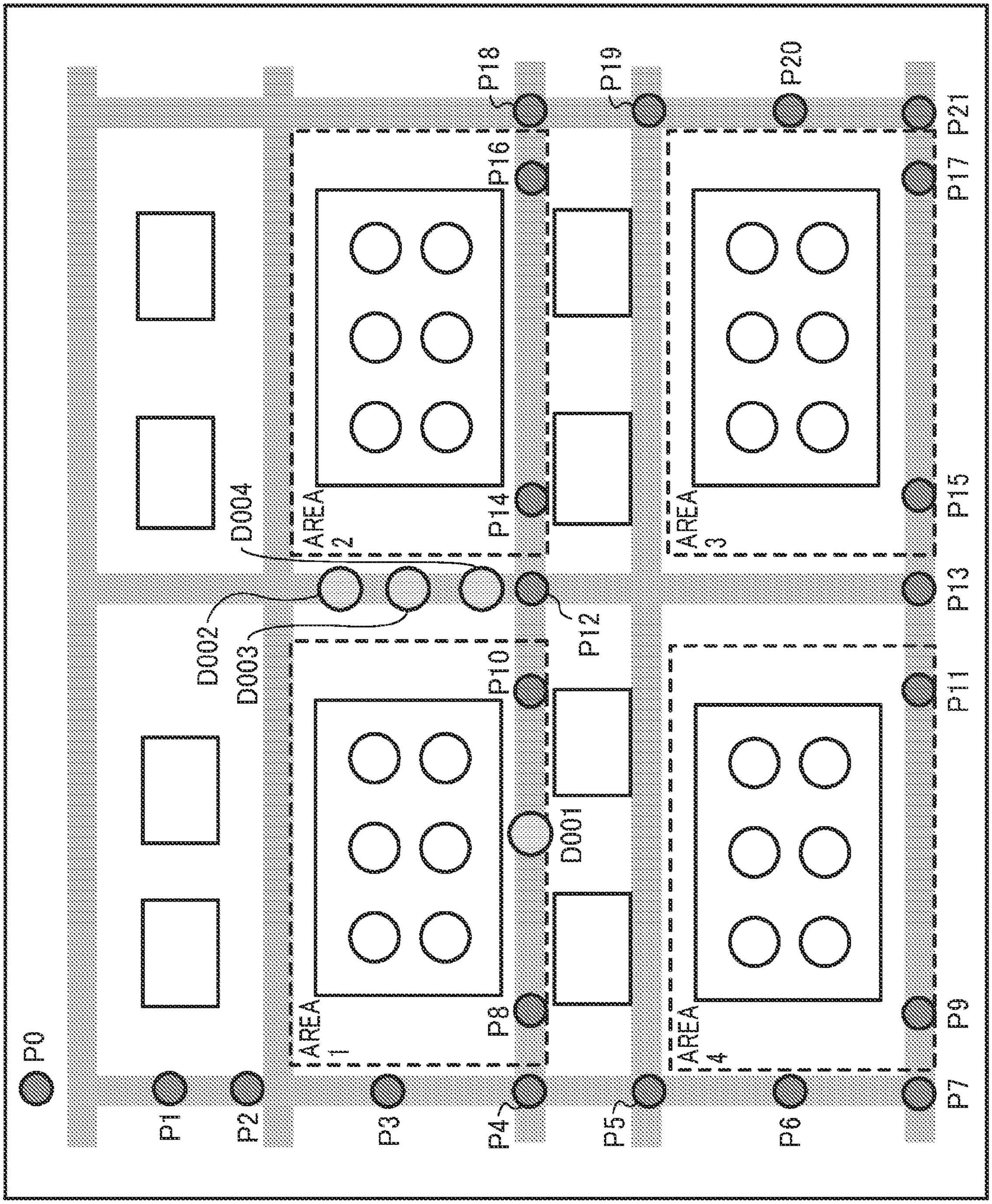
FIG. 8 is a diagram illustrating an example of waypoints and inspection points.

FIG. 8 is a diagram illustrating an example of waypoints and inspection points. In order to inspect the areas 1 to 4, waypoints P0 to P21 and the inspection points D001 to D004 are registered as the destination-candidates. The traveling robot 11 sets the waypoint P0 as the inspection start position and registers the waypoints P1 to P21 as the destination-candidates. The inspection point D001 is registered as a destination-candidate as an inspection point in the area 1. In addition, the inspection points D002 to D004 are registered as locations whose images are to be captured at the occurrence of abnormality.

Accordingly, in the inspection of the area 1 under normal conditions, the inspection point D001 is registered in order to capture an image of the flowmeter 204. When there is an abnormality in the flow rate indicated by the flowmeter 204, images of other flowmeters and valves can be captured at the inspection points D002 to D004 which are not captured in the normal inspection, and the operation sound of the pump can be stored.

FIG. 9 is a diagram illustrating an example of a waypoint management table. The waypoint management table stores positional information (latitude and longitude) as waypoint information, a point ID for identifying a point, and a file name of image data of a captured image in association with each other. The point ID is a number or code freely assigned at each registration. The position information represents the latitude and the longitude of the traveling robot 11 measured by the GPS sensor 49. Instead of the file name, any information that identifies the image data can be used.

FIG. 10 is a diagram illustrating an example of an inspection target management table. The inspection target management table stores, for each inspection target, an inspection target ID, a name of the inspection target, and position information in association with each other.

Similar to the point ID, the inspection target ID is a number or code freely assigned at each registration. The position information represents the latitude the longitude of the traveling robot 11 measured by the GPS sensor 49. The name is information identifying the inspection target such as "meter 1," "meter 2," "valve 1," or "pump 1."

In addition to the items such as name described above, the inspection target management table further stores an operation (inspection operation) to be executed at the time of inspection, settings of the inspection operation, and the like in association with each other. The inspection operation includes, for example, image capturing and acquisition of sound sensor information (operation sound or the like). When the inspection operation is image capturing, the settings include, for example, pan, tilt, and zoom settings. When the inspection operation is acquisition of sound sensor information, the settings include sensor settings such as a setting value set for the sound sensor to collect the operation sound.

FIG. 11 is a diagram illustrating an example of a route-information management table. To generate the route information, images among the information stored in the destination-candidate management table is presented to the operator, receives selection of the image by the operator to set a route. The route information includes data in which waypoints and inspection points are arranged in the order of traveling by the traveling robot 11. In the route-information management table, a route ID is freely assigned each time route data is registered. The route ID and the route data are also associated with an area ID identifying an area to be inspected.

The route data associated with the route ID "R001" indicates an inspection route for normal conditions. The route information "R001" indicates that inspection is performed at the inspection point D001 in the way from the waypoint P8 to the waypoint P10, and, if there is no abnormality, the traveling robot 11 returns to the waypoint P8 and to the waypoint P0 which is the inspection start position. When the inspection point is included in the route data, the inspection target management table is referred to, the inspection operation and the settings are read out, and the inspection operation is executed with the settings.

When there is an abnormality in the inspection operation at the inspection point D001, the traveling robot 11 is controlled to travel according to the route for abnormal situation instead of the route data associated with the designated route ID, and the inspection operation of the designated point is executed. As described above, the first route and the second route may partially overlap with each other. The first route and the second route may be different from each other only in one or both of the start point and the end point. Further, even if the start point, the passing points, and the end point in the entire route are common between the first route and the second route, when the inspection targets are different between the first route and the second route, the second route is considered as being different from the first route.

When an abnormality is detected in the flow rate indicated by the meter 1 from an image of the meter 1 captured by the imaging device 22 at the inspection point D001, the route is switched from the route for normal conditions (returning from the waypoint P10 to the waypoint P8) to the route for abnormal situation. The route for abnormal situation includes the image capturing points for capturing images of the meter 2, the valve 1, and the pump 1. For capturing images of the meters 2, the valves 1, and the pumps 1, the route for abnormal situation includes the inspection points D002, D003, and D004. The traveling robot 11 may stop at the inspection point D004 or may return to the route for normal conditions via the waypoint P10.

Figure 12:
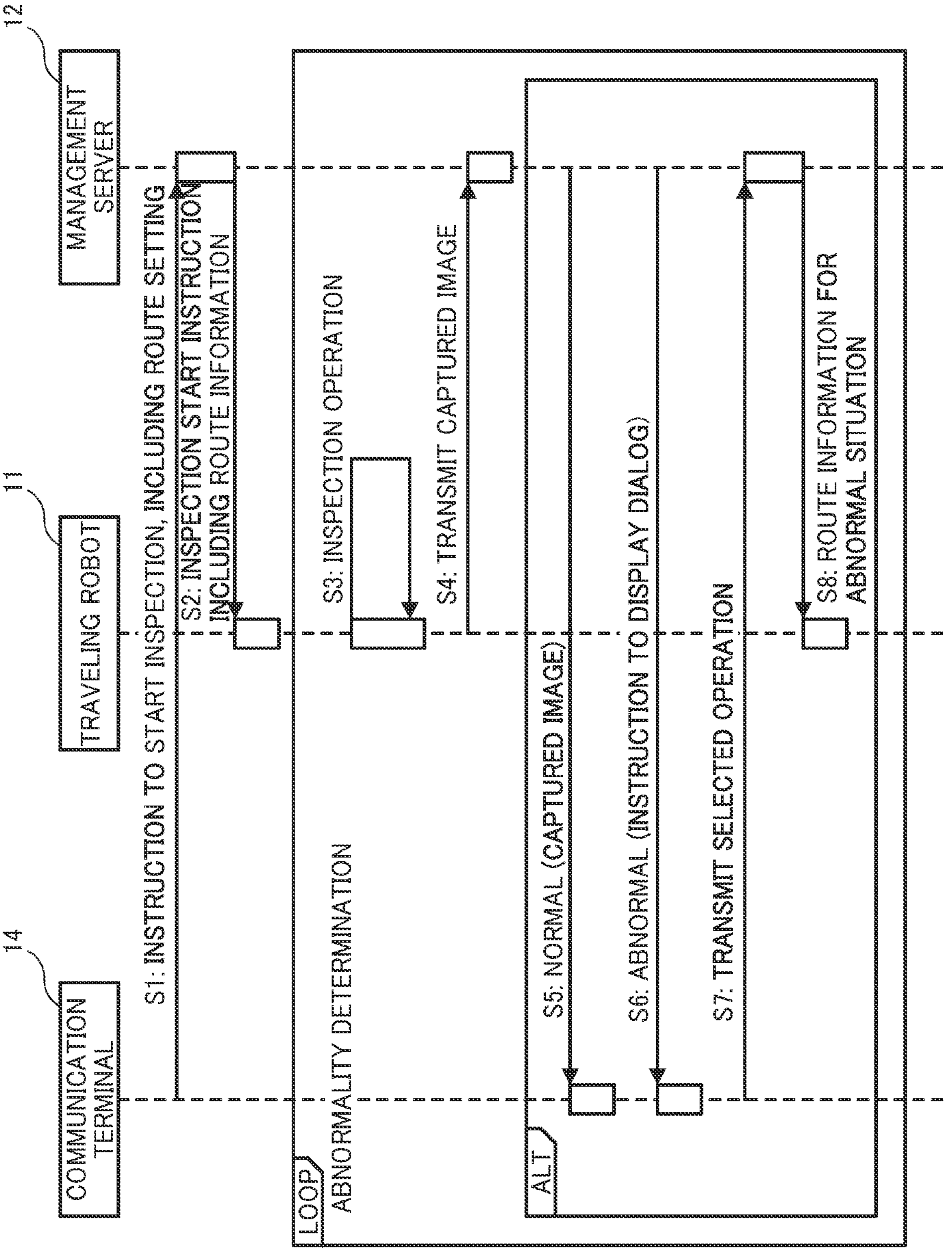
FIG. 12 is a sequence diagram illustrating an example of a process executed by the information processing system according to the first embodiment.

FIG. 12 is a sequence diagram illustrating an example of a process executed by the information processing system 10. The operator operates the communication terminal 14 to set a route and instruct the start of inspection. The communication terminal 14 transmits, to the management server 12, an instruction including information on the set route, to start inspection (S1). The management server 12 transmits an inspection start instruction to the traveling robot 11 together with the route information managed by the route-information management table (S2). The traveling robot 11 receives the instruction from the management server 12 and starts an inspection operation (S3).

The traveling robot 11 travels on the route instructed by the management server 12 and performs the inspection operation at the designated inspection point. Each time the traveling robot 11 captures an image at an inspection point, the traveling robot 11 transmits the captured image to the management server 12 (S4). The management server 12 determines whether the inspection target is normal or abnormal based on the captured image and the determination criterion. When the inspection target is determined as normal, the management server 12 transmits the captured image as a result to the communication terminal 14 and causes the communication terminal 14 to display the captured image (S5). On the other hand, when the inspection target is determined as having an abnormality, the management server 12 notifies the communication terminal 14 that there is an abnormality and causes the communication terminal 14 to display a dialog for selecting an operation (S6).

The communication terminal 14 receives, from the operator, selection of an operation on the displayed dialog (S7). When receiving the selection of operation on the route for abnormal situation, the communication terminal 14 transmits, to the management server 12, an instruction to perform the inspection operation on the route for abnormal situation. Receiving the instruction, the management server 12 transmits, to the traveling robot 11, the route information for abnormal situation and an instruction to execute the inspection operation at the occurrence of abnormality (S8).

When there is an abnormality in the flow rate (read value) indicated by the meter 1, the traveling robot 11 is instructed to capture an image of the meter 2 to check the clogging in the way upstream from the meter 1. Next, in order to check whether or not the valve 1 on the route is closed, an image indicating the opening and closing state of the valve 2 is captured. Next, in order to check whether there is an abnormality in the operation of the pump 1, the operation sound of the pump 1 is recorded.

In the above-described inspection operation (image capturing at the designated inspection points) executed on the route for abnormal situation, for example, the abnormality is detected because the valve 1 is closed and clogging occurs. In this case, even if the cause is not found from the captured image of the meter 2, the cause of the abnormality can be identified by capturing an image indicating the opening and closing state of the next valve 1. When there is a plurality of points to be inspected at the occurrence of abnormality, each inspection portion can be inspected in order. At this time, as a first method for identifying the cause of the abnormality, the inspection operation is ended when the cause of the abnormality is identified. As a second method for identifying the cause of the abnormality, the inspection operation is continued till all of the plurality of inspection points is inspected.

Figure 13:
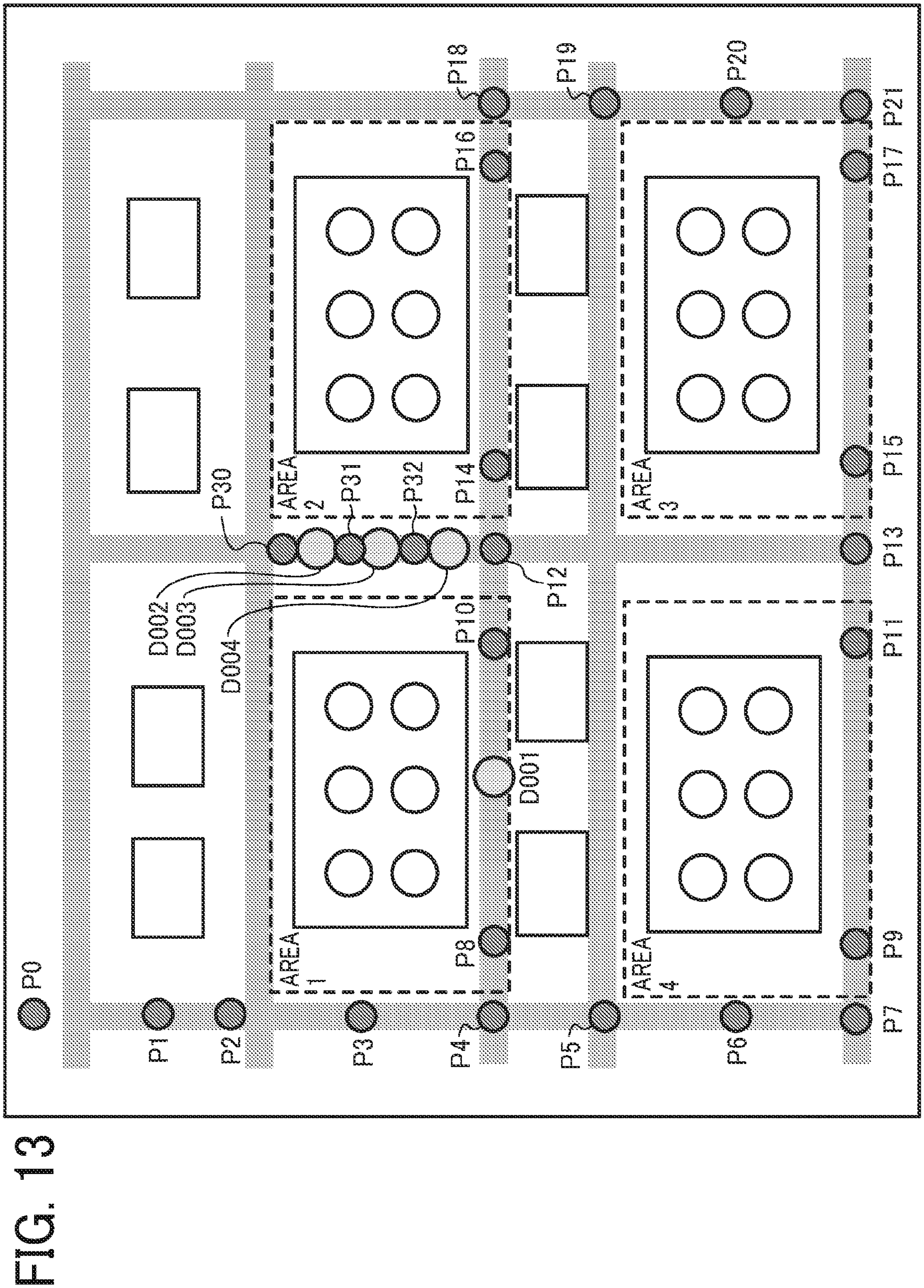
FIG. 13 is a diagram illustrating an inspection operation for abnormal situation performed at a designated inspection point on a route for abnormal situation, according to the first embodiment.

The first method for identifying the cause of the abnormality will be described in detail. FIG. 13 is a diagram illustrating an inspection operation performed when the presence of abnormality at an inspection point in the area 1 is detected. Specifically, the route is switched to a route for abnormal situation, and inspection is performed at a designated inspection point. The route for normal conditions is a route for proceeding from the waypoint P8 to the waypoint P10 via the inspection point D001 and returning from the waypoint P10 to the waypoint P8. In this example, an abnormality is detected from the inspection performed at the inspection point D001, and the route is switched to the route for abnormal situation.

The route for abnormal situation is planned to perform the inspection at the inspection points D002, D003, and D004 in order. In the first method, when the cause of the abnormality is identified in the middle of the inspection, the subsequent inspection is omitted. Therefore, waypoints P30, P31, and P32 are provided so that the inspection can be performed at each of the inspection points D002, D003, and D004.

Figure 14:
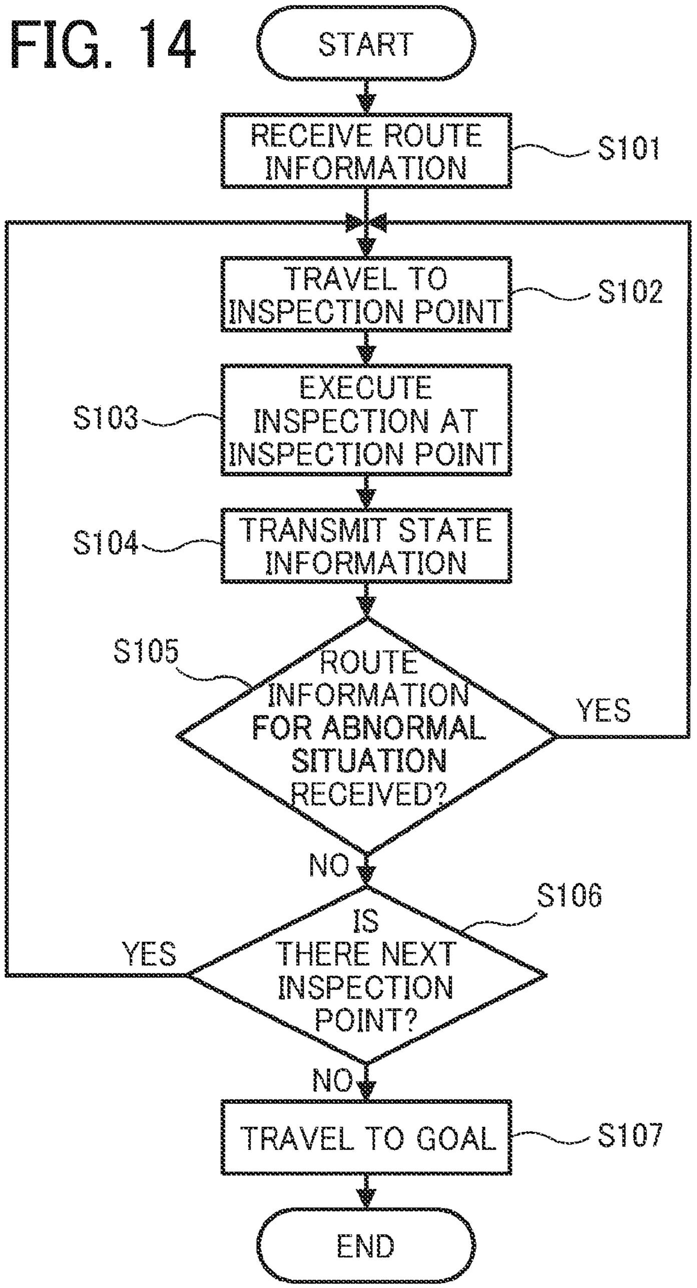
FIG. 14 is a flowchart illustrating an example of a process performed by the traveling robot in the inspection operation using a first method.

FIG. 14 is a flowchart illustrating an example of a process performed by the traveling robot 11 in the inspection operation using the first method. The traveling robot 11 is set at a position where the inspection operation is started, and the inspection is started. In step S101, the traveling robot 11 receives the route information for normal conditions from the management server 12 and an instruction to travel on the route for normal conditions. In step S102, the traveling robot 11 travels to the inspection point based on the route information. In step S103, the traveling robot 11 executes an inspection operation at the inspection point. The inspection operation is image capturing of an inspection target or the like. In step S104, the traveling robot 11 transmits the acquired state information such as the captured image to the management server 12.

In step S105, the traveling robot 11 determines whether or not the route information for abnormal situation is received from the management server 12. When receiving the route information for abnormal situation, the process returns to step S102, and the traveling robot 11 travels on the route for abnormal situation based on the route information.

When it is determined in step S105 that the route information for abnormal situation is not received, the process proceeds to step S106 to determine whether or not there is a next inspection point. When there is a next inspection point, the process returns to step S102 to move to the next inspection point. When it is determined in step S106 that there is no next inspection point, in step S107, the traveling robot 11 travels to the end point (goal). The traveling robot 11 notifies the management server 12 of the arrival at the goal and ends the inspection operation.

Figure 15:
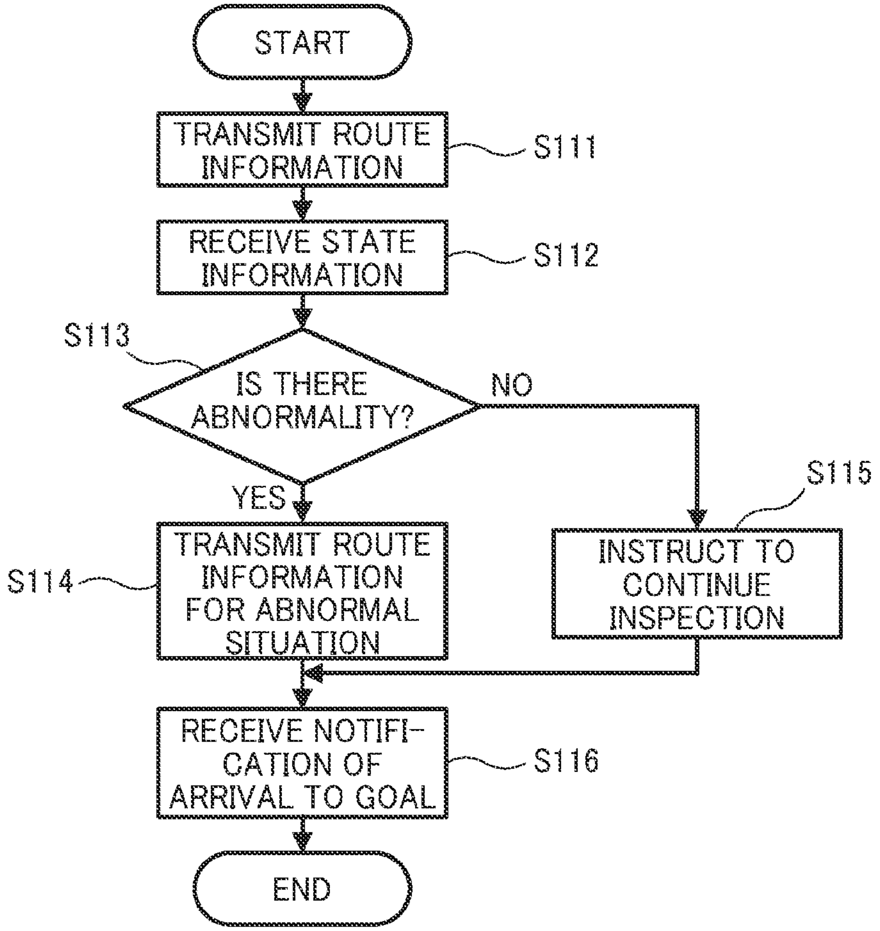
FIG. 15 is a flowchart illustrating an example of a process performed by the management server in the inspection operation using the first method.

FIG. 15 is a flowchart illustrating an example of a process performed by the management server 12 in the inspection operation using the first method. In step S111, the management server 12 transmits the route information for normal conditions to the traveling robot 11 and instructs the traveling robot 11 to travel on the route for normal conditions. In step S112, the management server 12 receives state information from the traveling robot 11.

In step S113, the management server 12 determines whether or not there is an abnormality in the inspection target based on the received state information and the determination criterion. For example, the inspection target is a read value of the meter 1. When determining that there is an abnormality, in step S114, the management server 12 transmits, to the traveling robot 11, the route information for abnormal situation and an instruction to travel on the route for abnormal situation. On the other hand, when determining that there is no abnormality, in step S115, the management server 12 instructs the traveling robot 11 to continue the inspection operation.

In step S116, the management server 12 receives, from the traveling robot 11, the notification that the traveling robot 11 has arrived at the goal and ends the inspection.

FIG. 16 is a diagram illustrating an example of an abnormality information table for determining whether or not there is an abnormality in an inspection target. The items of the abnormality information table include an inspection point, area information, a captured image, and a detection result, which are stored in association with an abnormality ID identifying the abnormality. The abnormality ID is associated with items "A. gas concentration," "B. image comparison," "C. temperature." "D. laser imaging detection and ranging (LIDAR, a sensor that measures a distance to a remote object or the shape thereof)," "determination criterion," and "operation." In the item "determination criterion," among the items "A. gas concentration," "B. image comparison," "C. temperature," and "D. LIDAR," a criterion that the degree of matching is low as a result of "B. image comparison," a criterion "A and C" that both the gas concentration and the temperature are out of set ranges, and the like are determined in advance, and the management server 12 can determine the presence of abnormality when the criterion is satisfied.

FIG. 17 is a diagram illustrating an example of a route for abnormal situation DB based on the first method. The route for abnormal situation DB is referred to when the management server 12 determines in step S113 in FIG. 15 that there is an abnormality. The route for abnormal situation DB stores, in a route for abnormal situation management table, route data indicating a route for abnormal situation in which waypoints and inspection points are arranged in order. The route data is associated with an abnormal-time route ID identifying the route for abnormal situation and a robot name identifying a traveling robot that travels on the route. If there is only one traveling robot 11, it is not necessary to register the robot name in association with the traveling robot 11.

The route "ID201" is a route for performing inspection at the inspection point D004. The route "ID202" is a route for performing inspection at the inspection point D003. The route "ID203" is a route for performing inspection at the inspection point D002. The route "ID301" and the route "ID403" are not directly related to the inspection operation illustrated in FIG. 13 and are presented as examples.

Figure 18:
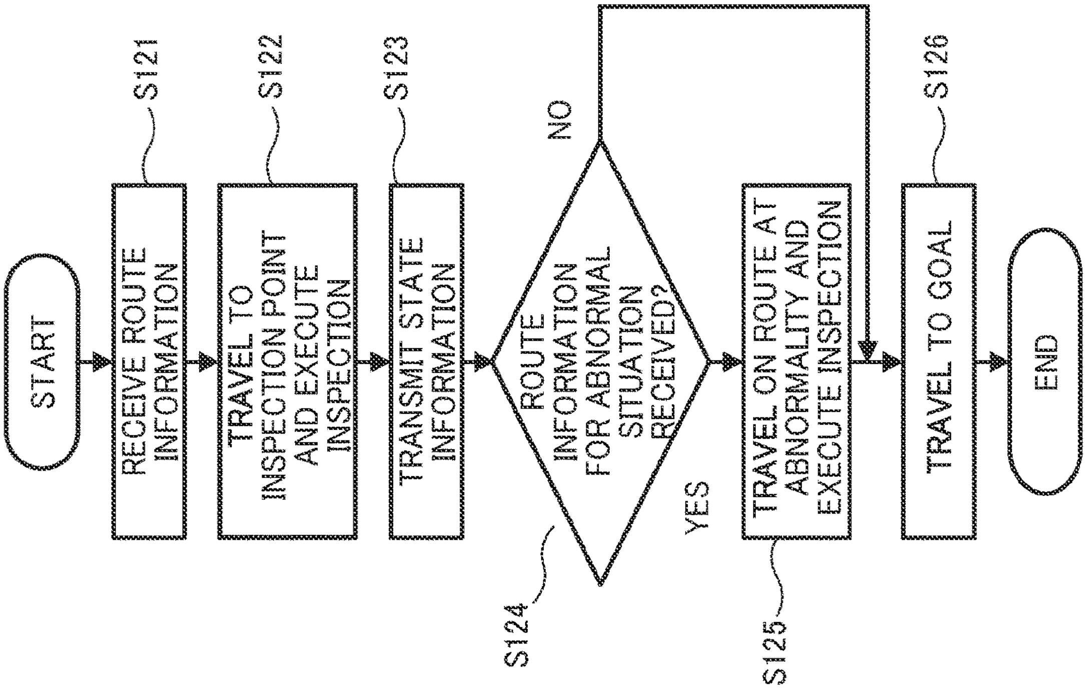
FIG. 18 is a flowchart illustrating an example of a process performed by the traveling robot in the inspection operation using a second method.

Next, the second method for identifying the cause of the abnormality will be described in detail. FIG. 18 is a flowchart illustrating an example of a process performed by the traveling robot 11 in the inspection operation using the second method. The traveling robot 11 is set at a position where the inspection operation is started, and the inspection is started. In step S121, the traveling robot 11 receives the route information for normal conditions from the management server 12 and an instruction to travel on the route for normal conditions. In step S122, the traveling robot 11 sequentially travels to the inspection points based on the route information and executes the inspection operation at the inspection points. The inspection operation is image capturing of an inspection target or the like. In step S123, the traveling robot 11 transmits the acquired state information to the management server 12.

In step S124, the traveling robot 11 determines whether or not the route information for abnormal situation is received from the management server 12. When receiving the route information for abnormal situation, in step S125, the traveling robot 11 travels on the route for abnormal situation based on the route information and executes the inspection. In step S126, the traveling robot 11 travels to the goal, notifies the management server 12 of the arrival at the goal, and ends the inspection operation.

In step S124, when the route information for abnormal situation is not received, in step S126, the traveling robot 11 travels to the goal and notifies the management server 12 of the arrival at the goal. Then, the inspection operation ends.

Figure 19:
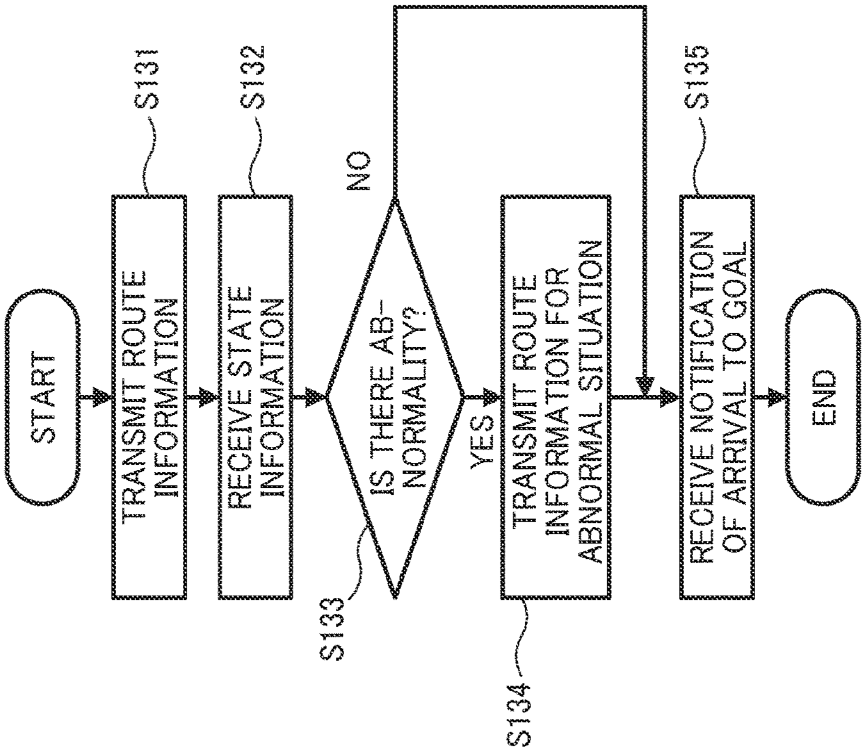
FIG. 19 is a flowchart illustrating an example of a process performed by the management server in the inspection operation using the second method.

FIG. 19 is a flowchart illustrating an example of a process performed by the management server 12 in the inspection operation using the second method. In step S131, the management server 12 transmits, to the traveling robot 11, the route information for normal conditions and an instruction to travel on the route for normal conditions and execute the inspection at the inspection point. In step S132, the management server 12 receives state information from the traveling robot 11.

In step S133, the management server 12 determines whether or not there is an abnormality in the inspection target based on the received state information and the determination criterion. When determining that there is an abnormality, in step S134, the management server 12 transmits, to the traveling robot 11, the route information for abnormal situation and an instruction to travel on the route for abnormal situation. In step S135, the management server 12 receives, from the traveling robot 11, the notification that the traveling robot 11 has arrived at the goal, and ends the inspection. By contrast, when determining that there is no abnormality, in step S135, the management server 12 receives, from the traveling robot 11, the notification that the traveling robot 11 has arrived at the goal, and ends the inspection.

FIG. 20 is a diagram illustrating another example of the abnormality information table for determining whether or not there is an abnormality in an inspection target. The items of the abnormality information table include an inspection point, arca information, a captured image, and a detection result, which are stored in association with an abnormality ID identifying the abnormality. The abnormality ID is associated with items "A. gas concentration," "B. image comparison," "C. temperature," "D. laser imaging detection and ranging (LIDAR, a sensor that measures a distance to a remote object or the shape thereof)," "determination criterion," and "operation." In the item "determination criterion," among the items "A. gas concentration," "B. image comparison," "C. temperature," and "D. LIDAR," a criterion that the degree of matching is low as a result of "B. image comparison," a criterion "A and C" that both the gas concentration and the temperature are out of set ranges, and the like are determined in advance, and the management server 12 can determine the presence of abnormality when the criterion is satisfied.

FIG. 21 is a diagram illustrating an example of a route for abnormal situation DB based on the second method. The route for abnormal situation DB is referred to when the management server 12 determines in step S133 in FIG. 19 that there is an abnormality. The route for abnormal situation DB stores, in a route for abnormal situation management table, route data indicating a route for abnormal situation in which waypoints and inspection points are arranged in order. The route data is associated with an abnormal-time route ID identifying the route for abnormal situation and a robot name identifying a traveling robot that travels on the route. If there is only one traveling robot 11, it is not necessary to register the robot name in association with the traveling robot 11.

The route "ID200" is a route for performing inspection at inspection points D004, D003, and D002 in this order. The route "ID201" and the route "ID203" are not directly related to the inspection operation illustrated in FIG. 13 and are presented as examples.

Figure 22:
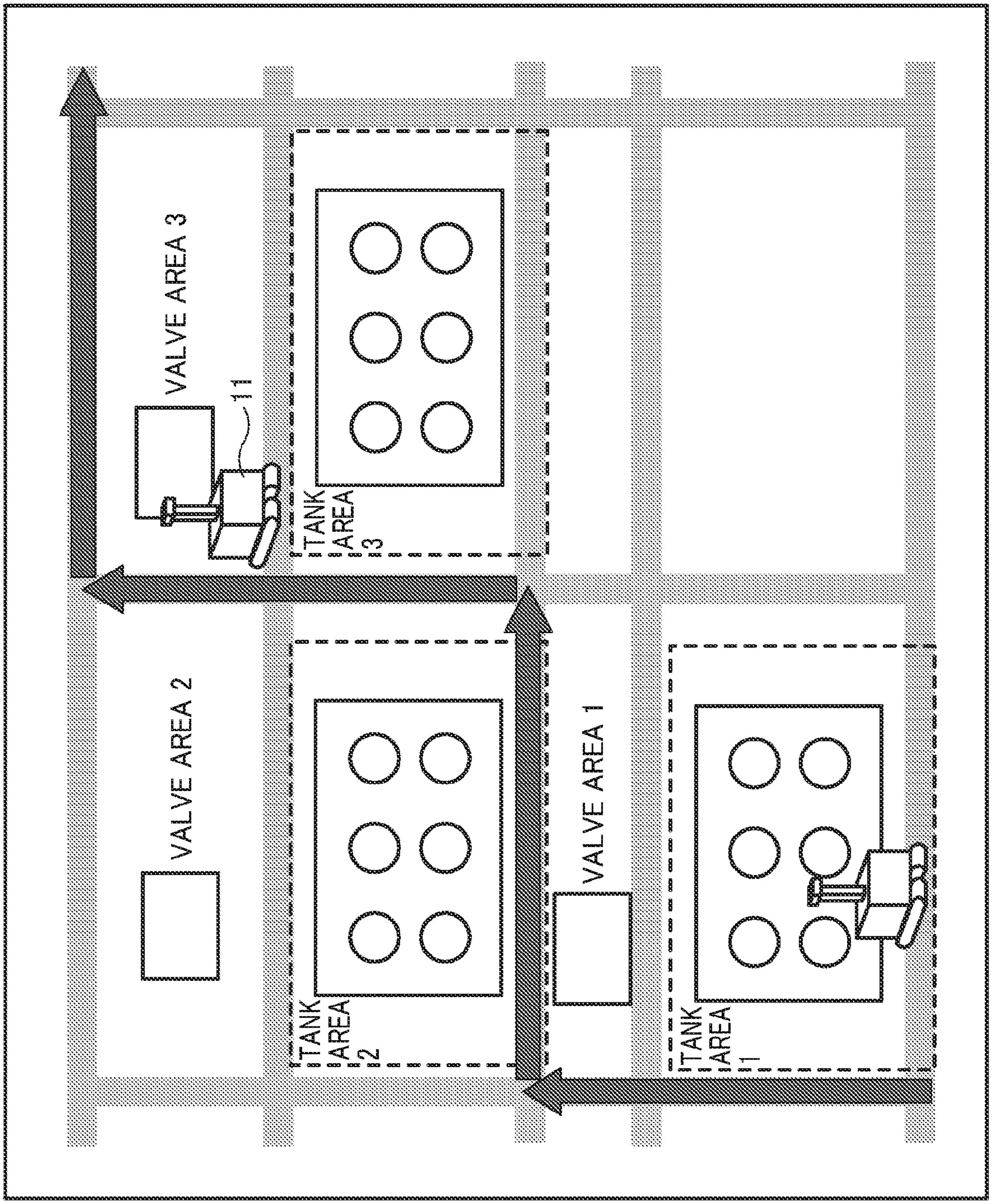
FIG. 22 is a diagram illustrating an example of a monitored area in which a plurality of traveling robots is installed and performs inspection.

FIG. 22 is a diagram illustrating a monitored area in which a plurality of traveling robots 11 is installed and performs inspection. In a chemical plant or the like, areas are often connected by a long-distance pipeline. As illustrated in FIG. 22, when an abnormality is found in a tank area 1, it is necessary to check the states of valves and meters in the valve area 3 in a remote area. In such a case, the cause of the abnormality can be quickly identified by giving an instruction not only to one traveling robot 11 but also to another traveling robot 11.

Since the traveling robot 11 has identification information, such as a robot name, an internet protocol (IP) address, or a media access control (MAC) address, for uniquely identifying the traveling robot 11, an instruction can be given to a target traveling robot 11 using the identification information.

In a business facility including a chemical plant, many works are performed on a daily basis. When the traveling robot 11 is performing inspection operation in a chemical plant, it is possible that a worker performs construction work in the vicinity where the traveling robot 11 travels.

In the chemical plant, there is a possibility that dangerous gas is generated, and providing the traveling robot 11 with a gas sensor for detecting such gas is desired. The gas may be flammable gas, and there is a risk of, for example, the explosion of the traveling robot 11. It is desirable to completely turn off the power supply of the traveling robot 11 when the concentration of the gas reaches a certain level or more, considering such a risk.

However, if the power supply of the traveling robot 11 is completely turned off, it is not possible to present information, such as notification of danger, to the surroundings. In addition, even if the worker working nearby looks at the stopped traveling robot 11, the worker cannot know why the traveling robot 11 is stopped there. In addition, the worker is not notified that there is hazardous gas.

Therefore, the traveling robot 11 has a mechanism to present information (e.g., raising a flag) to the surroundings before the traveling robot 11 is turned off. After presenting the information, the traveling robot 11 turns off. By adopting such a configuration, nearby persons can know the state of the traveling robot 11 and take appropriate actions.

Figure 23:
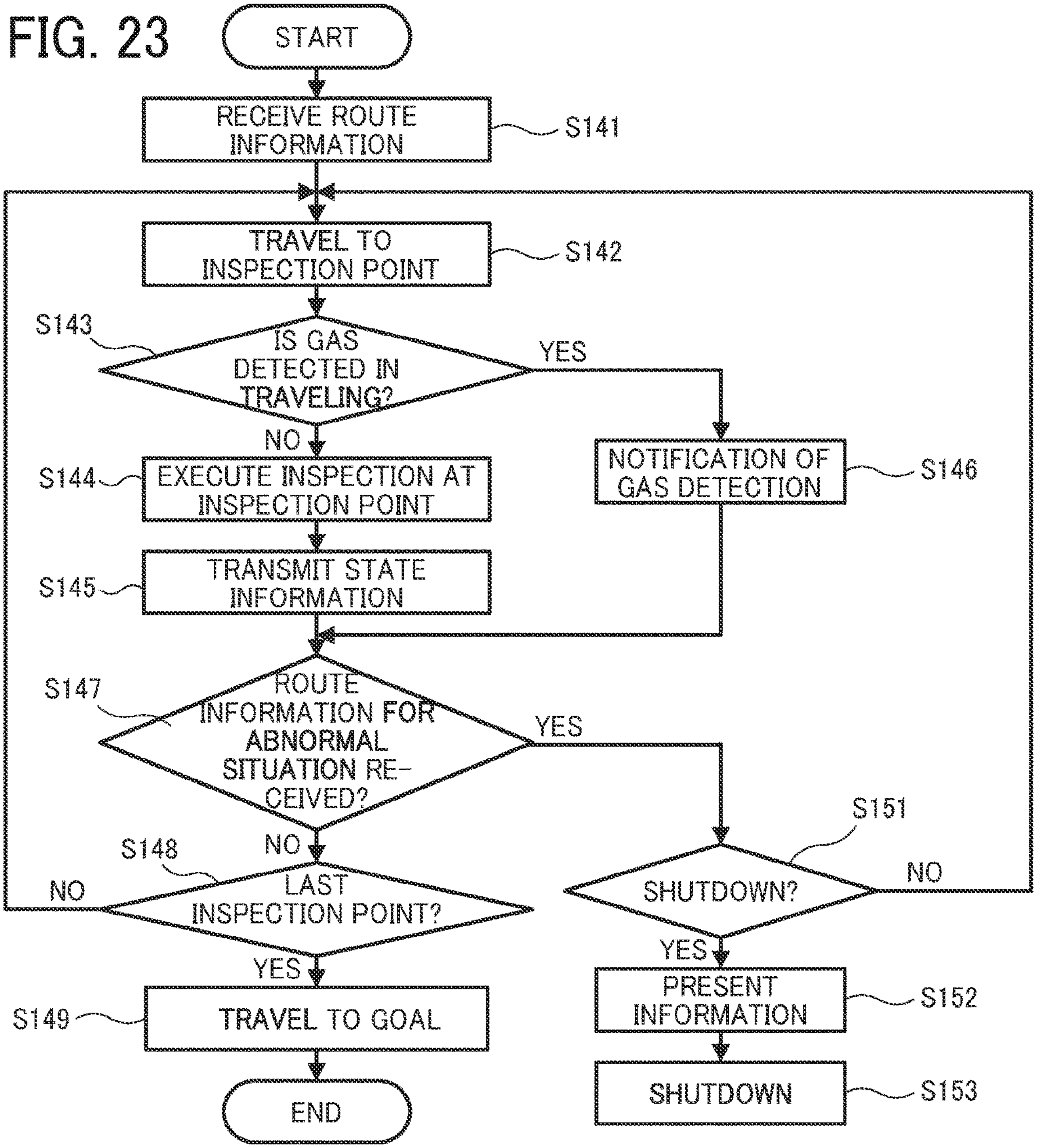
FIG. 23 is a flowchart illustrating an example of a process performed by the traveling robot in the inspection operation using the traveling robot having the mechanism to present information according to the first embodiment.

FIG. 23 is a flowchart illustrating an example of a process performed by the traveling robot 11 in the inspection operation using the traveling robot 11 having the mechanism to present information. The traveling robot 11 is set at a position where the inspection operation is started, and the inspection is started. In step S141, the traveling robot 11 receives the route information for normal conditions from the management server 12 and an instruction to travel on the route for normal conditions. In step S142, the traveling robot 11 travels to the inspection point based on the route information. In step S143, it is determined whether the traveling robot 11 has detected gas during traveling.

When the gas is not detected, in step S144, the traveling robot 11 executes the inspection operation at the inspection point. The inspection operation is image capturing of an inspection target or the like. After the inspection operation, in step S145, the traveling robot 11 transmits the acquired state information to the management server 12. On the other hand, when gas is detected, in step S146, the traveling robot 11 notifies the management server 12 of the gas detection.

In step S147, the traveling robot 11 determines whether or not the route information for abnormal situation is received from the management server 12. When determining that the route information for abnormal situation is not received, in step S148, the traveling robot 11 determines whether or not the current inspection point is the last inspection point. When the current inspection point is not the last inspection point, the process goes back to step S142. When the current inspection point is the last inspection point, in step S149, the traveling robot 11 travels to the goal, notifies the management server 12 that the inspection operation is to end, and ends the inspection operation.

When receiving the route information for abnormal situation in step S147, in step S151, the traveling robot 11 determines whether or not to perform a shutdown. The shutdown is an example of operation corresponding to the abnormality. When determining not to perform shutdown, in step S142, the traveling robot 11 travels on the route for abnormal situation and performs inspection.

Figure 24:
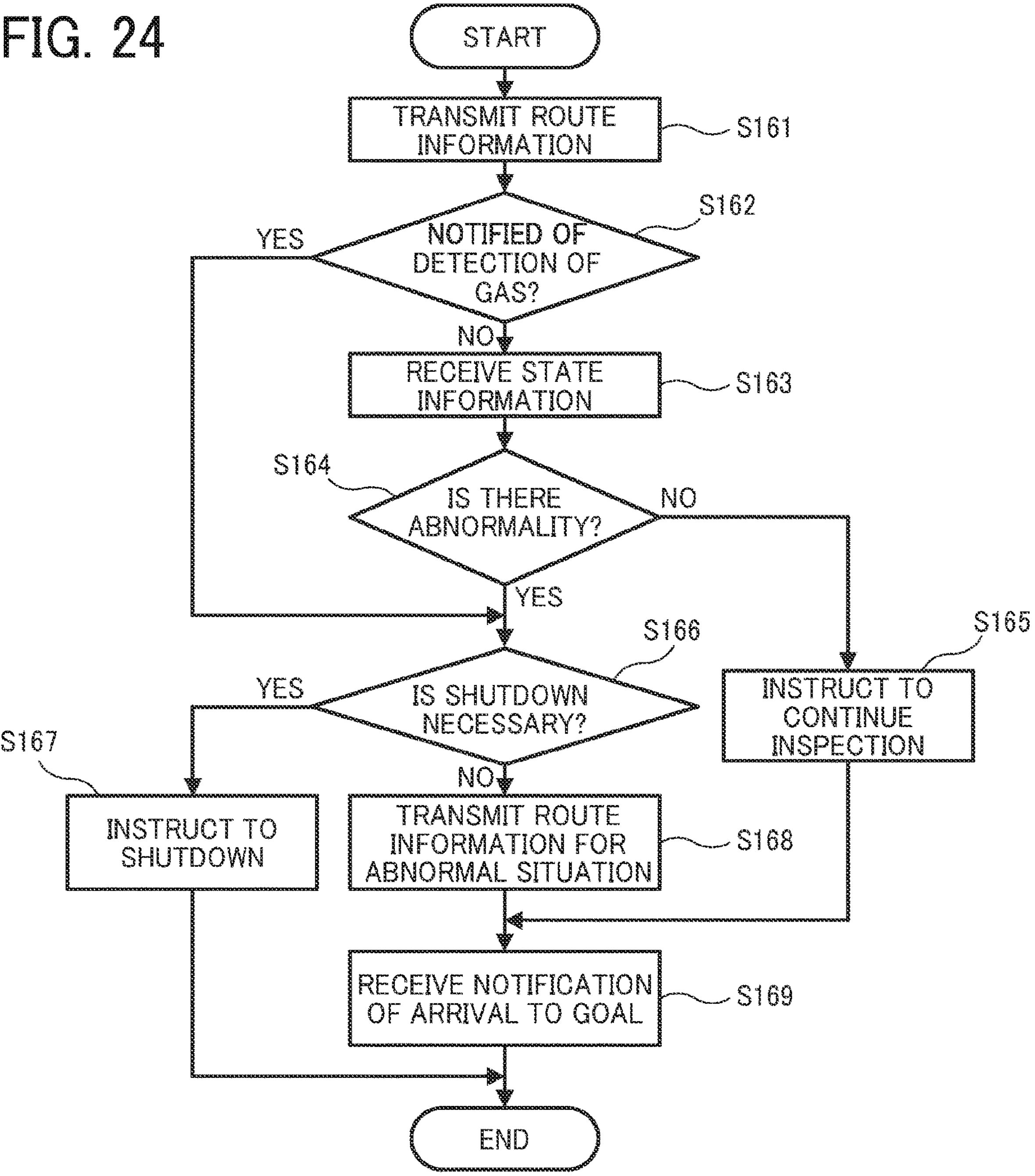
FIG. 24 is a flowchart illustrating an example of a process performed by the management server in the inspection operation using the traveling robot having the mechanism to present information according to the first embodiment.

When shutdown is performed in step S151, in S152, the traveling robot 11 performs presentation of information. Then, in step S153, the traveling robot 11 shuts down. FIG. 24 is a flowchart illustrating an example of a process performed by the management server 12 in the inspection operation using the traveling robot 11 having the mechanism to present information. In step S161, the management server 12 transmits, to the traveling robot 11, the route information for normal conditions and an instruction to travel on the route for normal conditions and execute the inspection at the inspection point. In step S162, the management server 12 determines whether or not a notification of gas being detected is received from the traveling robot 11 until the traveling robot 11 reaches the inspection point. When the notification of gas being detected is not received, in step S163, the management server 12 receives the state information from the traveling robot 11 at the inspection point.

In step S164, the management server 12 determines whether or not there is an abnormality in the inspection target based on the received state information and the determination criterion. When determining that there is no abnormality, in step S165, the management server 12 instructs the traveling robot 11 to continue the inspection operation. At this time, the management server 12 may notify the traveling robot 11 that there is no abnormality and instruct the traveling robot 11 to continue the inspection operation. The management server 12 may also transmit such a notification to the communication terminal 14. Then, in step S169, the management server 12 receives the notification of arrival at the goal from the traveling robot 11, and ends the inspection.

When the notification is received in step S162, or when the presence of an abnormality is determined in step S164, in step S166, the management server 12 determines whether or not the shutdown of the traveling robot 11 is necessary. When determining that the shutdown of the traveling robot 11 is necessary, in step S166, the management server 12 instructs the traveling robot 11 to perform the shutdown and ends the inspection. The condition under which a shutdown is necessary is, for example, when the gas concentration is equal to or higher than a reference concentration. When determining that the shutdown of the traveling robot 11 is not necessary, in step S168, the management server 12 transmits the route information for abnormal situation to the traveling robot 11. In S169, the management server 12 receives the notification of arrival at the goal from the traveling robot 11, and ends the inspection.

FIG. 25 is a diagram illustrating another example of the abnormality information table for determining whether or not there is an abnormality in an inspection target. In this table, information on the shutdown is also registered in addition to the contents of the abnormality. In this example, when the gas concentration of 10 or more in the area 2, and performing power shutdown is registered.

Figure 26:
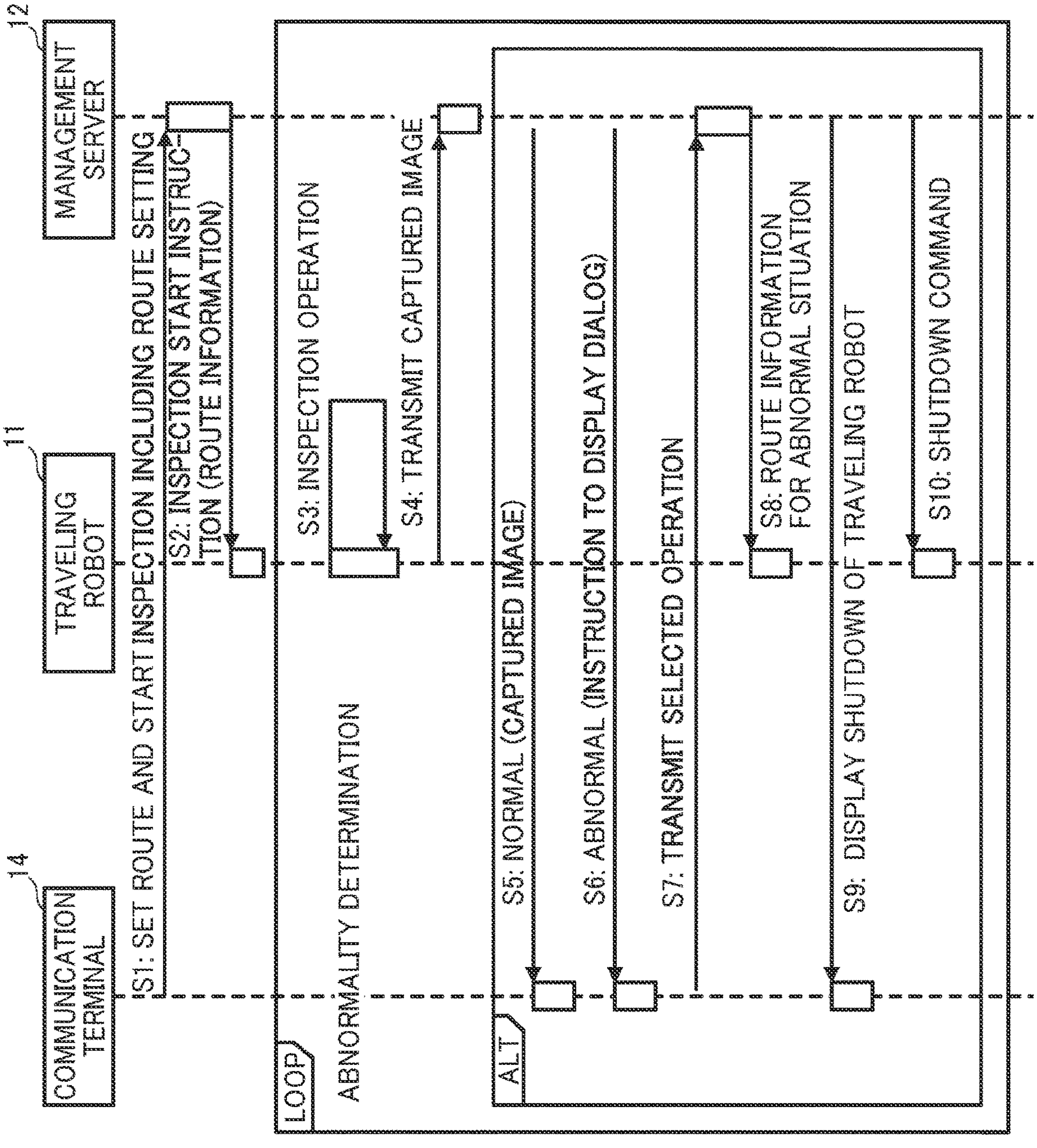
FIG. 26 is a sequence diagram illustrating another process executed by the information processing system according to the first embodiment.

FIG. 26 is a sequence diagram illustrating another process executed by the information processing system 10. The operator operates the communication terminal 14 to set a route and instruct the start of inspection. The communication terminal 14 transmits, to the management server 12, an instruction including information on the set route, to start inspection (S1). The management server 12 transmits an inspection start instruction to the traveling robot 11 together with the route information managed by the route-information management table (S2). The traveling robot 11 receives the instruction from the management server 12 and starts an inspection operation (S3).

The traveling robot 11 travels on the route instructed by the management server 12 and performs the inspection operation at the designated inspection point according to set conditions. Each time the traveling robot 11 captures an image at an inspection point, the traveling robot 11 transmits the captured image to the management server 12 (S4). The management server 12 determines whether the inspection target is normal or abnormal based on the captured image and the determination criterion. When the inspection target is determined as normal, the management server 12 transmits the captured image as a result to the communication terminal 14 and causes the communication terminal 14 to display the captured image (S5). On the other hand, when the inspection target is determined as having an abnormality, the management server 12 notifies the communication terminal 14 that there is an abnormality and causes the communication terminal 14 to display a dialog for selecting an operation (S6).

The communication terminal 14 receives, from the operator, selection of an operation on the displayed dialog (S7). When receiving selection of operation on the route for abnormal situation, the communication terminal 14 transmits, to the management server 12, an instruction to perform the inspection operation on the route for abnormal situation. Receiving the instruction, the management server 12 transmits, to the traveling robot 11, the route information for abnormal situation and an instruction to execute the inspection operation at the occurrence of abnormality (S8).

When there is an abnormality in the flow rate (read value) indicated by the meter 1, the traveling robot 11 is instructed to capture an image of the meter 2 to check the clogging in the way upstream from the meter 1. Next, in order to check whether or not the valve 1 on the route is closed, an image indicating the opening and closing state of the valve 2 is captured. Next, in order to check whether there is an abnormality in the operation of the pump 1, the operation sound of the pump 1 is recorded.

The management server 12 determines whether or not the shutdown is necessary on the basis of the detection result of the gas concentration transmitted from the traveling robot 11 together with the captured image. When determining that the shutdown is necessary, the management server 12 controls the communication terminal 14 to display a message that shutdown is necessary and the traveling robot 11 is going to shut down (S9). Further, the management server 12 transmits a shutdown command to the traveling robot 11 (S10). The traveling robot 11 performs an information presentation operation and shuts down.

Although the operation of detecting a gas and the shutdown of the traveling robot 11 are described above, when a flammable gas or a harmful gas is detected, it is desirable that, in addition to transmitting the notification of the gas detection to the communication terminal 14, the traveling robot 11 travels to a place where the gas concentration is low in order to notify the surroundings of the occurrence of gas leakage and to prevent ignition of the traveling robot 11.

Therefore, the traveling robot 11 turns back the route on which the traveling robot 11 has traveled while outputting an alert. There may be a case where the gas concentration is equal to or higher than the reference value even if the traveling robot 11 turns back the route. In such a case, the traveling robot 11 automatically shuts down so that the traveling robot 11 does not become a firing source. At this time, in indicating an alert to the surroundings, it is desirable to indicate the occurrence of an abnormality from a distance without using power.

Figure 27A:
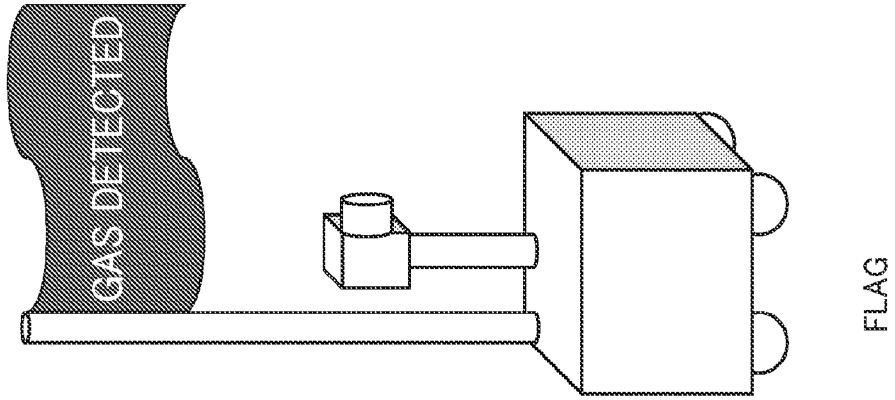
FIG. 27A is a diagram illustrating examples of presenting information by the traveling robot.
Figure 27B:
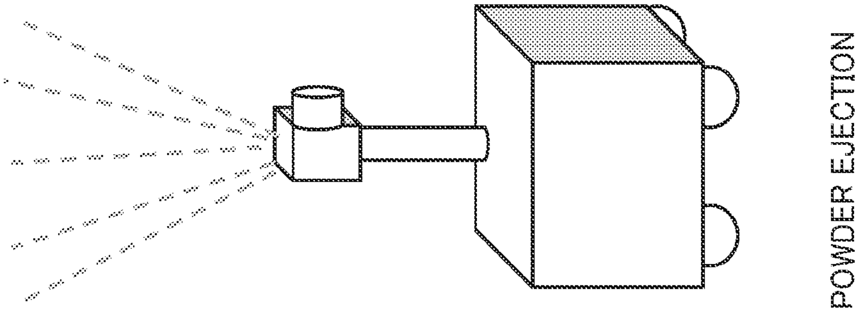
FIG. 27B is a diagram illustrating examples of presenting information by the traveling robot.
Figure 27C:
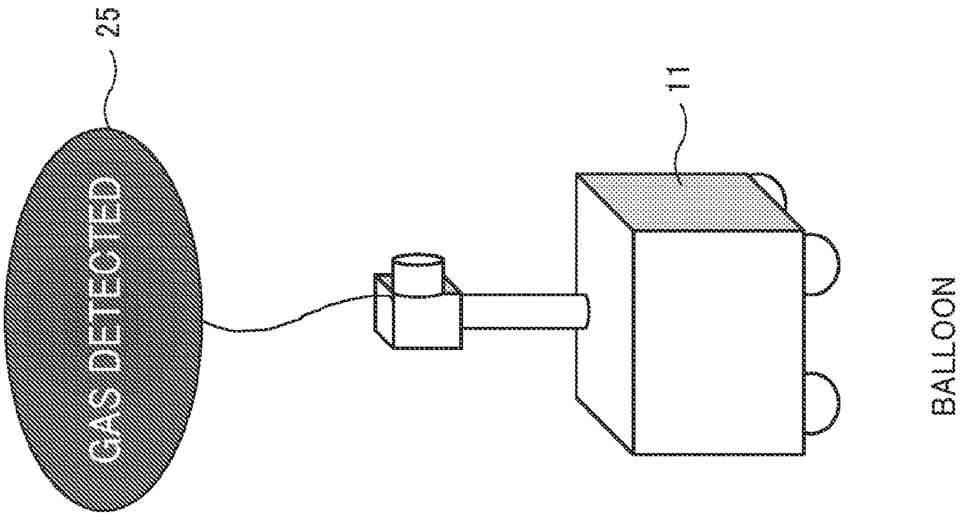
FIG. 27C is a diagram illustrating examples of presenting information by the traveling robot.

FIGS. 27A to 27C are diagrams illustrating examples of presenting information by the traveling robot 11. FIGS. 27A to 27C illustrate three examples, namely, an example of raising an object such as a flag with good visibility, an example of ejecting powder such as a fire extinguishing agent with no danger of ignition, and an example of raising a balloon. Note that the information presentation is not limited to these examples. The flag or the balloon may bear a text message or sign indicating danger such as "danger" or "stay away."

On the route on which the traveling robot 11 travels, there may be an obstacle such as a fallen object, a work vehicle, or a damaged road surface. The traveling robot 11 captures an image of such a situation, transmits the captured image to the communication terminal 14, resets the route, and continues the inspection operation. By viewing the image received and displayed by the communication terminal 14, the operator can identify the obstacle hindering the traveling robot 11 from traveling and take measures to remove the identified obstacle.

If the traveling robot 11 waits for removal of the obstacle, the inspection time becomes longer. Accordingly, the traveling robot 11 travels to the next inspection point through an alternative route, instead of waiting for the removal of the obstacle. Such an alternative route may be set in advance. Alternatively, the operator may search again for a travel route in consideration of the obstacle on the current route and determines an alternative route.

Figure 28:
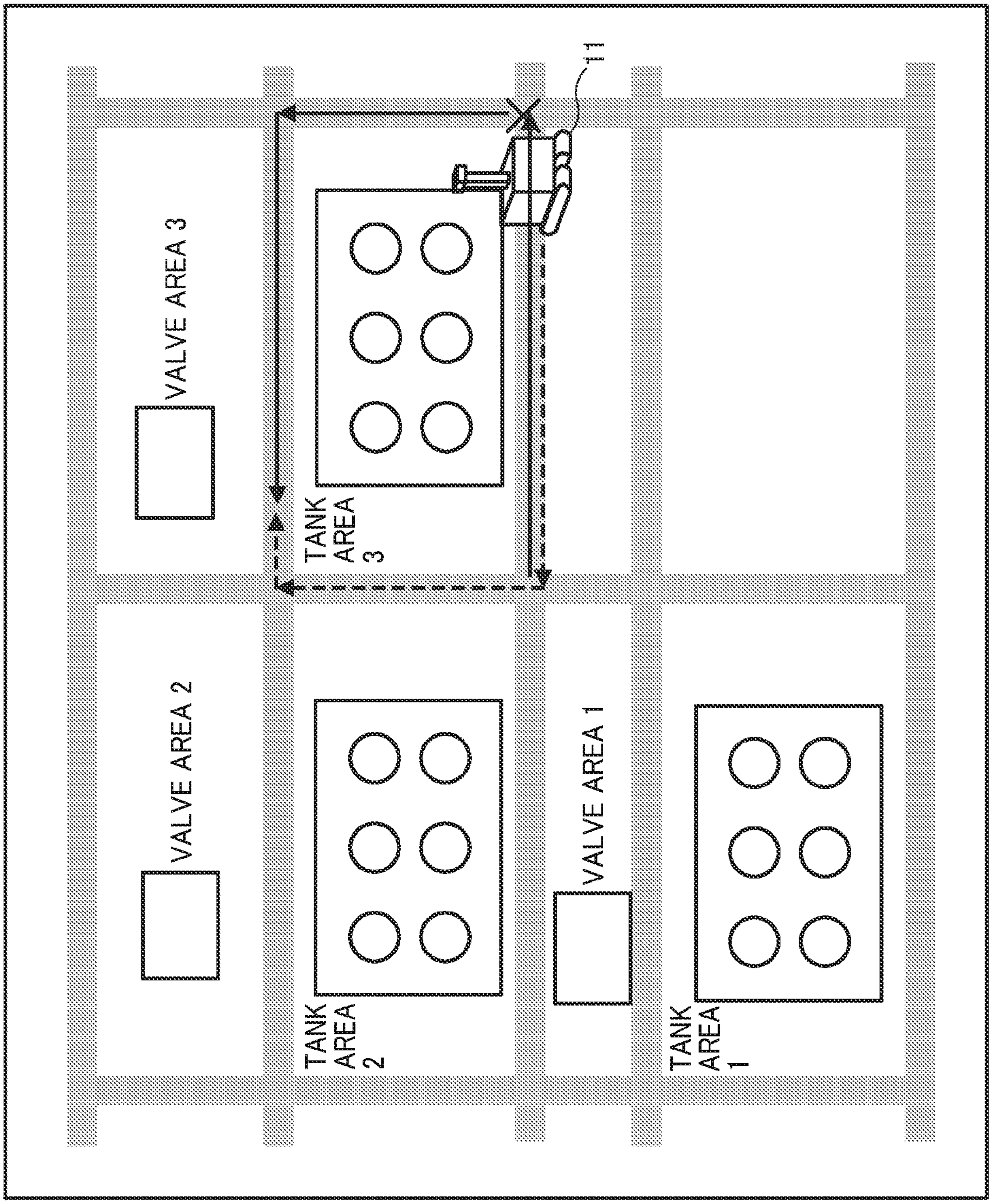
FIG. 28 is a diagram illustrating an example of an inspection operation in a case where there is an impassable portion in the middle of a route.

FIG. 28 is a diagram illustrating an inspection operation in a case where there is an impassable portion in the middle of a route. The traveling robot 11 travels in the tank area 3 in the direction indicated by a solid arrow to perform inspection. However, an obstacle in the middle of the route makes the route impassable to the traveling robot 11. The traveling robot 11 detects the obstacle by a LIDAR which is a sensor for detecting the obstacle in a non-contact manner and captures an image thereof with the imaging device 22. The traveling robot 11 transmits a notification of the detection of the obstacle and the captured image to the communication terminal 14 via the management server 12. The operator receives the notification that the obstacle is detected by the LIDAR, views the captured image, and determines whether the route is passable even through the obstacle is present.

When determining that the route is not passable, the operator either instructs an alternative route or route searching.

On the basis of the instruction received from the communication terminal 14 via the management server 12, the traveling robot 11 performs inspection on the instructed route or searches for an alternative route and performs inspection on the found route. The alternative route is a preset convenient route. In the route searching, the order of waypoints visited may be designated or not designated.

Figure 29:
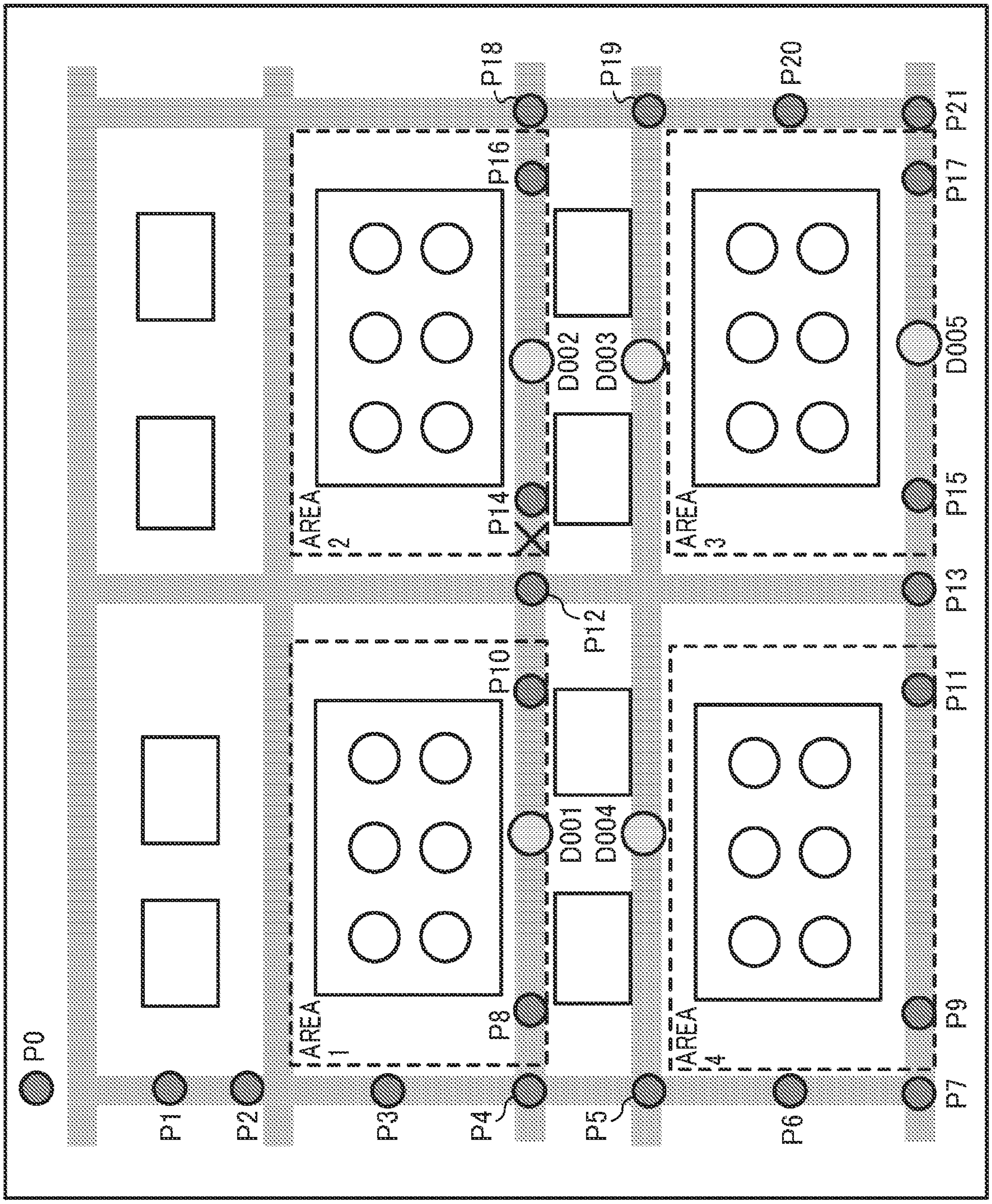
FIG. 29 is a diagram illustrating an example of route search method according to one embodiment.

FIG. 29 is a diagram illustrating an example of route search method. The route is for performing image capturing at the inspection point D001 of the area 1, image capturing at the inspection point D002 of the area 2, image capturing at the inspection points D003 and D005 of the area 3, and image capturing at the inspection point D004 of the area 4. At present, an obstacle is present on the way between the waypoints P12 and P14 and the way is impassable.

Based on an instruction from the management server 12, the traveling robot 11 travels according to the route information and captures, with the imaging device 22, an image of the inspection target as the inspection operation at the inspection point D001. The traveling robot 11 transmits the captured image to the management server 12.

Figures 30, 31, 32:
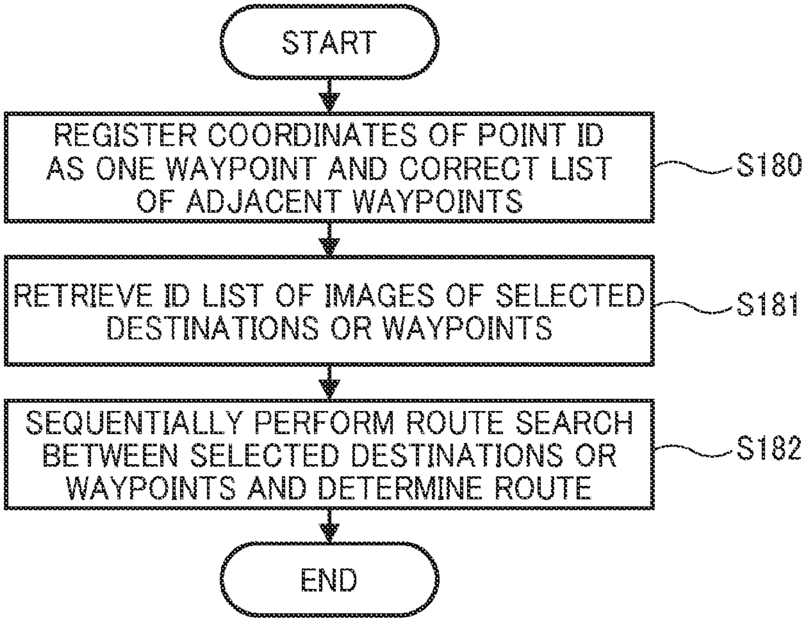
FIG. 30 is a diagram illustrating an example of an inspection result DB stored by the management server.
FIG. 31 is a flowchart illustrating an example of route searching according to the first embodiment.
FIG. 32 is a diagram illustrating an example of a graph structure used in the route searching.

FIG. 30 is a diagram illustrating an example of an inspection result DB stored by the management server 12. The inspection result DB stores an inspection point ID, coordinates, an area name, and a file name of a captured image in association with each other.

In the example illustrated in FIG. 30, the image captured at the inspection point D001 is stored as the inspection result.

FIG. 31 is a flowchart illustrating an example of route searching. The route search is started in response to an instruction of route search from the operator determining that the route is impassable to the traveling robot 11. The route search is executed by the traveling robot 11. Alternatively, the management server 12 may execute the search and notify the traveling robot 11 of the search result. A description will be made assuming that there are four inspection points, namely, the inspection points D001, D002, D003, and D005.

In step S180, the coordinates of the point ID (or the inspection target ID) are registered as one of the waypoints, and the list of adjacent waypoints is corrected. When an impassable waypoint is found, the impassable waypoint is deleted. In step S181, the list of inspection points is retrieved so as to inspect the inspection points D002, D003, and D005 associated with the inspection target ID selected as a destination or waypoint.

In step S182, routes between the selected inspection points are sequentially searched for, and a route is determined.

Specifically, a route from the inspection point D002 to D003 and a route from the inspection point D003 to D005 are determined.

When there is a list structure of adjacent waypoints, the shortest route can be found by a well-known route finding algorithm. Examples of the route finding algorithm include Dijsktra's Algorithm and A*Search. These route finding algorithms are well known and will not be described in detail here. Other known algorithms may be employed in the route searching.

FIG. 32 is a diagram illustrating an example of a graph structure used in the route searching. In the graph structure, when the waypoint having the point ID "P8" is registered, there are the waypoints P10 and P4 adjacent to the waypoint P8 in the example illustrated in FIG. 29. Thus, "P10" and "P4" are registered as first and second adjacent point IDs in relation to the point ID "P8." An operator selects one of the adjacent point IDs "P10" and "P4" to determine a route. In this example, "P4" is selected. Since the waypoint P4 is adjacent to the three waypoints P3, P8, and P5, the point IDs thereof are registered as first, second and third adjacent point IDs in relation to the point ID "P4." This process is repeated to determine the route.

Figure 33:
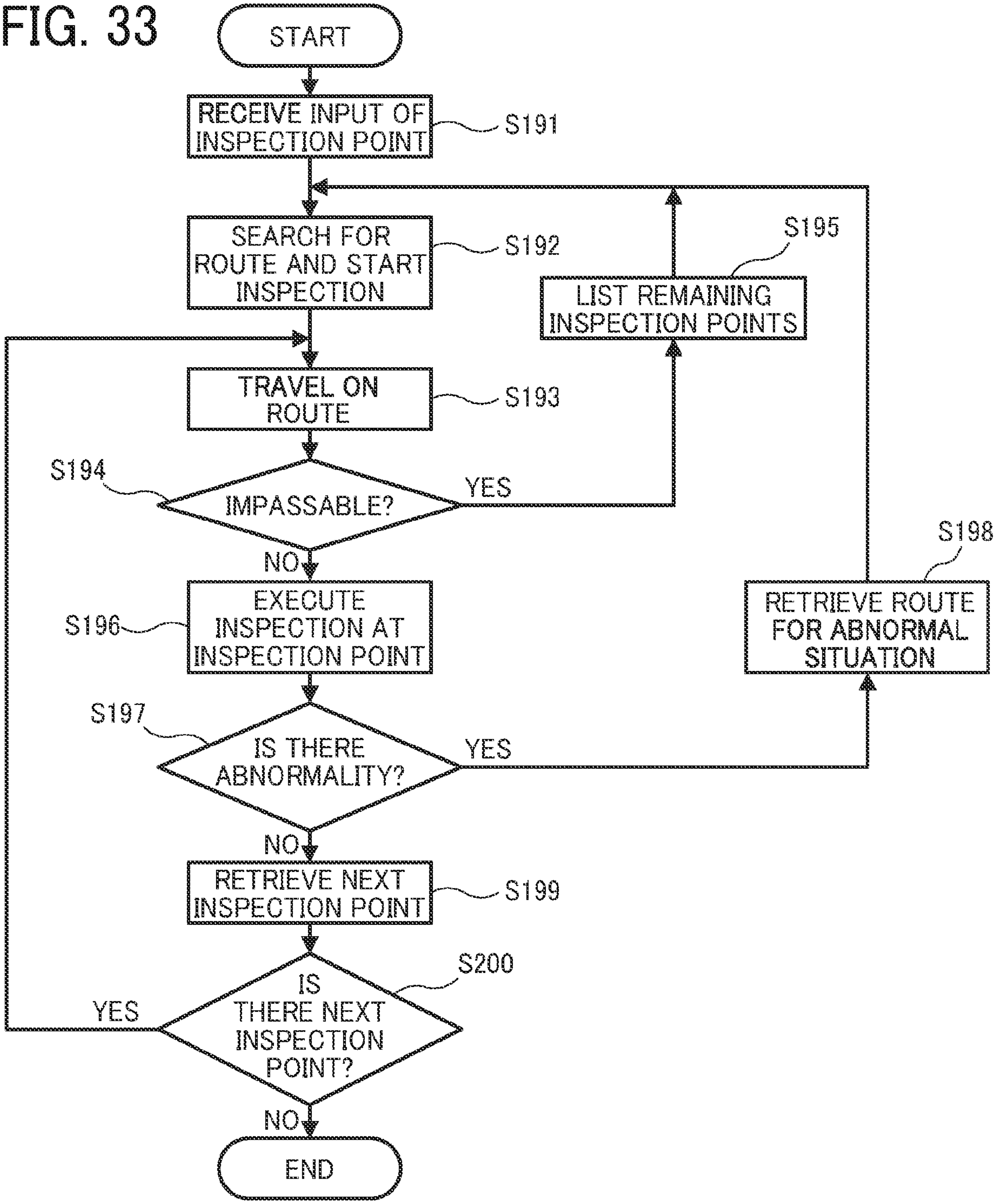
FIG. 33 is a flowchart illustrating an example of a route search process performed by the information processing system according to the first embodiment.

FIG. 33 is a flowchart illustrating an example of a route search process. In step S191, the information processing system 10 receives, from the operator, an input of the point ID associated with the inspection position. It is assumed that "D001," "D002," and "D005" are input as the point IDs.

In step S192, the management server 12 searches for a route and instructs the traveling robot 11 to start traveling. Alternatively, the traveling robot 11 may perform the route searching. At the time of starting the inspection, a route advancing in the order of P4, P8, D001, P10, P12, P14, D002, P18, P19, P20, P21, P17, and D005 is acquired.

In step S193, the traveling robot 11 travels on the retrieved route. In step S194, the traveling robot 11 detects an obstacle and transmits the captured image, and the operator determines whether or not the route is passable.

When the operator determines in step S194 that the route is impassable, in step S195, the management server 12 lists the inspection points that have not yet been inspected. Then, the process returns to step S192. Thus, the route is searched for again, and the traveling robot 11 is started to travel. On the other hand, when the operator determines in step S194 that the route is passable, in step S196, the inspection operation is executed at the inspection point. At the inspection point, the traveling robot 11 captures an image with the imaging device 22 and transmits the captured image to the management server 12.

In step S197, the management server 12 determines whether or not there is an abnormality in the inspection target based on the received image and the determination criterion. When determining that there is an abnormality, in step S198, the management server 12 retrieves an inspection point to be inspected at the occurrence of abnormality and instructs the traveling robot 11 to travel on the route for abnormal situation and perform inspection. Then, the process returns to step S192.

When the management server 12 determines that there is no abnormality in step S197, in step S199, the management server 12 retrieves the next inspection point. In step S200, the management server 12 determines that there is the next inspection point, the process returns to step S193. The management server 12 controls the traveling robot 11 to travel on the route. When there is no next inspection point, the inspection ends.

When it is determined in step S194 that the route is not impassable, in step S192, to alternative route is searched for. At this time, search is performed irrespective of the initially determined order of the remaining inspection points.

Returning to FIG. 29, the description is continued. In the first search, a route to travel from P12 to P14 has been searched for, and an obstacle has been found between the waypoints P12 and P14 while the traveling robot 11 travels. If the obstacle makes the route impassable, the inspection points D002 and D005 have not yet been inspected although the inspection point D001 has been inspected.

The route searched for in the initial search is for inspecting the inspection points D002 and D005 in this order. By contrast, the route searched for in the second search is for inspecting the inspection points D002 and D005 irrespective of the order. The route acquired in this case is a route advancing in the order of P12, P22, P13, P15, D005, P17, P21, P20, P19, P18, P16, and D002.

Figure 34:
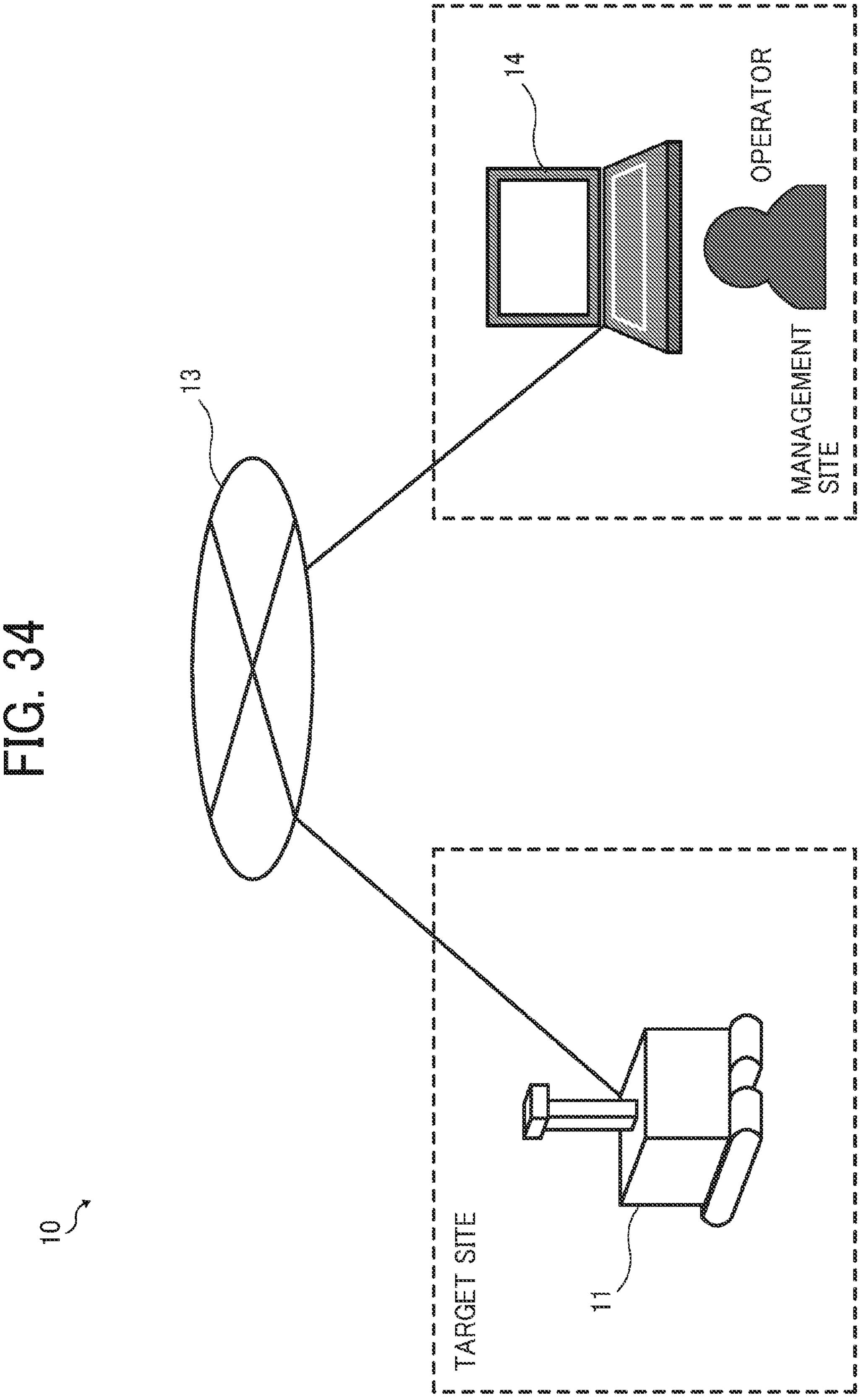
FIG. 34 is a diagram illustrating a configuration of an information processing system according to a second embodiment.

FIG. 34 is a diagram illustrating a configuration of an information processing system according to a second embodiment. In FIG. 34, the information processing system 10 includes the traveling robot 11, and the traveling robot 11 has all the functions of the management server 12 illustrated in FIG. 1. Since the hardware configuration of the traveling robot 11 has already been described with reference to FIG. 3, the description thereof is omitted.

Figure 35:
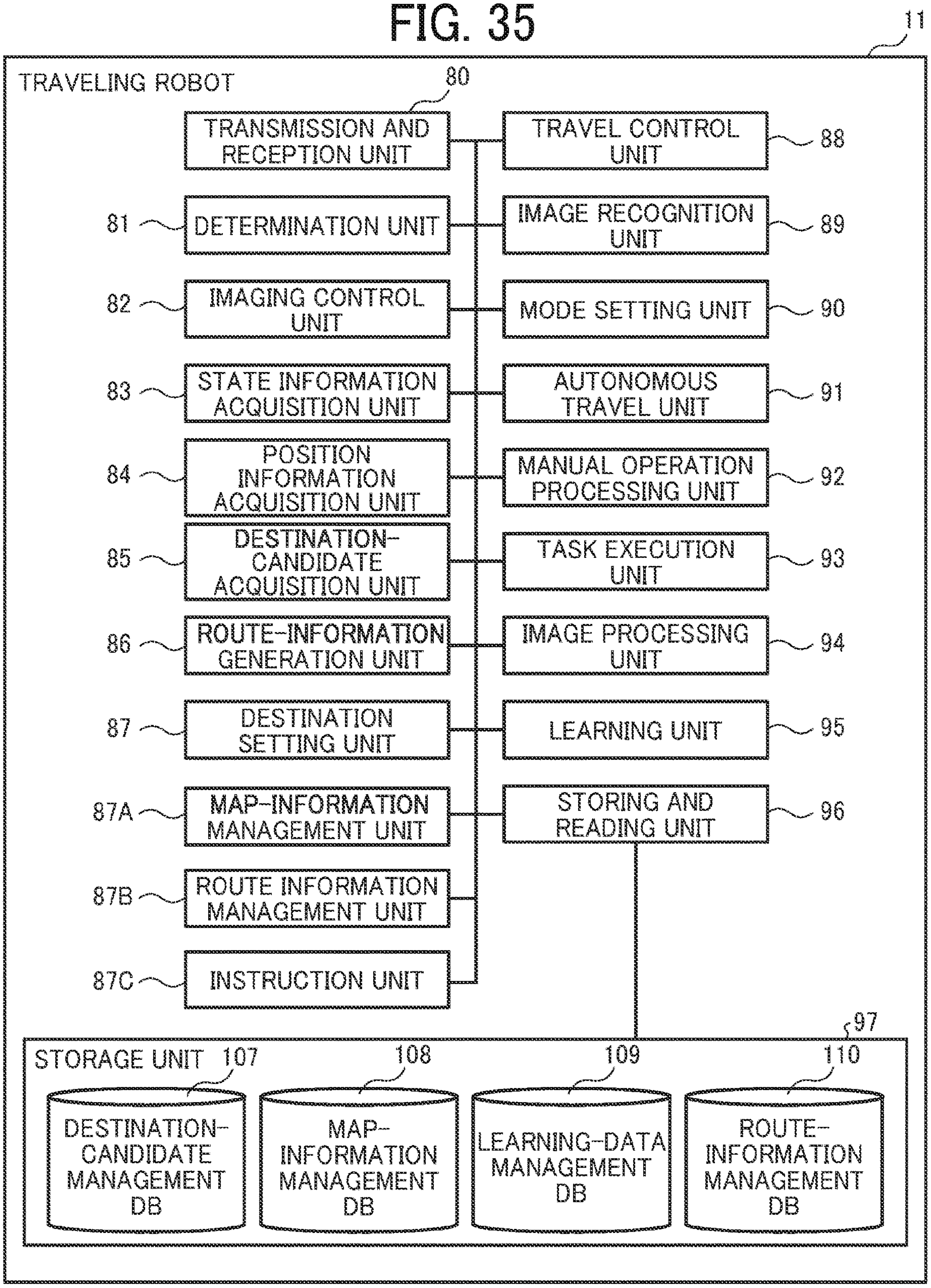
FIG. 35 is a block diagram illustrating a functional configuration of a traveling robot according to the second embodiment.

FIG. 35 is a block diagram illustrating a functional configuration of the traveling robot 11 according to the second embodiment. The traveling robot 11 illustrated in FIG. 35 includes all of the functional units of the traveling robot 11 and the functional units of the management server 12 illustrated in FIG. 5. Specifically, the traveling robot 11 further includes a map-information management unit 87A, a route-information management unit 87B, and an instruction unit 87C. Note that the functional units of the communication terminal 14 are similar to those of the communication terminal 14 illustrated in FIG. 5, and thus description thereof is omitted.

In FIG. 5, each of the traveling robot 11 and the management server 12 includes the transmission and reception unit, the determination unit, the storing and reading unit, and the storage unit as overlapping functional units. However, when the functional units of the management server 12 are included in the traveling robot 11, duplicate functional units are not necessary. Since the individual functional units have already been described with reference to FIG. 5, the description thereof is omitted.

Figure 36:
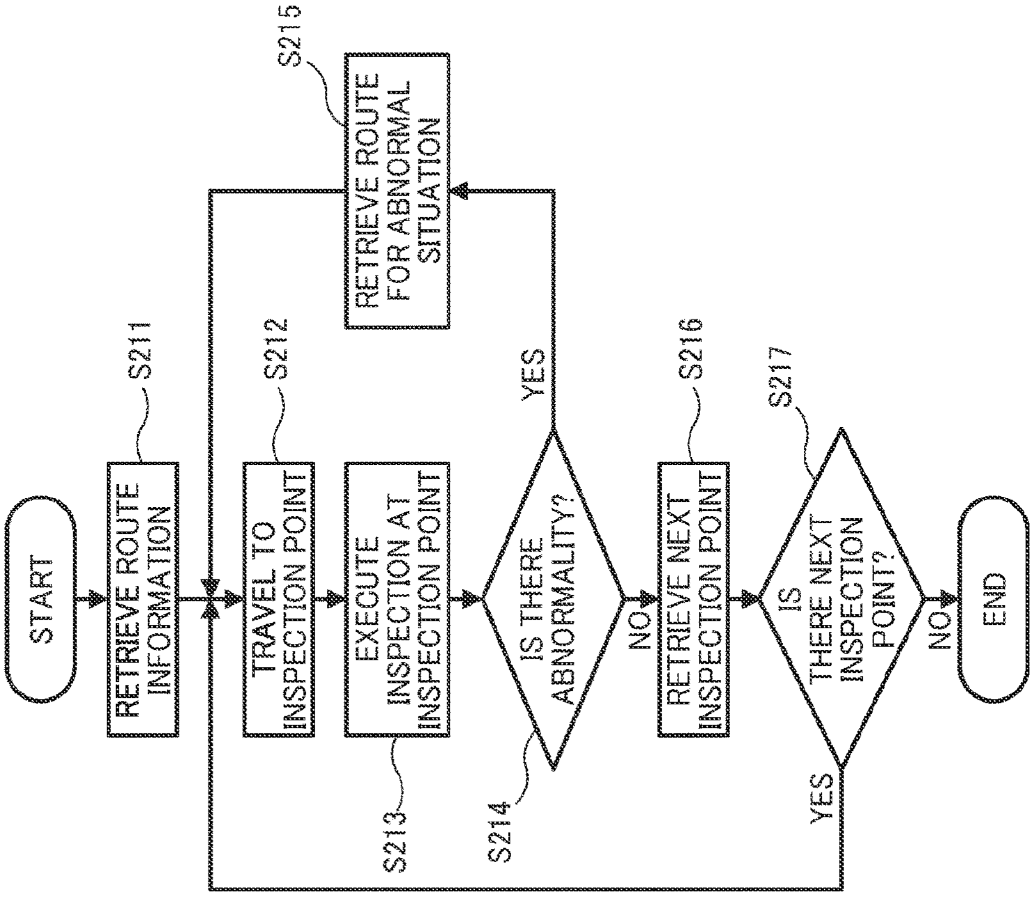
FIG. 36 is a flowchart illustrating an example of the inspection operation using the first method in the second embodiment.

FIG. 36 is a flowchart illustrating an example of the inspection operation using the first method in the second embodiment.

The traveling robot 11 is set at a position where the inspection operation is started, and the inspection in the autonomous travel mode is started. In step S211, the traveling robot 11 retrieves the inspection route. In step S212, the traveling robot 11 travels to the inspection point. In step S213, the traveling robot 11 executes an inspection operation at the inspection point. The inspection operation is image capturing of an inspection target or the like.

In step S214, the traveling robot 11 determines whether or not there is an abnormality in the inspection target based on, for example, the captured image, and the determination criterion. For example, the inspection target is a read value of the meter 1. When determining that there is an abnormality, in step S215, the traveling robot 11 retrieves the route for abnormal situation, and the process returns to step S212.

When determining in step S214 that there is no abnormality, in step S216, the traveling robot 11 retrieves the next inspection point and determines in step S217 whether or not there is a next inspection point. When there is a next inspection point, the process returns to step S212, and the traveling robot 11 travels to the next inspection point. On the other hand, when it is determined in step S217 that there is no next inspection point, the inspection operation ends.

Figure 37:
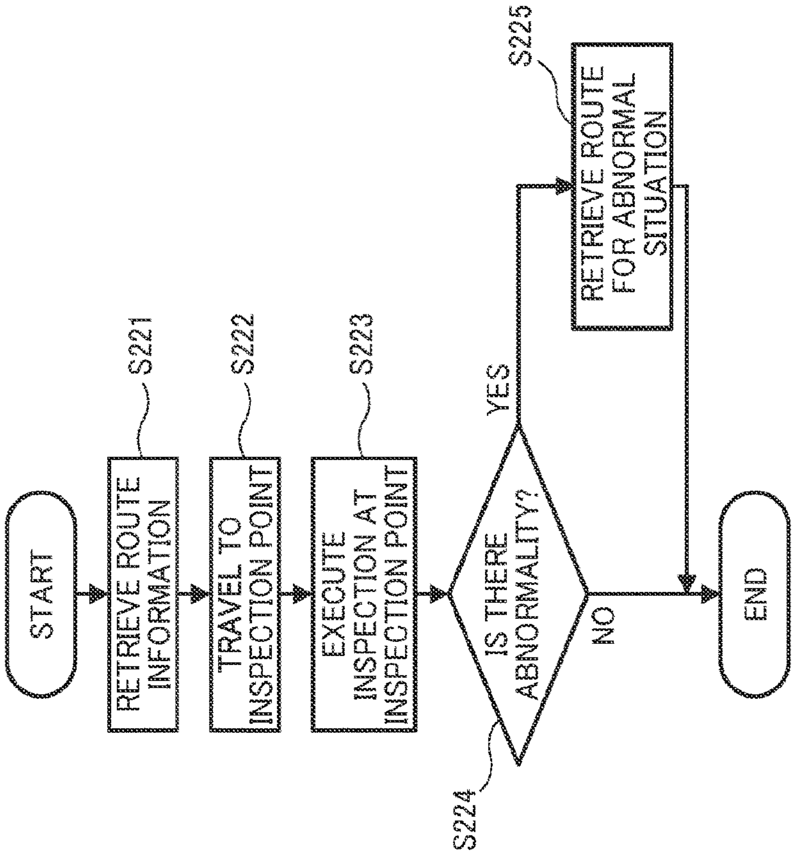
FIG. 37 is a flowchart illustrating an example of the inspection operation using the second method in the second embodiment.

FIG. 37 is a flowchart illustrating an example of the inspection operation using the second method in the second embodiment.

The traveling robot 11 is set at a position where the inspection operation is started, and the inspection in the autonomous travel mode is started. In step S221, the traveling robot 11 retrieves the inspection route, and, in step S222, the traveling robot 11 travels to the inspection point. In step S223, the traveling robot 11 performs an inspection operation at the inspection point. The inspection operation is image capturing of an inspection target or the like.

In step S224, the traveling robot 11 determines whether or not there is an abnormality in the inspection target based on, for example, the captured image, and the determination criterion. For example, the inspection target is a read value of the meter 1. When determining that there is an abnormality, in step S225, the traveling robot 11 retrieves the route for abnormal situation and executes inspection while traveling on the route for abnormal situation. Then, the inspection operation ends. When it is determined in step S224 that there is no abnormality, the inspection operation ends.

Figure 38:
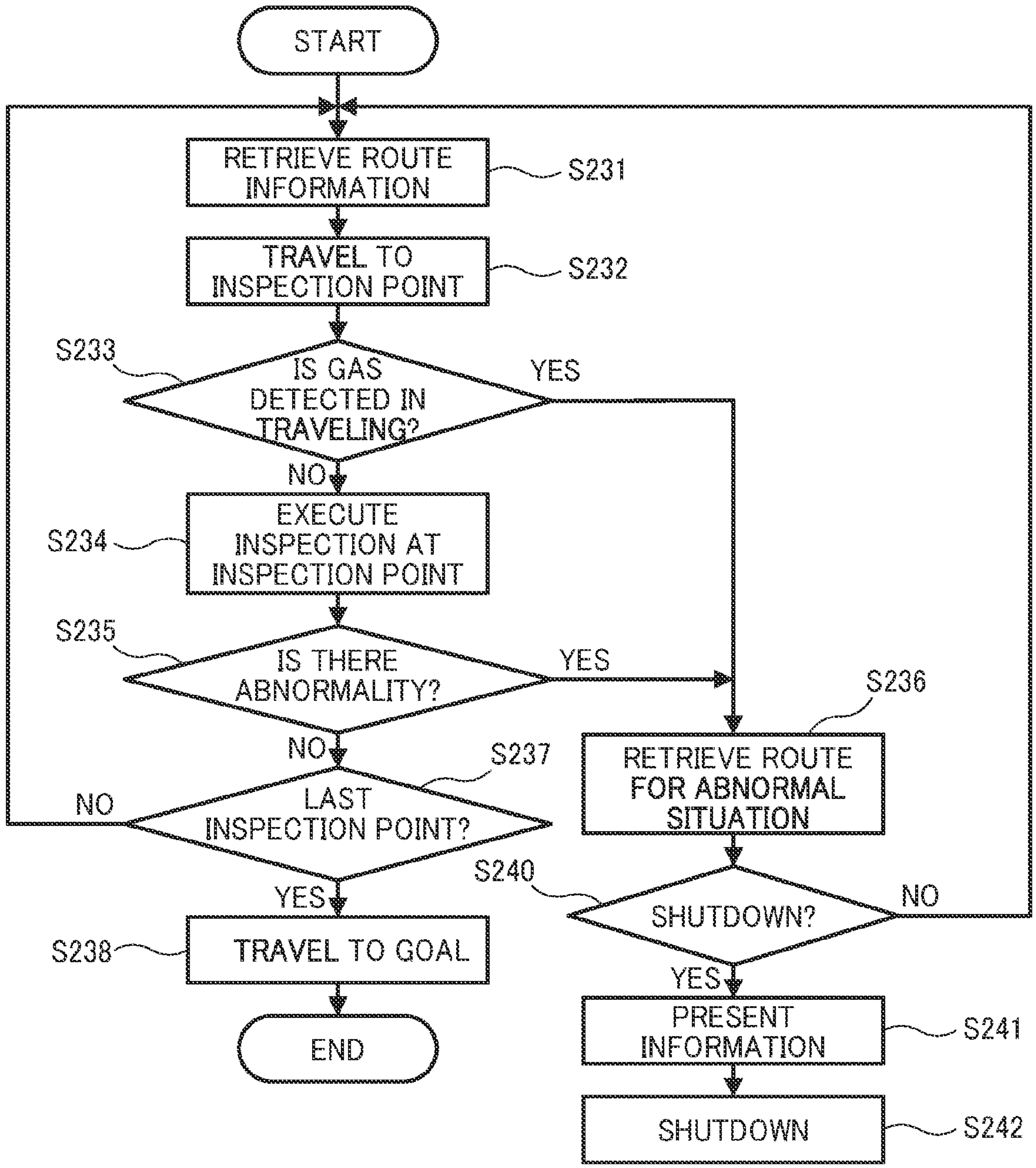
FIG. 38 is a flowchart illustrating another example of an inspection operation by the traveling robot having the mechanism to present information.

FIG. 38 is a flowchart illustrating an example of an inspection operation by the traveling robot 11 having the mechanism to present information. The traveling robot 11 is set at a position where the inspection operation is started, and the inspection in the autonomous travel mode is started. In step S231, the traveling robot 11 retrieves the inspection route, and in step S232, the traveling robot 11 travels to the inspection point. In step S233, the traveling robot 11 determines whether gas is detected during traveling.

When the gas is not detected, in step S234, the traveling robot 11 executes the inspection operation at the inspection point. The inspection operation is image capturing of an inspection target or the like. On the other hand, when a gas is detected, the process proceeds to step S236.

In step S235, the traveling robot 11 determines whether or not there is an abnormality in the inspection target based on, for example, the captured image, and the determination criterion. For example, the inspection target is a read value of the meter 1. When determining that there is an abnormality, in step S236, the traveling robot 11 retrieves the route for abnormal situation.

When determining in step S235 that there is no abnormality, in step S237, the traveling robot 11 retrieves the next inspection point and determines whether or not the next inspection point is the last inspection point. When the next inspection point is not the last inspection point, the process returns to step S231. When the next inspection point is the last inspection point, in step S238, the traveling robot 11 travels to the goal and ends the inspection operation.

After determining that there is an abnormality, the traveling robot 11 determines whether a shutdown is necessary in step S240. When the traveling robot 11 determines that the shutdown is necessary, in step S241, the traveling robot 11 performs presentation of information. Then, in step S242, the traveling robot 11 shuts down. On the other hand, when determining in step S240 that the shutdown is not necessary, the process returns to step S232, and the traveling robot 11 continues the inspection operation.

As described above, according to the present disclosure, even when the cause of the abnormality exists in a place distant from the monitored object, the cause of the abnormality can be identified. The traveling of the traveling robot 11 is controlled by the route data and the position data of the inspection point. The traveling robot 11 is controlled to sequentially trace the waypoint information on the route outside the inspection area. In the inspection arca, the setting values of pan, tilt, and zoom for capturing an image of the inspection target are transferred to the imaging device 22, and the imaging device 22 captures the image of the inspection target with the transferred setting values. The captured image is used to determine the presence of an abnormality. If there is an abnormality, the route is switched to the route for abnormal situation.

Although the inspection of the chemical plant has been described above as an example, the monitoring using the traveling robot 11 can be applied not only to the inspection of the chemical plant but also to the inspection of other places, security, and the like. In the security, when an abnormality such as the breakage of a window is detected, the cause of the abnormality can be identified by capturing an image of an entrance or the like. In addition, monitoring using the traveling robot 11 can also be applied to the fields of medical care, nursing care, and the like. For example, in a case where a person has nausea, and an abnormality is detected, it is possible to identify the cause of the abnormality by capturing an image of food or drink that the person took before falling down.

With reference to FIG. 39, a description is given below of an example in which an inspection area where inspection is performed is a room of a user of a medical facility such as a hospital. Various sensors are installed in the room. According to a detection result by such sensors, a presence/absence indication indicating whether a person is present in the room (whether the room is vacant) is provided outside the room. At night, the traveling robot 11 patrols the facility to acquire an image of the presence/absence indication of each room. When the room is determined as being vacant from the captured image, the situation is determined as abnormal. Then, the route is switched to a route for abnormal situation, and, for example, an image of a corridor can be captured with an infrared camera at a fixed interval. This is merely an example. The route for abnormal situation may be, for example, a route for performing thermography detection of a specific location corresponding to a user in each room. FIG. 39 is a diagram illustrating a table for determining an abnormality in which, for each abnormality ID, items of "inspection point," "image comparison," and "operation" (indicating abnormal-time route ID) are stored in association. The image comparison indicates a degree of matching with an image obtained by image capturing of the presence/absence indication indicating the room is vacant. When the degree of matching between the image taken at the time of inspection and the image of the presence/absence indication indicating the room is vacant is high, the situation can be determined as abnormal.

Incidentally, there is a case where the occurrence of an abnormality can be predicted from a change in the appearance of the equipment before the abnormality is detected. Examples of the occurrence of an abnormality predicted from the change in appearance include the occurrence of rust and the displacement of a component of the equipment. The occurrence of an abnormality may be predicted not only by a change in appearance but also by a change in sound or the like.

The same equipment may be installed in different sites or different areas. In such a case, data such as state information (e.g., captured images) indicating changes in appearance or sound, obtained by various sensors of the traveling robot 11, are collected and stored in the management server 12, and the collected data is analyzed. The analysis result is transmitted to an operator using the same equipment at another site or area. Then, the operator at another site or area can predict the occurrence of the abnormality and take measures for the abnormality in advance. The measures in advance are, for example, but not limited to, applying a rust prevention treatment, correcting a displacement of a component, and replacing a component.

Figure 40:
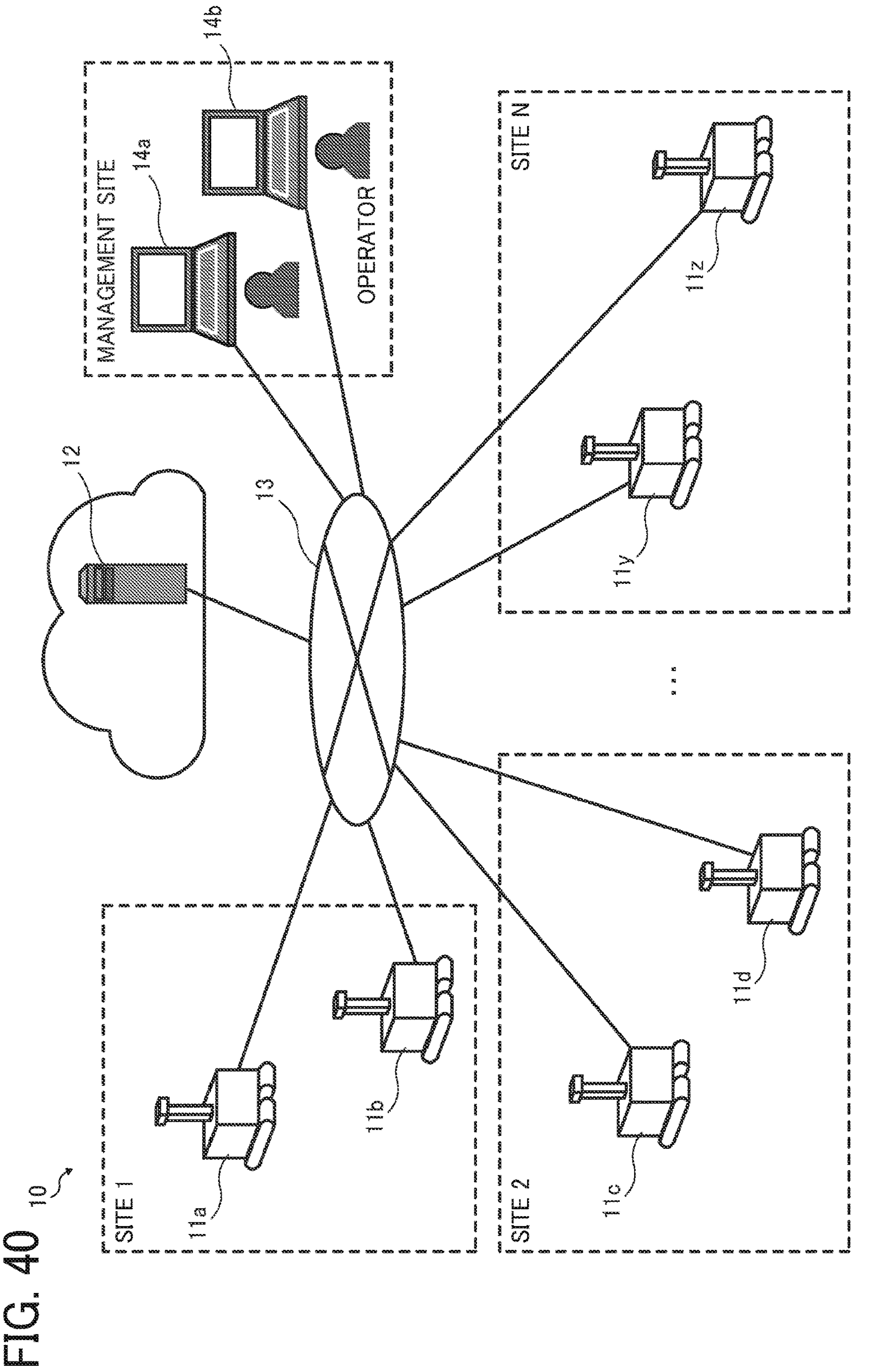
FIG. 40 is a diagram illustrating a configuration of an information processing system according to a third embodiment.

FIG. 40 is a diagram illustrating a configuration of an information processing system according to a third embodiment. In the information processing system 10 illustrated in FIG. 40, one or more traveling robots 11*a* to 11*z* are arranged at each of a plurality of sites 1 to N. The management server 12 collects information or data from each of the traveling robots 11*a* to 11*z*, analyzes the collected information, and notifies the operator at the management site of the analyzed result.

In the example illustrated in FIG. 40, two communication terminals 14*a* and 14*b* (may be collectively referred to as "communication terminals 14") are illustrated in the management site, but the number of communication terminals installed in the management site is not limited thereto, and the number of the management sites is not limited to one.

The number of traveling robots 11*a* to 11*z* installed at each site is not limited to one, and a plurality of traveling robots may be installed in accordance with the number of areas at each site. In the example illustrated in FIG. 40, two of the traveling robots 11*a* to 11*z* (hereinafter may be collectively referred to as "traveling robots 11") are disposed at each of the sites 1 to N. Each of the traveling robots 11*a* to 11*z* includes the imaging device 22 or the like, and captures an image of a designated monitored object.

Figure 41:
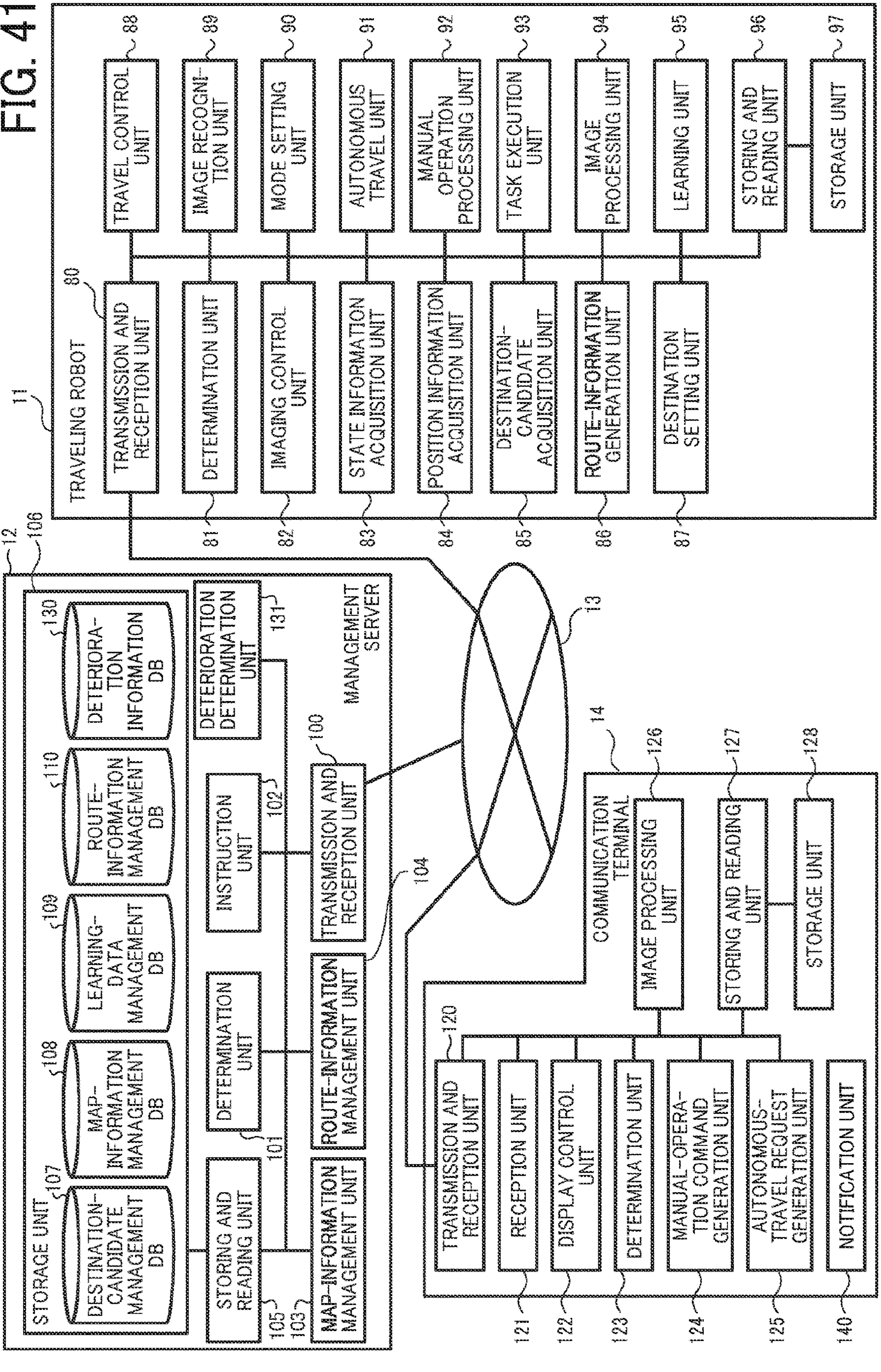
FIG. 41 is a block diagram illustrating functional configurations of a traveling robot, a management server, and a communication terminal according to the third embodiment.

FIG. 41 is a block diagram illustrating an example of the functional configurations of the traveling robot, the management server, and the communication terminal according to the third embodiment. The management server 12 supports, for example, a cloud computing service such as AMAZON WEB SERVICE. In the information processing system 10, the traveling robots 11 and one or more communication terminals 14 communicate with each other via the management server 12.

The management server 12 can improve the security of data such as manual operation commands from the communication terminals 14 and captured images from the traveling robots 11 by using authentication processing by the cloud computing service during communication. The authentication may be authentication using a user ID and a password, biometric authentication using biometric information such as a fingerprint, or multi-factor authentication using a combination of two or more factors.

In addition, the management server 12 has capabilities of generating and managing data, the same data can be shared by a plurality of sites or areas. Accordingly, the management server 12 flexibly copes with not only Peer to Peer communication (one-to-one direct communication) but also one-to-may sites communication. Therefore, the operator can operate not only one arbitrary traveling robot 11 in the same site or the same area but also the plurality of traveling robots 11 in the same site or the same area from one communication terminal 14 via the management server 12, and can also operate a plurality of traveling robots 11 in different sites or areas. In addition, the traveling robot 11 and the communication terminal 14 can be used as a set in each of the plurality of sites or areas, and each traveling robot 11 can be operated by any of the communication terminals 14.

Since the traveling robot 11 of FIG. 41 includes the same functional units as the functional units illustrated in FIG. 5, the description of the same functional units is omitted. The management server 12 of FIG. 41 includes, in addition to the transmission and reception unit 100 and the like illustrated in FIG. 5, a deterioration determination unit 131 and a deterioration information DB 130 in the storage unit 106. The deterioration information DB 130 stores deterioration information. The deterioration information is information regarding a change in appearance, but is not limited thereto, and may be information regarding a change in sound, or the like.

The deterioration determination unit 131 of the management server 12 refers to the deterioration information stored in the deterioration information DB 130 and determines a deterioration state based on the image captured by the imaging device 22 under the control of the imaging control unit 82 of the traveling robot 11. The deterioration determination unit 131 compares the deterioration information with the captured image. Based on the image comparison, the deterioration determination unit 131 determines whether or not rust, displacement of a component, or the like has occurred and deterioration has progressed even though abnormality has not occurred.

The deterioration determination unit 131 transmits the deterioration state as a determination result to the communication terminal 14 operated by the operator. The deterioration state is information indicating which equipment in which of the sites (or which of the areas) is deteriorated.

The communication terminal 14 includes, in addition to the transmission and reception unit 120 and the like illustrated in FIG. 5, a notification unit 140 that receives the deterioration state as a determination result from the management server 12 and notifies the operator of the deterioration state, for example, via the display control unit 122. When receiving the notification of the deterioration state from the notification unit 140, the operator can predict the occurrence of an abnormality and take measures in advance.

FIG. 42 is a diagram illustrating an example of deterioration information managed in a deterioration information management table in the deterioration information DB 130. The traveling robot 11 transmits a captured image to the management server 12 at a predetermined travel interval and a predetermined time interval at the time of inspection in order to acquire information for determining deterioration.

The travel interval and the time interval can be set as appropriate depending on the equipment as the subject of image capturing. The equipment may be an individual device such as the tank 200 or the pump 201 illustrated in FIG. 6, or may be a set of a device and a pipe, a valve, a meter, and the like. The time interval can be determined in consideration of the speed of deterioration of the equipment, the time for replacement, the magnitude of risk due to downtime of the equipment, and the like. The traveling robot 11 may capture an image of a specific location at a specific time and transmit the captured image to the management server 12.

The deterioration information management table stores the image information of the captured image in association with the equipment information (equipment ID) used in the site or arca where the image is captured and the date and time of image capturing. At this time, the column of a deterioration information flag is blank. The equipment ID may be a product number when the equipment is purchased or may be a unique ID assigned by the owner of the equipment for management. The image information may be any information that can specify an image, such as a file name of the image and a storage location of the file of the image.

Next, the deterioration information flag of the deterioration information management table will be described. The determination unit 101 of the management server 12 serves as determination means and determines whether or not there is an abnormality in the state of the equipment that is monitored based on the captured image, the sensor detection result, or the like acquired from the traveling robot 11 at the time of inspection. Then, when the determination unit 101 determines that there is an abnormality, the management server 12 refers to the deterioration information management table of the deterioration information DB 130. Then, the management server 12 sets a flag to a captured image at a predetermined time before the date and time of determination of the abnormality as a deteriorated image, among the captured images associated with the same equipment ID as the equipment determined as being abnormal. In the example illustrated in FIG. 42, the equipment whose equipment ID is PS1 is inspected every day, and an image of the entire equipment is acquired at the inspection point D001. When the determination unit 101 determines that there is an abnormality in the equipment having the equipment ID "PS1" on Mar. 25, 2022, the deterioration information flag "1" is stored in association with the information obtained at 12:00 on Mar. 24, 2022 that is the predetermined time prior to (one-day prior to) the time of determination of the presence of abnormality. Note that the function of the determination unit 101 as the determination means is common to the description of FIG. 5. The date and time of determination that there is an abnormality is, for example, the date and time when the execution of the step S6 in FIG. 12 or FIG. 26 is determined. This abnormality determination by the determination unit 101 may be any abnormality determination related to the equipment having the equipment ID "PS1," and means such as a sensor used for the determination is not limited. That is, the determination may be made based on the detection result by a gas sensor or a sound recorder as described above.

In the example illustrated in FIG. 42, the predetermined time (prior to the determination) is one day, but is not limited thereto, and may be, for example, several hours or several days according to the time interval of image capturing.

Figure 43:
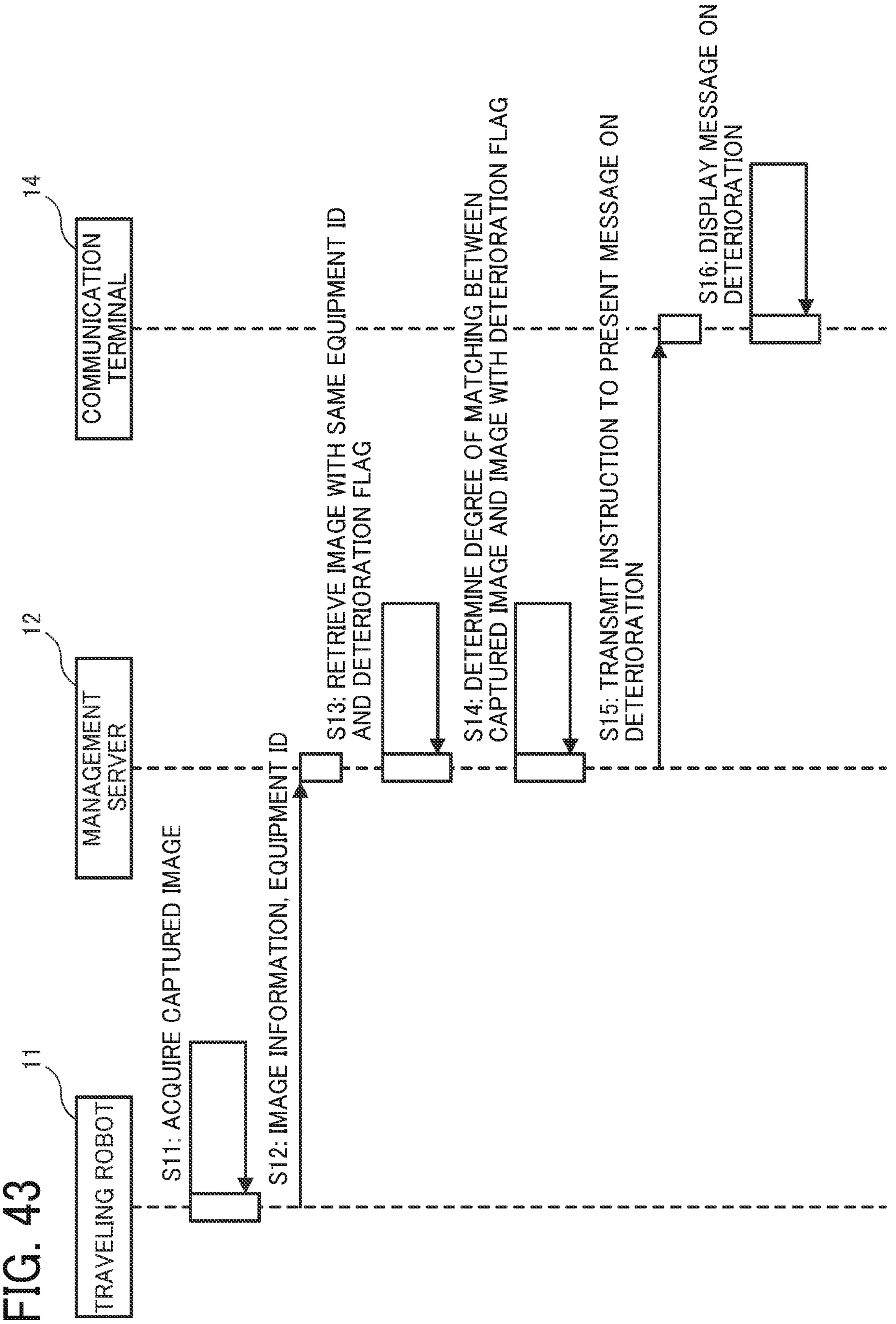
FIG. 43 is a diagram illustrating an example of a process of determining a deterioration state using deterioration information.

Referring to FIG. 43, the process of determining the deterioration state using the deterioration information illustrated in FIG. 42 will be described. At the time of inspection, the imaging device 22 of the traveling robot 11 captures an image of the inspection target equipment at a specific location, at a predetermined travel interval, at a specific time, or at a predetermined time interval under the control of the imaging control unit 82 (S11). The transmission and reception unit 80 of the traveling robot 11 transmits the equipment ID together with the image information of the captured image (S12).

The deterioration information DB 130 stores the image information in association with the equipment ID, and the deterioration determination unit 131 of the management server 12 acquires the image having the same equipment ID as the acquired equipment ID and having the image information associated with the deterioration information flag (S13).

The deterioration determination unit 131 of the management server 12 compares the captured image acquired from the traveling robot 11 with the image retrieved from the deterioration information DB 130, and calculates a matching degree indicating the similarity between the captured image and the retrieved image. The degree of matching can be calculated using any known method, such as pattern matching.

The deterioration determination unit 131 of the management server 12 sets a threshold for the degree of matching. When the degree of matching is equal to or higher than the threshold, the deterioration determination unit 131 determines that the degree of matching is high and that the deterioration of the equipment in the site or area in which the traveling robot 11 is operating has progressed (S14). When determining that the deterioration has progressed, the deterioration determination unit 131 of the management server 12 transmits an instruction to present a message regarding the deterioration to the communication terminals 14 via the transmission and reception unit 100 (S15).

The transmission and reception unit 120 of the communication terminal 14 receives the instruction from the management server 12, and the notification unit 140 of the communication terminal 14 presents the message regarding the deterioration via the display control unit 122 (S16). The message regarding the deterioration can include information on the equipment that has deteriorated and the site or area where the equipment is located.

When it is determined that the degree of matching is lower than the threshold and the degree of matching is low, the deterioration determination unit 131 of the management server 12 may transmit information instructing to present a message indicating that deterioration has not progressed to the communication terminal 14 via the transmission and reception unit 100, or may not transmit any information to the communication terminal 14.

The management server 12 compares the images having the same equipment information even if the site or area where the equipment is located is different. Thus, the management server 12 can use the deterioration state of the different sites or areas to report the abnormality before the abnormality occurs and prompt the user to take a countermeasure in advance.

Figure 44:
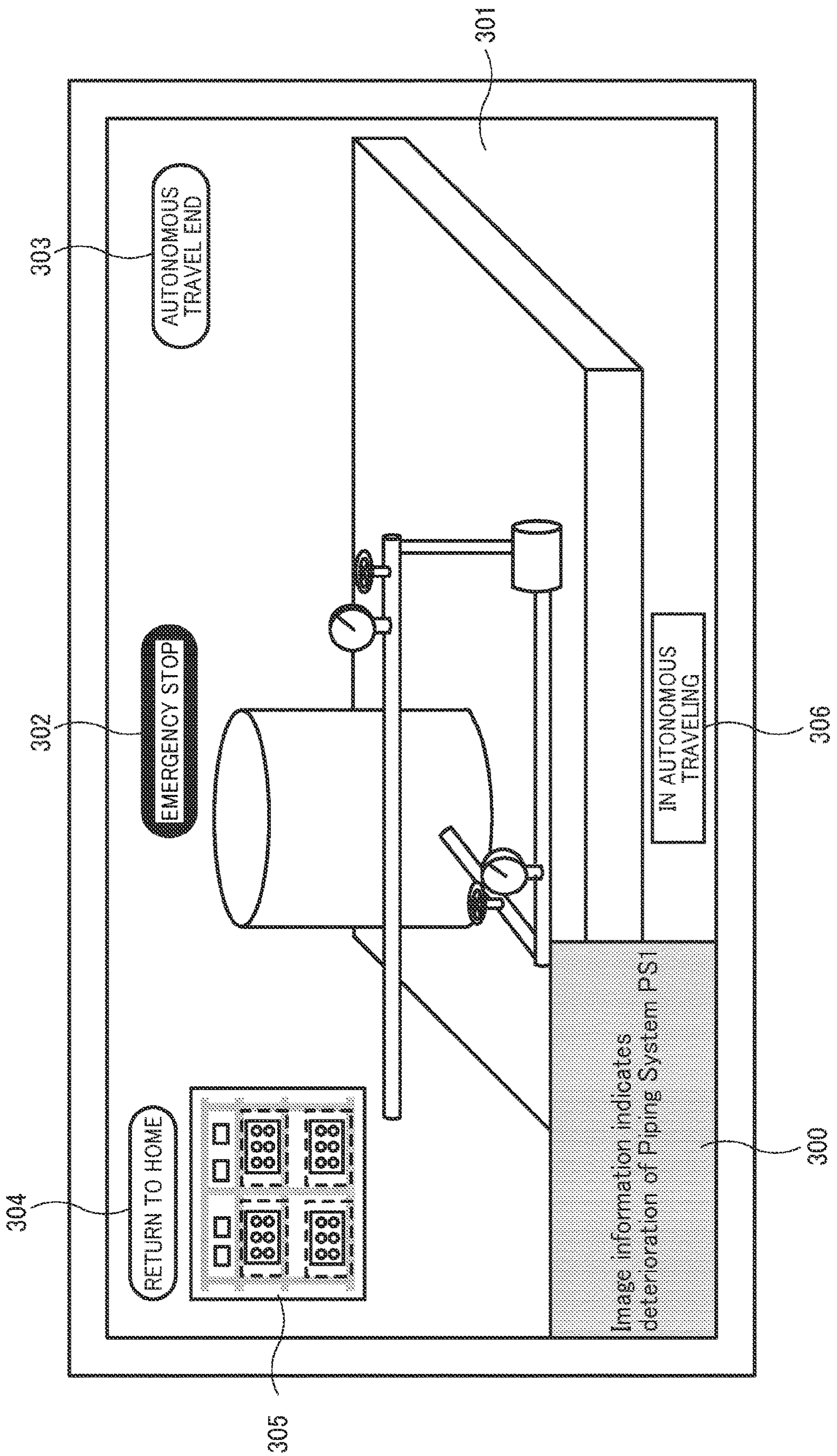
FIG. 44 is a diagram illustrating an example of a screen displaying a message regarding deterioration.

FIG. 44 is a diagram illustrating an example of a message regarding the deterioration displayed on the screen of the communication terminal 14. The communication terminal 14 receives the instruction from the management server 12 and displays a message 300 regarding the deterioration on the display screen. The content of the message 300 is, for example, "Image information indicates a deterioration of the piping system PS1." In this example, the notification of the deterioration is made by displaying a message, but notification may be performed in the form of, for example, sound in addition to displaying a message.

In FIG. 44, the message 300 having the above content is displayed on the image captured by the traveling robot 11. The displayed screen may include a captured image 301 which is an image of the surroundings of the traveling robot 11, an emergency stop button 302, an autonomous travel end button 303, a home button 304, a travel route map 305, and a state indication 306. Note that these buttons are merely examples, and only some of these buttons may be provided, or buttons other than these may be provided.

The captured image 301 is an image captured at a location near the inspection point D001 illustrated in FIG. 6. With the emergency stop button 302, an operation such as temporarily stopping the traveling of the traveling robot 11 can be input.

The emergency stop button 302 is a visual representation for the reception unit 121 of the communication terminal 14 to receive an instruction of emergency stop from the operator. When the emergency stop button 302 is selected again after being selected for emergency stop, the emergency stop button 302 may receive cancel of temporary stop for resuming the autonomous travel. The autonomous travel end button 303 is for switching the traveling robot 11 from the autonomous travel mode to the manual travel mode. The home button 304 is for switching to a home screen. The travel route map 305 displays the travel route of the traveling robot 11 and the position of the traveling robot 11 on the travel route. The state indication 306 displays a state of the traveling robot 11 such as autonomous travel or temporary stop in the autonomous travel mode.

As described above, when it is determined that there is an abnormality in a particular monitored object, the management server 12 acquires deterioration information (captured image or the like) relating to the monitored object. The deterioration information is information having the same attribute information (equipment ID or the like) as that of the particular monitored object, acquired the predetermined time prior to the time of the determination of the presence of the abnormality. At that time, Based on the acquired information and the deterioration information, the management server 12 can determine the deterioration state and transmit, to the communication terminal 14, an instruction to report the deterioration state of the monitored object having the same attribute information as the particular monitored object. Then, the communication terminal 14 receives the instruction and notifies the operator by displaying the message regarding the deterioration or the like. Thus, before the abnormality is detected, the occurrence of the abnormality can be predicted, and appropriate measures can be taken before the occurrence of damage such as leakage of dangerous gas.

The above-described embodiment is illustrative and does not limit the present disclosure. The above-described embodiment may be modified within a range conceivable by those skilled in the art. The modification includes addition of another element and change or deletion of one of the above-described elements. Such modifications are within the scope of the present disclosure as long as the actions and effects of the present disclosure are provided.

The present disclosure has the following aspects.

A first aspect concerns a control system (control server) for controlling a traveling body. The control system includes an instruction unit to instruct the traveling body to travel on a first route and acquire state information of a first monitored object (a particular monitored object) on the first route. In a case where the first monitored object is determined as having an abnormality based on the acquired state information, the instruction unit instructs the traveling body to travel on a second route different from the first route and acquire state information of a second monitored object (designated portion related to the first monitored object) on the second route.

In a second aspect, the control system according to the first aspect further includes a determination unit to determine whether or not there is an abnormality in a state of the first monitored object based on the acquired state information.

In a third aspect, the control system according to the first or second aspect further includes a reception unit that receives the state information acquired by the traveling body, and the reception unit receives one or both of an image captured by the traveling body and sound recorded by the traveling body as the state information.

In a fourth aspect, in the control system according to the third aspect, the instruction unit instructs the traveling body to acquire a state information of one or more second monitored objects that are different from the first monitored object and located in the monitored area in which the first monitored object is located. The instruction unit instructs the traveling body to perform one or both of image capturing of a state of the one or more second monitored objects and recording of sound of the one or more second monitored objects.

In a fifth aspect, in the control system according to any one of the first to fourth aspects, in a case where there is a plurality of second monitored objects, and the instruction unit instructs the traveling body to acquire the state information of the plurality of second monitored objects one by one until the cause of the abnormality is identified.

In a sixth aspect, in the control system according to any one of the first to fourth aspects, in a case where there is a plurality of second monitored objects, the instruction unit instructs the traveling body to acquire the state information of all of the plurality of second monitored objects.

In a seventh aspect, the control system according to the second aspect further includes a storage unit and a deterioration determination unit. The storage unit that stores, as deterioration information, the state information obtained a predetermined time prior to a time of determination of the presence of the abnormality made by the determination unit. When state information of another monitored object having the same attribute information as the attribute information of the first monitored object is acquired, based on the acquired state information and the deterioration information stored in the storage unit, the deterioration determination unit determines a deterioration state of the monitored object having the same attribute information as the attribute information of the first monitored object.

An eighth aspect concerns an information processing system that includes the control system according to any one of the first to seventh aspects, and one or more traveling bodies controlled by the control system.

In a ninth aspect, in the information processing system according to the eighth aspect, the traveling body includes a moving mechanism to cause the traveling body to travel on the first route or the second route different from the first route instructed by the control system, a state information acquisition unit that acquires the state information of the first monitored object or the state information of the second monitored object, and a transmission unit that transmits, to the control system, the acquired state information of the first monitored object or the state information of the second monitored object.

In a tenth aspect, in the information processing system according to the eighth or ninth aspect, the monitored area monitored by the information processing system is divided into a plurality of areas, and each area is monitored by one or more traveling bodies.

In an eleventh aspect, in the information processing system according to any one of the eighth to tenth aspects, the traveling body includes a state information acquisition unit that acquires surrounding state information indicating a state around the traveling body, a determination unit that determines the presence or absence of abnormality around the traveling body based on the surrounding state information acquired by the state information acquisition unit, and a presentation unit that presents information to the surroundings of the traveling body. When the determination unit determines that there is an abnormality in the state around the traveling body, the presentation unit presents information on the abnormality.

In a twelfth aspect, in the information processing system according to the eleventh aspect, the presentation unit performs raising a flag, raising a balloon, discharging powder, or a combination of two or more thereof, to present the information on the abnormality.

In a thirteenth aspect, in the information processing system according to the eleventh or twelfth aspect, the traveling body performs an operation corresponding to the abnormality after the information is presented by the presentation unit.

In a fourteenth aspect, in the information processing system according to the thirteenth aspect, the operation corresponding to the abnormality includes turning off a power supply of the traveling body.

In a fifteenth aspect, in the information processing system according to any one of the eighth to fourteenth aspects, the traveling body travels in a factory as the monitored area and acquires the state information.

According to a sixteenth aspect, in the information processing system according to any one of the eighth to fourteenth aspects, the traveling body travels in a medical facility as the monitored area and acquires the state information.

According to a seventeenth aspect, the information processing system according to the ninth aspect further includes a communication terminal that receives a notification instruction to notify an operator of a deterioration state of a monitored object having the same attribute information as attribute information of the first monitored object. The communication terminal includes a notification unit that presents, to the operator, information regarding deterioration of the monitored object having the same attribute information as attribute information of the first monitored object based on the received notification instruction.

An eighteenth aspect concerns a traveling body including a control system. The control system includes an instruction unit to instruct the traveling body to travel on a first route and acquire state information of a first monitored object on the first route. In a case where the first monitored object is determined as having an abnormality based on the acquired state information, the instruction unit instructs the traveling body to travel on a second route different from the first route and acquire state information of a second monitored object on the second route.

In a nineteenth aspect, the traveling body according to the eighteenth aspect includes a moving mechanism to cause the traveling body to travel on the first route or the second route different from the first route instructed by the control system, a state information acquisition unit that acquires the state information of the first monitored object or the state information of the second monitored object, and a transmission unit that transmits, to the control system, the acquired state information of the first monitored object or the state information of the second monitored object.

In a twentieth aspect, the traveling body according to the eighteenth or nineteenth aspect includes a state information acquisition unit that acquires state information indicating a state around the traveling body, a determination unit that determines the presence or absence of abnormality around the traveling body based on the state information around the traveling body acquired by the state information acquisition unit, and a presentation unit that presents information to the surroundings of the traveling body. When the determination unit determines that there is an abnormality in the state around the traveling body, the presentation unit presents information on the abnormality.

A twenty-first aspect concerns a method for controlling a traveling body with a computer. The method includes instructing the traveling body to travel on a first route, acquiring state information of a first monitored object on the first route. The method further includes, in a case where the first monitored object is determined as having an abnormality based on the acquired state information, instructing the traveling body to travel on a second route different from the first route, and acquiring state information of a second monitored object on the second route.

A twenty second aspect concerns a recording medium storing a plurality of program codes which, when executed by a computer, causes the computer to perform a method for controlling a traveling body. The method includes The method includes instructing the traveling body to travel on a first route, acquiring state information of a first monitored object on the first route. The method further includes, in a case where the first monitored object is determined as having an abnormality based on the acquired state information, instructing the traveling body to travel on a second route different from the first route, and acquiring state information of a second monitored object on the second route.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses include any suitably programmed apparatuses such as a general-purpose computer, a personal digital assistant, a Wireless Application Protocol (WAP) or third-generation (3G)-compliant mobile telephone, and so on. Since the present invention can be implemented as software, each and every aspect of the present invention thus encompasses computer software implementable on a programmable device. The computer software can be provided to the programmable device using any conventional carrier medium (carrier means). The carrier medium includes a transient carrier medium such as an electrical, optical, microwave, acoustic or radio frequency signal carrying the computer code. An example of such a transient medium is a Transmission Control Protocol/Internet Protocol (TCP/IP) signal carrying computer code over an IP network, such as the Internet. The carrier medium may also include a storage medium for storing processor readable code such as a floppy disk, a hard disk, a compact disc read-only memory (CD-ROM), a magnetic tape device, or a solid state memory device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processors. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus."

The functionality of the elements disclosed herein may be implemented using circuitry or processing circuitry which includes general-purpose processors, special-purpose processors, integrated circuits, application-specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

This patent application is based on PCT filing PCT/IB2023/052553, filed on Mar. 16, 2023, which claims priority to Japanese Patent Application Nos. 2022-046195, filed on Mar. 23, 2022, and 2023-011242, filed on Jan. 27, 2023, in the Japan Patent Office, the entire disclosure of each are which is hereby incorporated by reference herein.

REFERENCE SIGNS LIST

10 Information processing system
11, 11*a* to 11*z* Traveling robot
12 Management server
13 Communication network
14, 14*a*, 14*b* Communication terminal
20 Controller
21 Housing
22 Imaging device
23 Support
24 Moving mechanism
25 Presentation mechanism
30 CPU
31 ROM
32 RAM
33 HDD controller
34 HD
35 Media I/F
36 Input/output I/F
37 Sound input/output I/F
38 Network I/F
39 Short-range communication circuit
40 Antenna
41 External device I/F
42 Bus line
43 Recording medium
44 Display
45 Microphone
46 Speaker
47 Drive motor
48 Acceleration and orientation sensor
49 GPS sensor
50 Battery
51 Sensor
60 CPU
61 ROM
62 RAM
63 HD
64 HDD controller
65 Display
66 External device I/F
67 Network I/F
68 Bus line
69 Keyboard
70 Pointing device
71 Sound input/output
I/F 72 Microphone
73 Speaker
74 Camera
75 DVD-RW drive
76 Media I/F
77 DVD-RW
78 Recording medium
80 Transmission and reception unit
81 Determination unit
82 Imaging control unit
83 State information acquisition unit
84 Position information acquisition unit
85 Destination-candidate acquisition unit

86 Route-information generation unit
87 Destination setting unit
88 Travel control unit
89 Image recognition unit
90 Mode setting unit
91 Autonomous travel unit
92 Manual operation processing unit
93 Task execution unit
94 Image processing unit
95 Learning unit
96 Storing and reading unit
97 Storage unit
100 Transmission and reception unit
101 Determination unit
102 Instruction unit
103 Map-information management unit
104 Route-information management unit
105 Storing and reading unit
106 Storage unit
107 Destination-candidate management DB
108 Map-information management DB
109 Learning-data management DB
110 Route-information management DB
120 Transmission and reception unit
121 Reception unit
122 Display control unit
123 Determination unit
124 Manual-operation command generation unit
125 Autonomous-travel request information generation unit
126 Image processing unit
127 Storing and reading unit
128 Storage unit
130 Deterioration information DB
131 Deterioration determination unit
140 Notification unit
200 Tank
201 Pump
202, 203 Valve
204, 205 Flowmeter
300 Message
301 Captured image
302 Emergency stop button
303 Autonomous travel end button
304 Home button
305 Travel route map
306 State indication

The invention claimed is:

1. A control server for controlling a traveling body, the control server comprising:

instruction circuitry configured to instruct the traveling body to (i) travel on a first route and (ii) acquire state information of a first monitored object on the first route, and based on a determination of a presence of an abnormality in a state of the first monitored object made from the acquired state information, instruct the traveling body to (i) travel on a second route different from the first route and (ii) acquire state information of a second monitored object different from the first monitored object and related to the abnormality in the state of the first monitored object.

2. The control server according to claim 1, further comprising:

determination circuitry configured to determine whether or not there is anis the abnormality in the state of the first monitored object based on the acquired state information.

3. The control server according to claim 1, further comprising:

a receiver to receive the state information acquired by the traveling body, wherein the state information is an image captured by the traveling body, sound recorded by the traveling body, or a combination of the captured image and the recorded sound.

4. The control server according to claim 3, wherein:

the second monitored object is located in a monitored area in which the first monitored object is located, and the state information of the second monitored object is an image captured by the traveling body, sound recorded by the traveling body, or a combination of the captured image and the recorded sound.

5. The control server according to claim 1, wherein:

in a case where the second monitored object includes a plurality of second monitored objects, the instruction circuitry is configured to instruct the traveling body to acquire the state information of the plurality of second monitored objects one by one until a cause of the abnormality is identified.

6. The control server according to claim 1, wherein:

in a case where the second monitored object includes a plurality of second monitored objects, the instruction circuitry is configured to instruct the traveling body to acquire the state information of all of the plurality of second monitored objects.

7. The control server according to claim 2, further comprising:

a memory to store, as deterioration information, the state information of the first monitored object obtained a predetermined time prior to a time of the determination of the presence of the abnormality made by the determination circuitry; and deterioration determination circuitry configured to determine a deterioration state of another monitored object having the same attribute information as attribute information of the first monitored object, based on state information of the other monitored object and the deterioration information of the first monitored object stored in the memory.

8. The control server according to claim 1, wherein the control server is a part of an information processing system, and the information processing system includes one or more traveling bodies controlled by the control server.

9. The control server according to claim 8, wherein each of the one or more traveling bodies includes:

travel control circuitry configured to control the traveling body to travel on the first route or the second route different from the first route, instructed by the control server;

a state detector configured to acquire the state information of the first monitored object and the state information of the second monitored object; and a transmitter to transmit, to the control server, the state information of the first monitored object and the state information of the second monitored object.

10. The control server according to claim 8, wherein:

the one or more traveling bodies is a plurality of traveling bodies, and a monitored area monitored by the information processing system is divided into a plurality of areas, and each area is monitored by one or more of the plurality of traveling bodies.

11. The control server according to claim 8, wherein each of the one or more traveling bodies includes:

a state detector to acquire surrounding state information indicating a state around the traveling body;

determination circuitry configured to determine presence or absence of an abnormality around the traveling body based on the surrounding state information acquired by the state detector; and presentation circuitry configured to present information on an abnormality to the surroundings of the traveling body based on a determination by the determination circuitry that there is the abnormality in the state around the traveling body.

12. The control server according to claim 11, wherein:

the presentation circuitry is configured to perform one or a combination of raising a flag, raising a balloon, and discharging powder, to present the information on the abnormality.

13. The control server according to claim 11, wherein:

the traveling body is configured to perform an operation corresponding to the abnormality after the information is presented by the presentation circuitry.

14. The control server according to claim 8, wherein:

a monitored area monitored by the one or more traveling bodies is in a factory.

15. The control server according to claim 8, wherein:

a monitored area monitored by the one or more traveling bodies is in a medical facility.

16. The control server according to claim 9, further comprising:

a communication terminal to receive a notification instruction to notify an operator of a deterioration state of another monitored object having the same attribute information as attribute information of the first monitored object, wherein the communication terminal includes notification circuitry configured to present, to the operator, information regarding deterioration of the other monitored object based on the received notification instruction.

17. A traveling body comprising:

instruction circuitry configured to instruct the traveling body to (i) travel on a first route and (ii) acquire state information of a first monitored object on the first route, and based on a determination of a presence of an abnormality in a state of the first monitored object made from the acquired state information, instruct the traveling body to (i) travel on a second route different from the first route and (ii) acquire state information of a second monitored object different from the first monitored object and related to the abnormality in the state of the first monitored object.

18. The traveling body according to claim 17, further comprising:

travel control circuitry configured to control the traveling body to travel on the first route or the second route.

19. The traveling body according to claim 17, further comprising:

a state detector to acquire surrounding state information indicating a state around the traveling body;

determination circuitry configured to determine presence or absence of an abnormality in the state around the traveling body based on the surrounding state information acquired by the state detector; and presentation circuitry configured to present information on an abnormality to the surroundings of the traveling body based on a determination by the determination circuitry that there is the abnormality in the state around the traveling body.

20. A method for controlling a traveling body, the method comprising:

instructing the traveling body to (i) travel on a first route and 11 acquire state information of a first monitored object on the first route; and based on a determination of a presence of an abnormality in a state of the first monitored object made from the acquired state information, instructing the traveling body to (i) travel on a second route different from the first route and (ii) acquire state information of a second monitored object different from the first monitored object and related to the abnormality in the state of the first monitored object.

* * * * *